US006769127B1

(12) United States Patent
Bonomi et al.

(10) Patent No.: US 6,769,127 B1
(45) Date of Patent: Jul. 27, 2004

(54) METHOD AND SYSTEM FOR DELIVERING MEDIA SERVICES AND APPLICATION OVER NETWORKS

(75) Inventors: Mauro Bonomi, Palo Alto, CA (US); Jean-Georges Fritsch, Los Altos, CA (US); Patrick James Sweeney, Palo Alto, CA (US); Randolph Osborne, San Jose, CA (US); Charles Francis Morris, Jr., San Jose, CA (US); Reed Majors, Palo Alto, CA (US); Francis Michel Degrange, Palo Alto, CA (US); Ian Locke, Mountain View, CA (US); Johnny C. Y. Ng, San Jose, CA (US); Yousheng Cao, Mountain View, CA (US); Li Liu, Sunnyvale, CA (US); Nam Phu Thanh Do, Milpitas, CA (US); Ronald D. Howe, Sunnyvale, CA (US)

(73) Assignee: Minerva Networks, Inc., Santa Clara, CA (US)

( * ) Notice: Subject to any disclaimer, the term of this patent is extended or adjusted under 35 U.S.C. 154(b) by 0 days.

(21) Appl. No.: 09/595,848

(22) Filed: Jun. 16, 2000

(51) Int. Cl.[7] .......................... H04N 5/445; H04N 7/173

(52) U.S. Cl. ............................. 725/39; 725/94; 7/173; 5/445

(58) Field of Search ............................. 725/87, 91, 92, 725/93, 114, 115, 116, 117, 138, 144, 42, 39, 94; H04N 7/173, 7/18, 5/445; G06F 3/00, 13/00

(56) References Cited

U.S. PATENT DOCUMENTS

| 5,508,815 A | | 4/1996 | Levine | |
|---|---|---|---|---|
| 5,517,652 A | * | 5/1996 | Miyamoto et al. | 725/115 |
| 5,544,161 A | * | 8/1996 | Bigham et al. | 370/397 |
| 5,557,724 A | | 9/1996 | Sampat et al. | |
| 5,565,909 A | | 10/1996 | Thibadeau et al. | |
| 5,621,456 A | * | 4/1997 | Florin et al. | 725/43 |
| 5,652,613 A | * | 7/1997 | Lazarus et al. | 725/50 |
| 5,661,516 A | * | 8/1997 | Carles | 725/35 |
| 5,701,383 A | * | 12/1997 | Russo et al. | 386/46 |

(List continued on next page.)

FOREIGN PATENT DOCUMENTS

| EP | 0 909 095 A1 | 4/1999 |
|---|---|---|
| WO | WO 98/00976 | 1/1998 |
| WO | WO 00/30354 | 5/2000 |

OTHER PUBLICATIONS

"Minerva Impression: Interactive Video Authoring for DVD", User's Manual, Version 1.0, 1998.
"Media Demon™ Management Software for Rich–Media Delivery Services", Minerva Networks, Inc., 2000, pp. 1–2.
"Media Demon™—Management Software for Rich–Media Services", Minerva Networks, Inc., http://www.minervanetworks.com/video_over_networks/mediademon.html, downloaded May 2000, pp. 1–3.

(List continued on next page.)

*Primary Examiner*—Vivek Srivastava
*Assistant Examiner*—Andrew Y Koenig
(74) *Attorney, Agent, or Firm*—Joe Zheng

(57) ABSTRACT

A media system that centrally manages and stores media contents and also controls the delivery of media content to subscribers is disclosed. According to one aspect, an administrator can control program scheduling, rates, service packages and system configuration for a media delivery system. Additionally, the administrator may also control billing, transaction monitoring, and customer relations. According to another aspect, the media delivery system provides subscribers with centrally managed storage for paused or recorded media. Still another aspect is that the media delivery system can restrict various administrators to different modules of the media delivery system.

26 Claims, 69 Drawing Sheets

520

| TIME | Channel 1 | • • • | Channel 23 | Channel 24 | Channel 25 |
|---|---|---|---|---|---|
| 6:30 PM | Infomercial | | News | Local News | Discussions |
| 7:00 PM | News | | Friends | Jeopardy | Paid programming |
| 7:30 PM | Travel | | | | |
| 8:00 PM | Politics | | Austin Powers | The Matrix | Hot Topics |
| 8:30 PM | Mission Impossible II | | The Spy who Shagged me | Paid programming | Health |
| 9:00 PM | | | | | Adults |
| 9:30 PM | Comedy | | Animal Planet | | |

522

U.S. PATENT DOCUMENTS

| | | | | | |
|---|---|---|---|---|---|
| 5,701,582 | A | * | 12/1997 | DeBey | 725/103 |
| 5,724,521 | A | * | 3/1998 | Dedrick | 705/26 |
| 5,758,259 | A | * | 5/1998 | Lawler | 725/45 |
| 5,805,763 | A | * | 9/1998 | Lawler et al. | 386/83 |
| 5,880,792 | A | * | 3/1999 | Ward et al. | 348/722 |
| 6,014,694 | A | * | 1/2000 | Aharoni et al. | 709/219 |
| 6,049,831 | A | * | 4/2000 | Gardell et al. | 709/236 |
| 6,075,575 | A | * | 6/2000 | Schein et al. | 348/734 |
| 6,115,740 | A | * | 9/2000 | Mizutani | 709/217 |
| 6,160,545 | A | * | 12/2000 | Eyer et al. | 345/721 |
| 6,160,546 | A | * | 12/2000 | Thompson et al. | 345/721 |
| 6,378,129 | B1 | * | 4/2002 | Zetts | 725/94 |

OTHER PUBLICATIONS

"Minerva Impression—Interactive Video Authoring", http://www.minervanetworks.com/dvd_solutions/Impression.html, downloaded May 2000, pp. 1–3.

"Minerva VNP", Minerva Networks, Inc., http:///www.minervanetworks.com/video_over_networks/vnp.html, downloaded May 2000, pp. 1–4.

"Minerva VDK—Video Network Development Kit for VNP", Minerva Networks, Inc., http://www.minervanetworks.com/video_over_networks/von_vdk.hmtl, downloaded May 2000, pp. 1–4.

Ploskina, "Broadband TV? No Telephone Rewiring Necessary", publication unknown.

Smith et al., "Design of Multimedia Services," BT Technology Journal, vol. 13, No. 4, BT Laboratories, GB, Oct. 1995.

Whyte, WS, "The Many Dimensions of multimedia communications," BT Technology Journal, vol. 13, No. 4, BT Laboratories, GB, Oct. 1995.

* cited by examiner

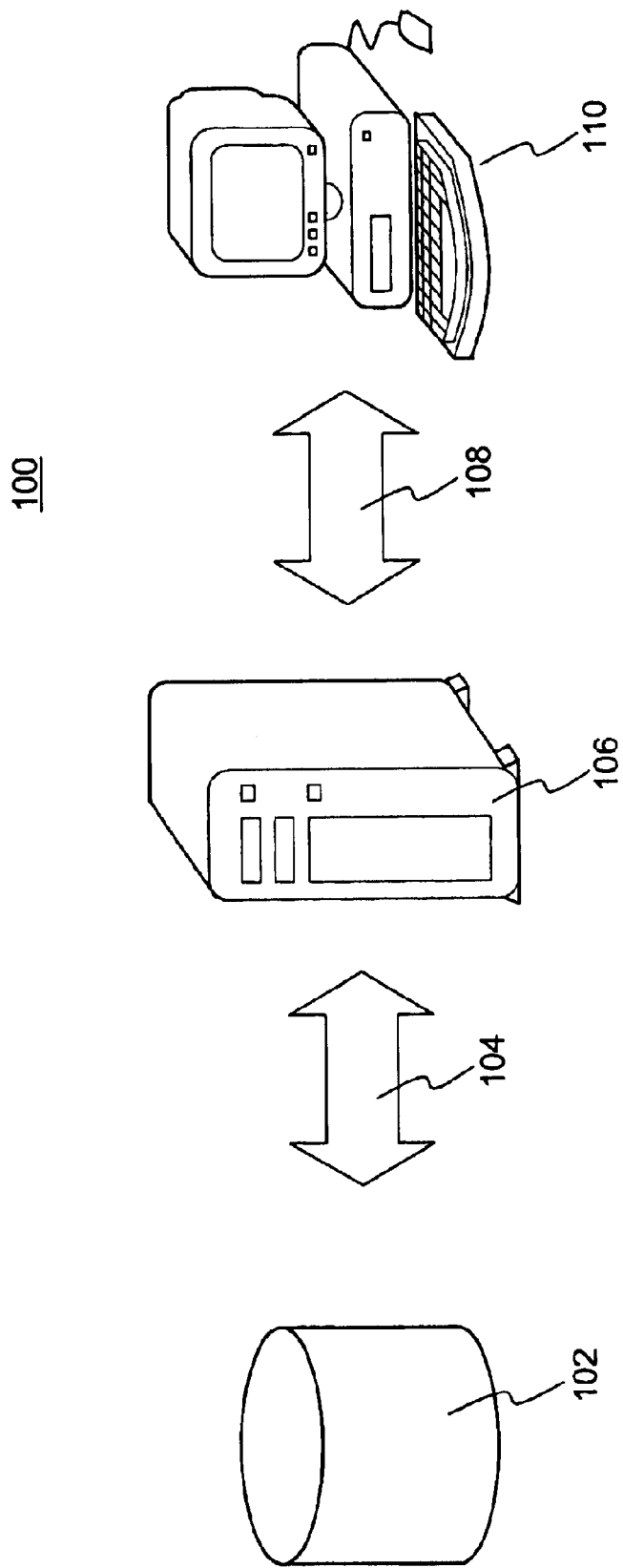

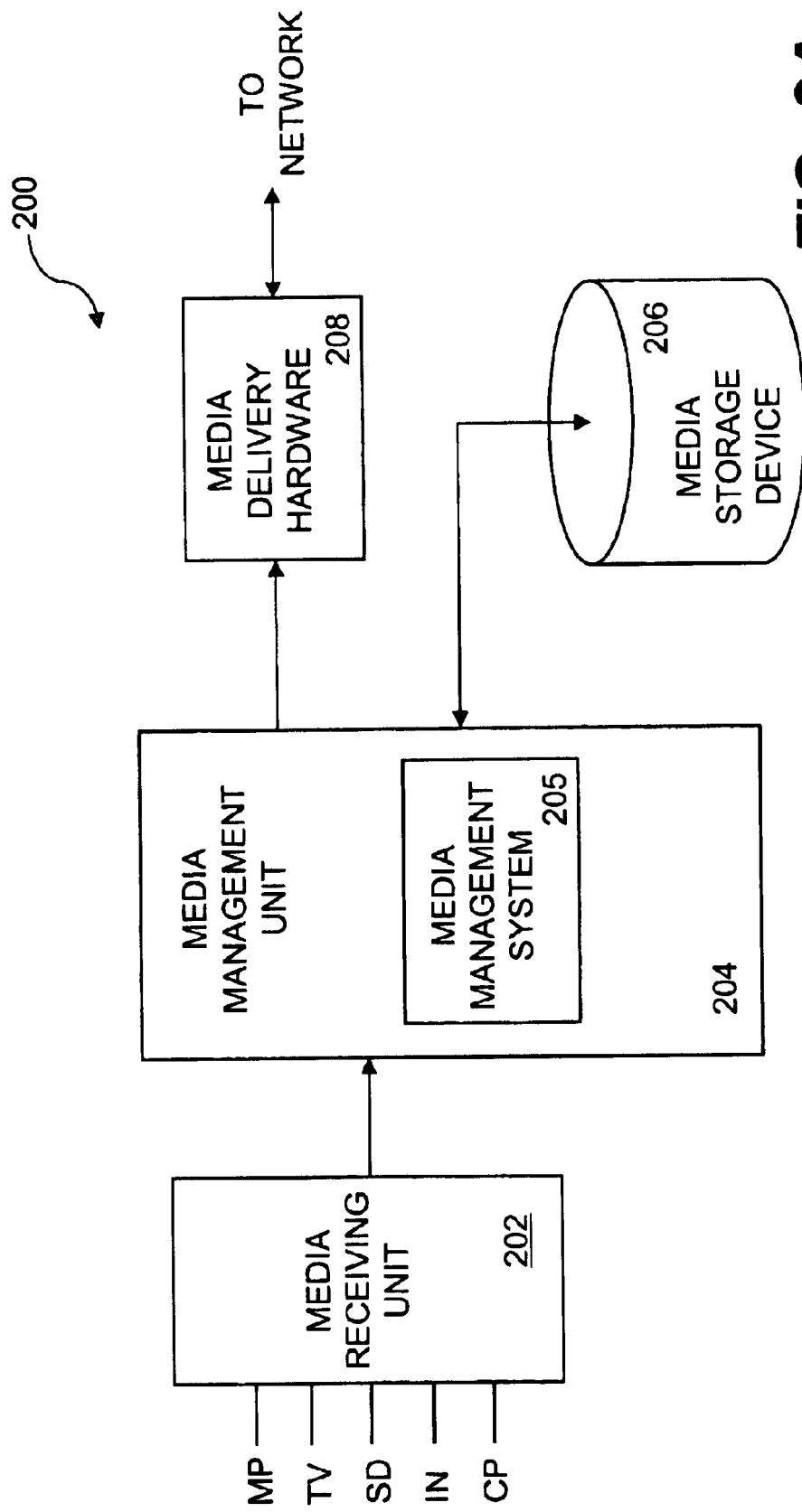

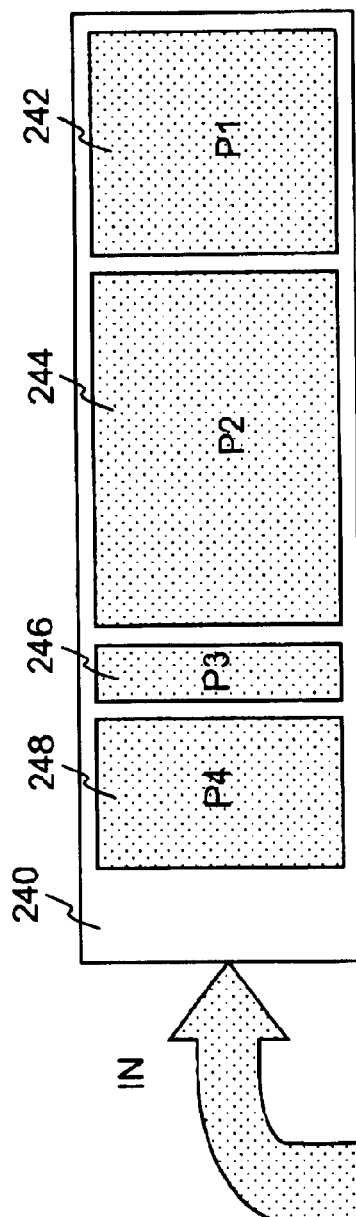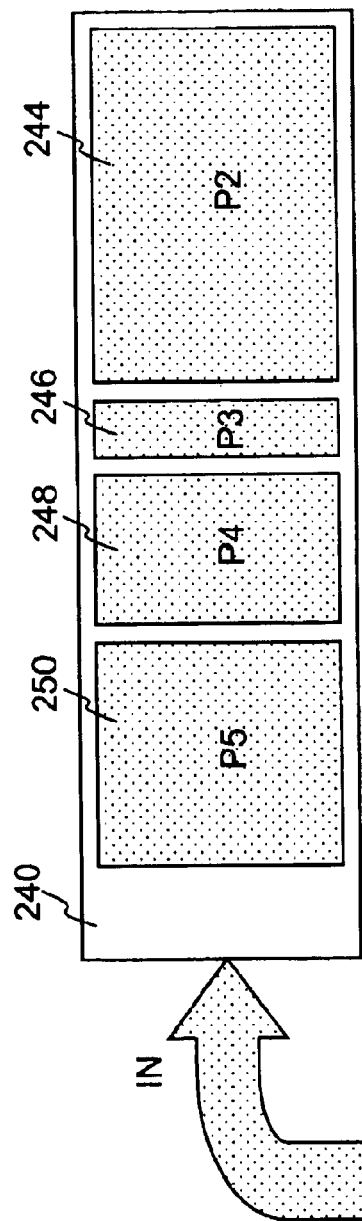

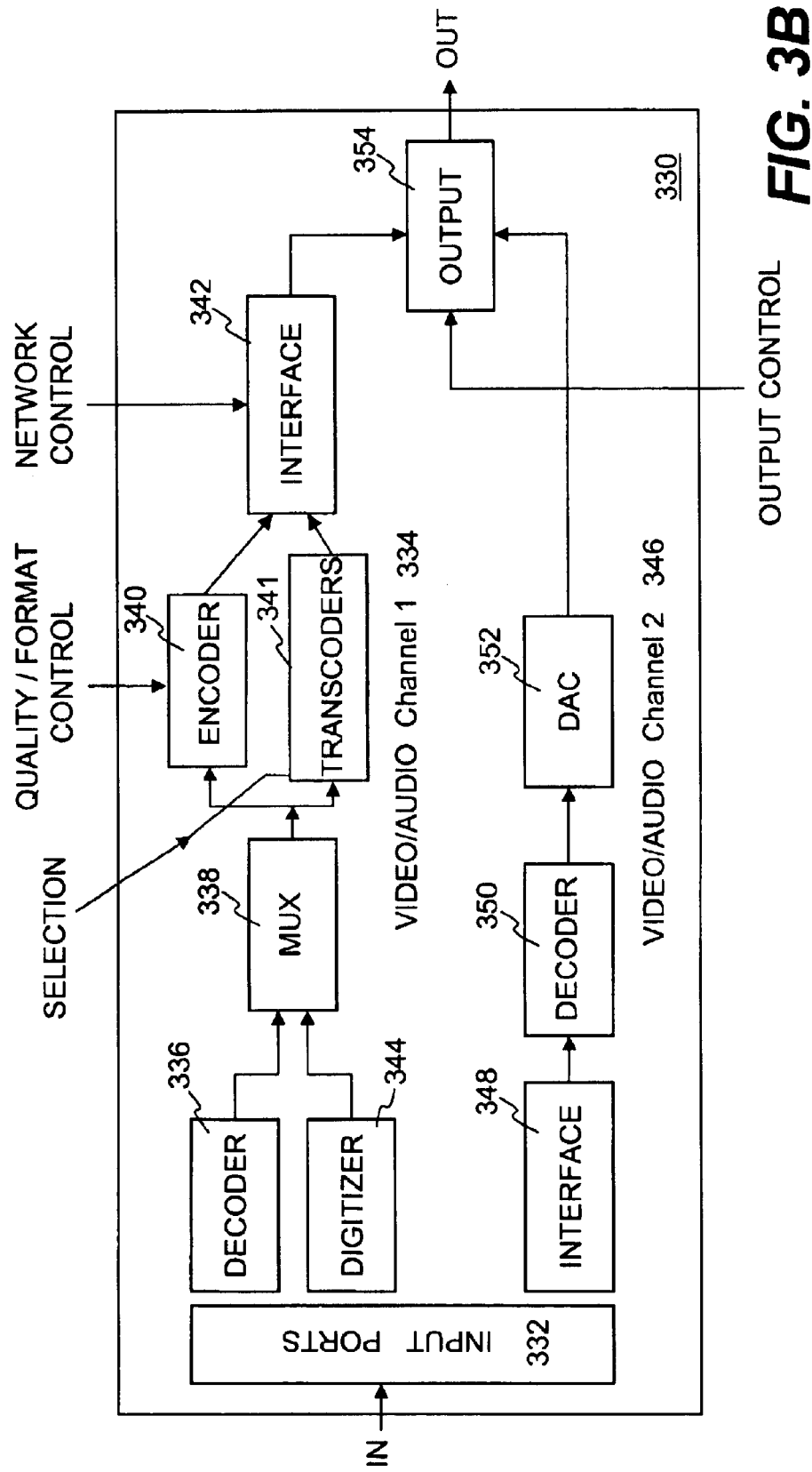

Encoder Advanced Setting

Encoder – Advanced Settings

Video
- Input: ⊙ Composite ○ S-Video
- Standard: ⊙ NTSC ○ PAL
- Input Mode: ⊙ Consumer ○ Professional

[MPEG2Half / MPEG1QSIF / MPEG1 SIF / MPEG2 Half / MPEG2 Full ▼]

Audio ☑ Audio On
- Bitrate: [224000 ▼] bps
- Input Mode: ⊙ Analog
- Mode: ⊙ Stereo ○ Mono
- Sampling: ○ 32KHz ○ 44.1KHz ⊙ 48KHz
- Input Gain: [0dB ▼]

Mux
- Bitrate: 4646400 bps [estimated]
- Type: ○ System ⊙ Program ○ Transport

Network
- Packet Size: [4096]      TTL: [4]

SAP
- IP Address: [224.2.127.254]     Port: [9875]
- Multicast TTL: [4]
- Description:
- URL:
- Email:
- Phone:

[Cancel] [OK]

Warning: Applet Window

| TIME | Channel 1 | ••• | Channel 23 | Channel 24 | Channel 25 |
|---|---|---|---|---|---|
| 6:30 PM | Infomercial | | News | Local News | Discussions |
| 7:00 PM | News | | Friends | Jeopardy | Paid programming |
| 7:30 PM | Travel | | | | |
| 8:00 PM | Politics | | Austin Powers | The Matrix | Hot Topics |
| 8:30 PM | Mission Impossible II | | The Spy who Shagged me | Paid programming | Health |
| 9:00 PM | | | | | Adults |
| 9:30 PM | Comedy | | Animal Planet | | |

SYSTEM SETUP AND INSTALLATION — System 2

SYSTEM CONFIGURATION

| | | | | |
|---|---|---|---|---|
| Program Guid & Channel Information | Number of [100] Channel | Backward [7 days] schedule Days | Forward [7 days] schedule Days | Max Passable Channel [ ] |
| | No of Channel display on page [6] | Program schedule block [30 min ▼] | Max VNP Channel [ ] | Max Record Channel [ ] |

Video Standard: ○ PAL  ⊙ NTSC  ○ SECOM

| | | | | |
|---|---|---|---|---|
| Demon Control: | Customer Aced On/Off [Auto ▼] | Alarming On/Off [Manual ▼] | New Released Content List [Auto ▼] | Save |
| | Customer Set Top Box On/Off [Auto ▼] | Schedule to Record [Auto ▼] | Exceed Usage Warning [Auto ▼] | |
| | Service & Price Channel [Auto ▼] | Program Guide Import [Manual ▼] | Rent Check Back [Auto ▼] | |

VNP CONFIGURATION — 824

| VNP ID | IP Address | Port | Assigned Channel Name | Assigned Channel Number | Pause | Record | Channel Type |
|---|---|---|---|---|---|---|---|
| ⊙ 1 | 225.1.1.1 | 2001 | | | | | |
| ○ 2 | 225.1.1.2 | 2002 | | | | | |
| ○ 3 | 225.1.1.3 | 2003 | ABC | 2 | yes | yes | Live |
| ○ 4 | 225.1.1.4 | 2004 | CNN | 2 | yes | yes | Live |
| ○ 5 | 225.1.1.5 | 2005 | | | | | |
| ○ 6 | 225.1.1.6 | 2006 | | | | | |
| ○ 7 | 225.1.1.7 | 2007 | | | | | |
| ○ 8 | 225.1.1.8 | 2008 | | | | | |

ADD NEW VNP — 826

| VNP Device Configuration: | Number of VNP Boxes [100] | Private IP Address [225.1.1.1 ▼] | Port [2001 ▼] |

[ Add VNP ]  [ Edit VNP ]  [ Del VNP ] — 820

---

Minerva Networks — MEDIA DEMON

- ADMINISTRATION
- DEVICE
- CUSTOMERS
- LIVE ASSETS
- STORED ASSETS
- BILLING
- SERVICE & PRICING
- System setup
- Business Into Setup
- System Config ▲
  - Admin User
  - Data Import
- LOG OFF

SYSTEM STATISTICS
Customers       1834
Video Stored    573hrs
Live Channels   85
Bandwidth       4.3Gb/s

ADMIN ASSISTANCE
The device window is Used to add and Administer STB device Information.
Mac Address details are entered with serial Numbers and customer details

SYSTEM SETUP AND INSTALLATION — System 3

ADMINISTRATION USER MANAGEMENT

| Name | Account Status | Login | Access Modules |  |  |  |  |  |
|---|---|---|---|---|---|---|---|---|
| | | | Device | Customer | Live Asset | Stored Asset | Billing | Service System |
| Ian Locke | A | llocke | Yes | Yes | Yes | No | Yes | No Yes |
| Joe Cao | A | jcao | Yes | Yes | No | Yes | No | Yes No |
| Reed Majors | A | rmajors | Yes | No | Yes | No | No | Yes Yes |
| Jean-Georges Fritsch | A | jgf | Yes | Yes | No | Yes | No | No No |
| Brian Zhou | A | bzhou | Yes | No | No | Yes | Yes | Yes Yes |
| Chuck Morris | A | cmorris | Yes | Yes | No | No | Yes | Yes Yes |
| Li Sasaki | A | lsasaki | Yes | Yes | Yes | No | No | No Yes |
| Li Liu | A | lliu | Yes | No | Yes | Yes | Yes | Yes Yes |
| Johnny Ng | A | lng | Yes | Yes | Yes | No | No | No Yes |
| Mary Smith | A | msmith | Yes | No | Yes | Yes | Yes | Yes Yes |
| Gail Batac | A | gbatac | Yes | No | No | Yes | No | Yes No |

— 842

ADD NEW ADMINISTRATION USER

First Name: [ ]   Mid Name: [ ]   Last Name: [ ]
Phone: [ ]   Fax: [ ]   Email: [ ]
Account Modules: ☑ Device: ☑ Live Asset ☑ Billing ☑ System n   Language [English ▼]
☑ Customer ☑ Stored Asset ☑ Service   Account Status: ⦿ On ○ Off

[Add Admin User]   [Edit Admin User]   [Del Admin User]

— 844, 840, 846, 848

---

Minerva Networks
MEDIA DEMON

- ADMINISTRATION
- DEVICE
- CUSTOMERS
- LIVE ASSETS
- STORED ASSETS
- BILLING
- SERVICE & PRICING
- Business Into Setup
- System Config
- Admin User ▲
- Data Import
- LOG OFF

SYSTEM STATISTICS
Customers 1834
Video Stored 573hrs
Live Channels 85
Bandwidth 4.3Gb/s

ADMIN ASSISTANCE
The device window is used to add and Administer STB device Information. Mac Address details are entered with serial Numbers and customer details

SYSTEM SETUP AND INSTALLATION

ADMINISTRATION USER MANAGEMENT

| Name | Account Status | Login | Device | Customer | Live Asset | Access Modules Stored Asset | Billing | Service | System |
|---|---|---|---|---|---|---|---|---|---|
| Ian Locke | A | llocke | Yes | Yes | Yes | No | Yes | No | Yes |
| Joe Cao | A | jcao | Yes | Yes | No | Yes | No | Yes | No |
| Reed Majors | A | rmajors | Yes | No | No | No | No | Yes | Yes |
| Jean-Georges Fritsch | A | jgf | Yes | Yes | Yes | Yes | No | No | No |
| Brian Zhou | A | bzhou | Yes | No | No | Yes | Yes | Yes | Yes |
| Chuck Morris | A | cmorris | Yes | Yes | Yes | No | Yes | Yes | Yes |
| Li Sasaki | A | lsasaki | Yes | Yes | Yes | No | No | No | Yes |
| Li Liu | A | lliu | Yes | No | Yes | No | Yes | No | Yes |
| Johnny Ng | A | lng | Yes | Yes | Yes | Yes | No | Yes | Yes |
| Mary Smith | A | msmith | Yes | No | No | No | Yes | No | Yes |
| Gail Batac | A | gbatac | Yes | No | No | No | Yes | Yes | No |

842

EDIT SELECTED ADMIN USER

First Name: [ ]  Mid Name: [ ]  Last Name: [ ]  Language [English(us) ▼]

Phone: [ ]  Fax: [ ]  Email: [ ]  Account Status: ⊙ On ○ Off

Account Modules: ☑ Device: ☑ Live Asset ☑ Billing ☑ System n
☑ Customer ☑ Stored Asset ☑ Service

[Submit]  [Cancel]

860
862

---

Minerva Networks — MEDIA DEMON

- ADMINISTRATION
- DEVICE
- CUSTOMERS
- LIVE ASSETS
- STORED ASSETS
- BILLING
- SERVICE & PRICING
- Business Into Setup
- System Config
- Admin User ▲
- Data Import
- LOG OFF System 4

SYSTEM STATISTICS
Customers 1834
Video Stored 573hrs
Live Channels 85
Bandwidth 4.3Gb/s

ADMIN ASSISTANCE
The device window is Used to add and Administer STB device Information. Mac Address details are entered with serial Numbers and customer details

Minerva Networks — MEDIA DEMON

Service 1

RATE MANAGEMENT

CHANNEL PACKAGE

| Name | Channel | New Channels | Pricing | New Price | Change Start Date |
|---|---|---|---|---|---|
| ◉ Basic | WCBS WNBC WNTW FOX WABC WWOR Chan9 Chan10 Chan11 Chan12 Chan13 Chan14 Chan15 Chan16 Chan17 Chan18 Chan19 Chan20 Chan21 | WCBS WNBC WNTW FOX WABC WWOR Chan9 Chan10 Chan11 Chan12 Chan13 Chan14 Chan15 Chan16 Chan17 Chan18 Chan19 | $19.95 | $17.95 | June 1, 2000 |
| ○ Sports | Espn1, Espn2, Chan4, ASPORT | | $9.95 | $10.95 | June 1, 2000 |
| ○ HBO | HBO WEST, HBO EAST, HBO3 | | $19.95 | | |
| ○ Movie1 | SHOWTIME 1, SHOWTIME 2, SHOWTIME 3, PLAYGIRL, PLAYBOY | SHOWTIME 1, SHOWTIME 2, SHOWTIME 3, PLAYGIRL, PLAYBOY NEW Channel | $29.95 | $35.95 | June 1, 2000 |
| ○ Movie1 | Family, A&E, AMC, DISNEY, NICKEL ODEON | Family, A&E, AMC, DISNEY, NICKEL ODEON | $14.95 | $12.95 | June 1, 2000 |
| ○ PMS | CARTOON NET | | $9.95 | | |

— 902

ADD NEW CHANNEL PACKAGE

| New Channel Package Name | New Channel Package Profile | Pricing | Start Date |
|---|---|---|---|
| Basic1 | WCBS CBS / WNBC NBC / WNTW FOX / WABC ABC / WWOR UPN / WPIX / WNET PBS / A&E / SHOW TIME / WCBS CBS | $17.95 | June 1, 2000 |

[ Add Channel Package ] [ Edit Channel Package ] [ Del Channel Package ]

— 900, 904

ADMINISTRATION
- DEVICE
- CUSTOMERS
- LIVE ASSETS
- STORED ASSETS
- BILLING

SERVICE & PRICING
- Channel Package ▲
- Service Package
- Asset Pricing
- Other Pricing
- System Setup

LOG OFF

SYSTEM STATISTICS
- Customers  1834
- Video Stored  573hrs
- Live Channels  85
- Bandwidth  4.3Gb/s

ADMIN ASSISTANCE
The device window is Used to add and Administer STB device Information. Mac Address details are entered with serial Numbers and customer details

Minerva Networks

MEDIA DEMON

ADMINISTRATION
- DEVICE
- CUSTOMERS
- LIVE ASSETS
- STORED ASSETS
- BILLING

SERVICE & PRICING
- Channel Package
- Service Package ▲
- Asset Pricing
- Other Pricing
- System Setup

LOG OFF

SYSTEM STATISTICS
Customers     1834
Video Stored  573hrs
Live Channels 85
Bandwidth     4.3Gb/s ADMIN ASSISTANCE
The device window is Used to add and Administer STB device Information. Mac Address details are entered with serial Numbers and customer details

802

---

RATE MANAGEMENT | Service 3

CHANNEL PACKAGE

| Package Name | Services | Pricing | Promotion Package | Promotion Start Date | Promotion End Date | New services | New Price | New Pricing Start Date |
|---|---|---|---|---|---|---|---|---|
| ●Bronze | Basic I, Pause, 1-hr Record, | $19.95 | Silver | June 1, 2000 | Aug 31, 2000 | | $22.95 | July 1, 2000 |
| ○Bronze Plus | Basic I, Basic II, Pause, 1-hr Record, Internet | $25.95 | | | | | | |
| ○Silver | Basic I, Basic II, HBO, Pause, 8-hr Record, Internet | $29.95 | Gold | June 1, 2000 | Aug 31, 2000 | Basic I, Basic II, HBO, Pause, 10-hr Record, Internet | $31.95 | July 1, 2000 |
| ○Silver Plus | Basic I, Basic II, HBO, Sports, Pause, 8-hr Record, Internet | $39.95 | | | | Basic I, Basic II, HBO, Sports, Pause, 10-hr Record, Internet | $41.95 | July 1, 2000 |
| ○Gold | Basic I, Basic II, HBO, Sports, Pause, 10-hr Record, Internet | $59.95 | | | | | $57.95 | July 1, 2000 |
| ○Introductory | Basic I, HBO, Movie, Pause, 1-hr Record, Internet | $25.95 | Silver | June 1, 2000 | Aug 31, 2000 | | | |

922

ADD NEW SERVICE PACKAGE

○ New Channel Package Name: [        ]

Channel Package:
- Basic I
- Basic II
- Sports
- HBO
- Movie 1
- Movie 2
- Plus

Record Space [1-hr ▼]
Pause ☑
Internet Access ☑

Pricing
Start Date
Promotion Package:        [No Next Package ▼]
Promotion Start Date:
Promotion Date:

[Add Channel Package] [Edit Channel Package] [Del Channel Package]

920       924

RATE MANAGEMENT

SERVICE PACKAGE — Service 4

| Package Name | Services | Pricing | Promotion Package | Promotion Start Date | Promotion End Date | New services | New Price | New Pricing Start Date |
|---|---|---|---|---|---|---|---|---|
| ⦿ Bronze | Basic I, Pause, 1-hr Record, | $19.95 | Silver | June 1, 2000 | Aug 31, 2000 | | $22.95 | July 1, 2000 |
| ○ Bronze Plus | Basic I, Basic II, Pause, 1-hr Record, Internet | $25.95 | | | | | | |
| ○ Silver | Basic I, Basic II, HBO, Pause, 8-hr Record, Internet | $29.95 | Gold | June 1, 2000 | Aug 31, 2000 | Basic I, Basic II, HBO, Pause, 10-hr Record, Internet | $31.95 | July 1, 2000 |
| ○ Silver Plus | Basic I, Basic II, HBO, Sports, Pause, 8-hr Record, Internet | $39.95 | | | | Basic I, Basic II, HBO, Sports, Pause, 10-hr Record, Internet | $41.95 | July 1, 2000 |
| ○ Gold | Basic I, Basic II, HBO, Sports, Pause, 10-hr Record, Internet | $59.95 | | | | | $57.95 | July 1, 2000 |
| ○ Introductory | Basic I, HBO, Movie, Pause, 1-hr Record, Internet | $25.95 | Silver | June 1, 2000 | Aug 31, 2000 | | | |

EDIT SELECTED SERVICE PACKAGE

Current Service Package Name: Bronze | Current Price: $19.95 | New Name: Bronze | New Price: $22.95

Current Services: Basic I, Pause, 1-hr Record

New Services:
- Record Space: 1-hr ▼
- Internet Access: ☑
- Pause: ☑

Channel Package: Basic I, Basic II, Sports, HBO, Movie 1, Movie 2

Promotion Package: Silver
Promotion Start Date: June 1, 2000
Promotion End Date: Aug 1, 2000

Promotion Package: No Next Package ▼
Promotion Start Date:
Promotion End Date:

[ Submit ]  [ Cancel ]

Channel Effective Date: June 1, 2000 12:00pm

---

Minerva Networks — MEDIA DEMON

ADMINISTRATION
- DEVICE
- CUSTOMERS
- LIVE ASSETS
- STORED ASSETS
- BILLING
- SERVICE & PRICING
  - Channel Package
  - Service Package ▲
  - Asset Pricing
  - Other Pricing
- System Setup
- LOG OFF SYSTEM STATISTICS
- Customers: 1834
- Video Stored: 573hrs
- Live Channels: 85
- Bandwidth: 4.3Gb/s ADMIN ASSISTANCE
The device window is used to add and Administer STB device Information. Mac Address details are entered with serial Numbers and customer details

Fig. 9D

| Minerva Networks | RATE MANAGEMENT | | | | | | Service 5 |
|---|---|---|---|---|---|---|---|
| MEDIA DEMON | VOD SET PRICING | | | | | | |

| VOD Set Name | PricingLevel | Pricing | Rental Time | | Change Time | | New Pricing | Effective Date |
|---|---|---|---|---|---|---|---|---|
| 1st Syn<br>Arts<br>Cartoon<br>Cinema<br>Crafts<br>Add New | A | $3.95 | 24 | Hours ▼ | 1 | Weeks ▼ | | |
| | B | $2.95 | 5 | Days ▼ | 2 | Weeks ▼ | | |
| | C | $1.95 | 5 | Days ▼ | 3 | Weeks ▼ | | |
| | D | $0.95 | 2 | Weeks ▼ | 4 | Weeks ▼ | | |
| | E | | | Weeks ▼ | | Weeks ▼ | | |

Submit    Del VOD Set        ← 942

NVOD SET PRICING

| NVOD Set Name | PricingLevel | Pricing | Rental Time | | Change Time | | New Pricing | Effective Date |
|---|---|---|---|---|---|---|---|---|
| Movie<br>Cartoon<br>Sports<br>Special<br>Add New | A | $2.95 | 24 | Hours ▼ | 1 | Weeks ▼ | | |
| | B | $1.95 | 5 | Days ▼ | 2 | Weeks ▼ | | |
| | C | | | Days ▼ | | Weeks ▼ | | |
| | D | | | Days ▼ | | Weeks ▼ | | |
| | E | | | Weeks ▼ | | Weeks ▼ | | |

Submit    Del NVOD Set     ← 944

← 940

ADMINISTRATION
DEVICE
CUSTOMERS
LIVE ASSETS
STORED ASSETS
BILLING
SERVICE & PRICING
 Channel Package
 Service Package
 Asset Pricing ▲
 Other Pricing
 System Setup
LOG OFF SYSTEM STATISTICS
Customers     1834
Video Stored  573hrs
Live Channels 85
Bandwidth     4.3Gb/s ADMIN ASSISTANCE
The device window is
Used to add and
Administer STB device
Information.
Mac Address details
are entered with serial
Numbers and customer
details

Minerva Networks — MEDIA DEMON

Service 6

RATE MANAGEMENT

RECORD SPACE RENTAL PRICING

| RS* | Current Price | Next Price Effective Date | RS* | Price | Next Price Effective Date |
|---|---|---|---|---|---|
| ⦿ 1 hr | $1.95 | | ○ 2 hr | $2.95 | |
| ○ 3 hrs | $3.95 | | ○ 4 hrs | $4.95 | |
| ○ 5 hrs | $5.95 | | ○ 6 hrs | $6.95 | |
| ○ 7 hrs | $7.95 | | ○ 8 hrs | $8.95 | |
| ○ 9 hrs | $9.95 | | ○ 10 hrs | $10.95 | |
| ○ Addition Item | $5.95 | | ○ ☐ hrs | | |

*[RS=Recording Space]

[Submit] [Delete] — 962

SPECIAL OFFER

| Sd | Special Offer Code | Title | Price | Start Date | New Pricing | Start Date | Graph |
|---|---|---|---|---|---|---|---|
| ⦿ | SPC101 | America Beauty | $2.95 | May 15, 2000 | $5.95 | Aug 31, 2000 | amer.file |
| ○ | SPC102 | Another New Movie | $2.95 | May 1, 2000 | $5.95 | Aug 31, 2000 | newmovie.file |
| ○ | SPC101 | Third New Movie | $2.95 | June 1, 2000 | $5.95 | Aug 31, 2000 | anothermovie.file |
| ○ | | | | | | | |

[Submit] [Delete] — 964

PAUSE AND INTERNET ACCESS

| Service Name | | Pricing | New Pricing | New Pricing Effective Date |
|---|---|---|---|---|
| ⦿ Pause | 20 mins | $5.95 monthly ▼ | $5.95 monthly ▼ | |
| ○ Internet Access | | $5.95 monthly ▼ | $5.95 monthly ▼ | |

[Submit] [Delete] — 966

— 960

Sidebar (802)

- ADMINISTRATION
  - DEVICE
  - CUSTOMERS
  - LIVE ASSETS
  - STORED ASSETS
  - BILLING
- SERVICE & PRICING
  - Channel Package
  - Service Package
  - Asset Pricing
  - Other Pricing ▲
- System Setup
- LOG OFF
- SYSTEM STATISTICS
  - Customers 1834
  - Video Stored 573hrs
  - Live Channels 85
  - Bandwidth 4.3Gb/s
- ADMIN ASSISTANCE
  - The device window is used to add and Administer STB device information. Mac Address details are entered with serial Numbers and customer details

Fig. 9F

| Minerva Networks | STORED ASSETS LIST | | | | Stored Assets 1 |
|---|---|---|---|---|---|
| MEDIA DEMON | Browser Category [1st Sym ▼] Sub Category [Action ▼] | | | | |
| ADMINISTRATION | MPAA Rating: [PG ▼] Type: [FTP ▼] [Go] | | | | |
| DEVICE | | VOD Type | NVOD | | |
| CUSTOMERS | Type Title | Grist (Rate) | Type(Rate) | | |
| LIVE ASSETS | ⦿ FTP Copycat | Movie Movie(A) | Movie(A) | | ASSETS PROFILE |
| STORED ASSETS ▲ | ○ CST Soldier | Movie Movie(A) | Movie(A) | | Title  Copycat |
| BILLING | ○ CST Cruel Interactions | Movie Movie(A) | Movie(A) | | Episode |
| SERVICE & PRICING | ○ REC Boxing | Sport Sports(B) | | | Title |
| System Setup | ○ REC Artists' Specials | Rid Show Movie(A) | Movie(A) | | Category  Movie       SubCategory  Suspense |
| LOG OFF | ○ REC Babar | Cartoon Movie(A) | Movie(A) | ←1004 | |
| | ○ REC Beach First Look | Special Sports(B) | | | Rate  R                  Encode Type  MPEG2 |
| | ○ REC Sopranos | Series Movie(A) | Movie(A) | | |
| | ○ CST Cruel Insertions | Move Movie(A) | Movie(A) | | Asset Added By  ETP |
| | ○ REC Boring | Sport Sports(B) | | | Asset Added Date Time  02/13/2000 12:30A |
| | ○ REC Artists Specials | Move Movie(A) | Movie(A) | | VOD Set  Movie(A) |
| | ○ REC Babar | Cartoon Movie(A) | Movie(A) | | NVOD Set  Movie(A)     NVOD Channel  3 |
| | ○ REC Beach First Look | Special Sports(B) | | | Current Trailer  Copycat 1 |
| | ○ REC Sopranos | Series Movie(A) | Movie(A) | | Trailer List  Action |
| | ○ CST Cruel Interactions | Movie Movie(A) | Movie(A) | | Location  D:\madiaDemon\assets\Copycat |
| | ○ REC Boring | Sport Sports(B) | | | Description |
| | ○ REC Beach First Look | Special Sports(B) | | | A criminal psychologist and Two... |
| | ○ REC Sopranos | Series Movie(A) | Movie(A) | | |
| | [Next Page >>] Number of remaining assets in search:10 | | | | |
| SYSTEM STATISTICS | [Delete Asset] [Edit Asset] [Add Assets] | | | | ○ Add Assets from Newly Received Assets List |
| Customers 1834 | | | ↖1002 | ↖1000 | ○ Add Assets by Entering data |
| Video Stored 573hrs | | | | | ⦿ Schedule to Record a Program from Program Guide ⎫ |
| Live Channels 85 | | | | | ⎬ ←1006 |
| Bandwidth 4.3Gb/s | | | | | ⎭ |
| ADMIN ASSISTANCE | | | | | Channel [ABC(1) ▼]   Start Time [12:00A ▼] |
| The device window is Used to add and Administer STB device Information. Mac Address details are entered with serial Numbers and customer details | | | | | |

Minerva Networks

MEDIA DEMON

- ADMINISTRATION
- DEVICE
- CUSTOMERS
- LIVE ASSETS
- STORED ASSETS ▲
- BILLING
- SERVICE & PRICING
- System Setup
- LOG OFF

SYSTEM STATISTICS
Customers 1834
Video Stored 573hrs
Live Channels 85
Bandwidth 4.3Gb/s

ADMIN ASSISTANCE
The device window is
Used to add and
Administer STB device
Information.
Mac Address details
are entered with serial
Numbers and customer
details

← 802

Stored Assets 2

STORED ASSETS LIST

Browser Category [1st Syn ▼] Sub Category [Action ▼]

MPAA Rating: [PG ▼] Type: [FTP ▼] [Go]

| Type | Title | | VOD Type (Rate) | NVOD Type(Rate) |
|---|---|---|---|---|
| ⊙ FTP | Copycat | Grist | Movie Movie(A) | Movie(A) |
| ○ CST | Soldier | | Movie Movie(A) | Movie(A) |
| ○ CST | Cruel Interactions | | Movie Movie(A) | Movie(A) |
| ○ REC | Boxing | | Sport Sports(B) | |
| ○ REC | Artists' Specials Rid Show Movie(A) Movie(A) | | | |
| ○ REC | Babar | | Cartoon Movie(A) | Movie(A) |
| ○ REC | Beach First Look | Special Sports(B) | | |
| ○ REC | Sopranos | | Series Movie(A) | Movie(A) |
| ○ CST | Cruel Insertions | | Move Movie(A) | Movie(A) |
| ○ REC | Boring | | Sport Sports(B) | |
| ○ REC | Artists Specials | | Move Movie(A) | Movie(A) |
| ○ REC | Babar | | Cartoon Movie(A) | Movie(A) |
| ○ REC | Beach First Look | Special Sports(B) | | |
| ○ REC | Sopranos | | Series Movie(A) | Movie(A) |
| ○ CST | Cruel Interactions | | Movie Movie(A) | Movie(A) |
| ○ REC | Boring | | Sport Sports(B) | |
| ○ REC | Beach First Look | Special Sports(B) | | |
| ○ REC | Sopranos | | Series Movie(A) | Movie(A) |

[Next Page >>] Number of remaining assets in search:10

← 1002

ADD ASSETS FROM ASSET LIST

- Asset List [▼]
- Trailer List [▼]
- Title
- Episode Title
- Category
- Sub Category
- Rate
- Encode Type [MPEG1 ▼]
- Added By [SCH]
- Asset Added Date Time
- VOD Set [Movie ▼] [A ▼]
- NVOD Set [Movie ▼] [A ▼]
- Description

[ADD]   [DONE]

1012

1010

STORED ASSETS LIST

Browser Category [1 st Sym ▼] Sub Category [Action ▼]

MPAA Rating: [PG ▼] Type: [FTP ▼] [Go]

| Type | Title | VOD Type (Rate) | NVOD Type(Rate) |
|---|---|---|---|
| ⦿ FTP | Copycat | Grist | Movie Movie(A) Movie(A) |
| ○ CST | Soldier | Movie | Movie Movie(A) Movie(A) |
| ○ CST | Cruel Interactions | Movie | Movie Movie(A) Movie(A) |
| ○ REC | Boxing | Sport | Sports(B) |
| ○ REC | Artists' Specials Rld Show | Movie(A) | Movie(A) |
| ○ REC | Babar | Cartoon | Movie(A) Movie(A) |
| ○ REC | Beach First Look | Special | Sports(B) |
| ○ REC | Sopranos | Series | Movie(A) Movie(A) |
| ○ CST | Cruel Insertions | Move | Movie(A) Movie(A) |
| ○ REC | Boring | Sport | Sports(B) |
| ○ REC | Artists Specials | Move | Movie(A) Movie(A) |
| ○ REC | Babar | Cartoon | Movie(A) Movie(A) |
| ○ REC | Beach First Look | Special | Sports(B) |
| ○ REC | Sopranos | Series | Movie(A) Movie(A) |
| ○ CST | Cruel Interactions | Movie | Movie(A) Movie(A) |
| ○ REC | Boring | Sport | Sports(B) |
| ○ REC | Beach First Look | Special | Sports(B) |
| ○ REC | Sopranos | Series | Movie(A) Movie(A) |

[Next Page >>] Number of remaining assets in search:10

Stored Assets 5

MODIFY ASSET

- Title: Copycat
- Episode Title:
- Category: Movie ▼
- Sub Category: Suspense ▼
- Rate: R ▼
- Encode Type: MPEG2 ▼
- Asset Added By: FTP
- Asset Added Date Time: Mm:[02] dd[13] yy[00] [12:30A ▼]
- VOD Set: Movie ▼ [A ▼]
- NVOD Set: Movie ▼ [A ▼] NVOD Channel [3]
- Trailer List: Copycat1 ▼
- Location: D:\mediaDemon\assets\Copycat
- Description: A criminal psychologist and Two....

[CANCEL] [UNCHANGE] [DONE]

Minerva Networks

MEDIA DEMON

- ADMINISTRATION
- DEVICE
- CUSTOMERS
- LIVE ASSETS
- STORED ASSETS ▲
- BILLING
- SERVICE & PRICING
- System Setup
- LOG OFF

SYSTEM STATISTICS
- Customers 1834
- Video Stored 573hrs
- Live Channels 85
- Bandwidth 4.3Gb/s

ADMIN ASSISTANCE
The device window is Used to add and Administer STB device Information. Mac Address details are entered with serial Numbers and customer details

Minerva Networks

MEDIA DEMON

- ADMINISTRATION
- DEVICE
- CUSTOMERS
- ▲ LIVE ASSETS
- STORED ASSETS
- BILLING
- SERVICE & PRICING
- System Setup
- LOG OFF

SYSTEM STATISTICS
Customers 1834
Video Stored 573hrs
Live Channels 85
Bandwidth 4.3Gb/s

ADMIN ASSISTANCE
The device window is Used to add and Administer STB device Information. Mac Address details are entered with serial Numbers and customer details

PROGRAM GUIDE ON DATE [May 1 12:38:27 CDT 2000 ▼] [GO]   Live Asset 6

| TIME | ● NVOD2 (Channel 5) IPAdd: 225.1.1.6:2005 | ○ CNN (Channel 2) IPAdd: 225.1.1.2:2002 | ○ CBS (Channel 3) P/R IPAdd: 225.1.1.3:2003 | ○ NVOD1 (Channel 4) IPAdd: 225.1.1.4:2004 | ○ NVOD2 (Channel 5) IPAdd: 225.1.1.5:2005 | ○ NVOD3 (Channel 6) IPAdd: 225.1.1.6:2006 |
|---|---|---|---|---|---|---|
| 12:00A ▼ | ABC News Room | Morning News | Morning News | Platoon | Alien Resurrection | New Movie A |
| 12:30A ▼ | | Local News (CST) | Movie (CST) | | | |
| 01:00A ▼ | Good Morning America (CST) | World News | | Platoon | Alien Resurrection | New Movie A |
| 01:30A ▼ | | | Gone with Wind (REC) | | | |
| 02:00A □ | | Stock Watch | | | | |
| 02:30A □ | Good Morning | | | Platoon | Alien Resurrection | New Movie A |
| 03:00A □ | News Hour | Market Review (SCH) | Movie | | | |
| 03:00A □ | | | | | | |
| 04:00A □ | Local News | Weekly Review | Movie | Platoon | Alien Resurrection | New Movie A |
| 04:30A □ | | | | | | |
| 05:00A □ | | | | | | |
| 05:00A □ | | | | | | |
| 06:00A □ | | | | | | |
| 06:30A □ | | | | | | |
| 07:00A □ | | | | | | |
| 07:00A □ | | | | | | |

[Next Page >>] Number of remaining channels in this view:11

ADD PROGRAM TO SELECTED LIVE CHANNEL

Title: [ ]   Episode Title: [ ]   Description: [ ]
Category: [G ▼]   [1st Syn. ▼]   Sub-Category [Action ▼]
Rate: [G ▼]   Affiliation: [WCBS CBS ▼]

[Submit]   [Cancel]

*Fig. 11F*

| Minerva Networks | CUSTOMER LIST | | | | Customer 2 |
|---|---|---|---|---|---|
| MEDIA DEMON | Find a Customer by [Customer ID# ▼] | | | | Customer Profile Detail |
| ADMINISTRATION | Search by [ 1 ] [Search] | | | | General Information |
| DEVICE | Customer ID | Customer Name | | Work Phone | Name: Li Liu    Customer ID: PSCIT540301 |
| CUSTOMERS | ⦿ PSCIT540301 | Li Liu | | 408-999-8888 | Customer Since 07/11/1999 |
| General Infor | ○ PSCIT540302 | Ian-Locke | | 408-999-8888 | Address:1234 ABC Street, San Jose, CA 9999 |
| Sub Acct & Vault ▶ | ○ PSCIT540303 | Joe Y Cao | | 408-999-8888 | Phone:408 –904-1286(work)  408-999-9999(home) |
| Notes | ○ PSCIT540304 | Peed Majors | | 408-999-8888 | Email: lliu@minervanetworks.com |
| | ○ PSCIT540305 | Jeare-Gecages Fritsch | | 408-999-8888 | Vault Information: |
| LIVE ASSETS | ○ PSCIT540306 | Brian Zhou | | 408-999-8888 | 03/01/00 5:27p rent Movie A rent length:2 weeks    Y Amy |
| STORED ASSETS | ○ PSCIT540307 | Bob Even | | 408-999-8888 | 03/04/00 5:27p sch Movie B record space 2:00hr    Y Parent |
| BILLING | ○ PSCIT540308 | Bill Smith | | 408-999-8888 | 03/04/00 5:27p sch Movie B record space 2:00hr    Y Johny |
| SERVICE & PRICING | ○ PSCIT540303 | Joe Y Cao | | 408-999-8888 | 03/04/00 5:27p sch Movie C record space 2:00hr    N Johny |
| System Setup | ○ PSCIT540304 | Peed Majors | | 408-999-8888 | 03/04/00 5:27p sch Movie B record space 2:00hr    Y Parent |
| LOG OFF | ○ PSCIT540305 | Jeare-Gecages Fritsch | | 408-999-8888 | 03/04/00 5:27p sch Movie C record space 2:00hr    N Parent |
| | ○ PSCIT540306 | Brian Zhou | | 408-999-8888 | Secondary Account |
| SYSTEM STATISTICS | ○ PSCIT540307 | Bob Even | | 408-999-8888 | Acct 1: Login:Amy         Password:abcd    Pin: 1234 |
| Customers  1834 | ○ PSCIT540308 | Bill Smith | | 408-999-8888 | AccessLevel: PG13    VOD Limit:$20    NVOD Limit:$20 |
| Video Stored 573hrs | | | | ↙ 1202 | Email:Enable    Record:Disable    Internet:Enable |
| Live Channels  85 | [Next Page >>] | | | | Acct 1: Login:Johny    Password:abcd    Pin: 1234 |
| Bandwidth  4.3Gb/s | Number of remaining channels in this view:10 | | | | AccessLevel: PG13    VOD Limit:$20    NVOD Limit:$20 |
| ADMIN ASSISTANCE | [Add Customer] [Del Customer] [Edit Customer] | | | | Email:Enable    Record:Disable    Internet:Enable |
| The device window is used to add and administer STB device Information. Mac Address details are entered with serial Numbers and customer details | | | | | Admi Attention: |
| | | | | | Subscribing Service Change Request  Yes |
| | | | | | Un-closed Customer Notes  2          ↙ 1210 |
| | | | | | Exceed Usage Warning   No           ↙ 1212 |

Minerva Networks

MEDIA DEMON

- ADMINISTRATION
- DEVICE
- CUSTOMERS
  - General Infer
  - Sub Acct & Vault
  - Notes ▲
- LIVE ASSETS
- STORED ASSETS
- BILLING
- SERVICE & PRICING
- System Setup
- LOG OFF

SYSTEM STATISTICS
Customers 1834
Video Stored 573hrs
Live Channels 85
Bandwidth 4.3Gb/s

ADMIN ASSISTANCE
The device window is Used to add and Administer STB device Information. Mac Address details are entered with serial Numbers and customer details

802

CUSTOMER LIST

Find a Customer by [Customer ID# ▼]
Search by [1] [Search]

| Customer ID | Customer Name | Work Phone |
|---|---|---|
| ●PSCIT540301 | Li Liu | 408-999-8888 |
| ○PSCIT540302 | Ian-Locke | 408-999-8888 |
| ○PSCIT540303 | Joe Y Cao | 408-999-8888 |
| ○PSCIT540304 | Peed Majors | 408-999-8888 |
| ○PSCIT540305 | Jeare-Gecages Fritsch | 408-999-8888 |
| ○PSCIT540306 | Brian Zhou | 408-999-8888 |
| ○PSCIT540307 | Bob Even | 408-999-8888 |
| ○PSCIT540308 | Bill Smith | 408-999-8888 |
| ○PSCIT540303 | Joe Y Cao | 408-999-8888 |
| ○PSCIT540304 | Peed Majors | 408-999-8888 |
| ○PSCIT540305 | Jeare-Gecages Fritsch | 408-999-8888 |
| ○PSCIT540306 | Brian Zhou | 408-999-8888 |
| ○PSCIT540307 | Bob Even | 408-999-8888 |
| ○PSCIT540308 | Bill Smith | 408-999-8888 |

[Next Page >>]

Number of remaining channels in this view:10

1202

---

Customer 5

Add Customers

NAME: First [Li] Middle [ ] Last [Liu]

ADDRESS: Street [1234 ABC Street]
City [San Jose] State [CA]
Work [408-999-8888] Home [ ]
Email [Lliu@minervantworks.co]
Login Required [✓] Social Security No [999-99-9999]

ACCOUNT: Credit Date [ ] Effective Date [ ] Expire Date [ ]
Credit Rate [ ] Override CreditRate [ ] Credit Prove By [ ]
Payment Method [ ] Credit Card Type [ ]
Card No: [ ] Expiration [ ]
Card Hold Name [ ]

SERVICES: Cust ID [PSCIT540301] Status [N ▼]
Passwd [adasd] Login [asda]
Effective Date [12/15/1999] Pin [1234]
Expire Date [ ]

Live Channels [Basic / Sports / HBO] Internet Access ☐ Record Duration [3 hrs ▼]
Pause TV ☐

[Customize Service] 1244

1242

1240

[ADD] [DONE]

Fig. 12F

CUSTOMER LIST

Find a Customer by [Customer ID#▼]
Search by [1] [Search]

| Customer ID | Customer Name | Work Phone |
|---|---|---|
| ● PSCIT540301 | Li Liu | 408-999-8888 |
| ○ PSCIT540302 | Ian-Locke | 408-999-8888 |
| ○ PSCIT540303 | Joe Y Cao | 408-999-8888 |
| ○ PSCIT540304 | Peed Majors | 408-999-8888 |
| ○ PSCIT540305 | Jeare-Gecages Fritsch | 408-999-8888 |
| ○ PSCIT540306 | Brian Zhou | 408-999-8888 |
| ○ PSCIT540307 | Bob Even | 408-999-8888 |
| ○ PSCIT540308 | Bill Smith | 408-999-8888 |
| ○ PSCIT540303 | Joe Y Cao | 408-999-8888 |
| ○ PSCIT540304 | Peed Majors | 408-999-8888 |
| ○ PSCIT540305 | Jeare-Gecages Fritsch | 408-999-8888 |
| ○ PSCIT540306 | Brian Zhou | 408-999-8888 |
| ○ PSCIT540307 | Bob Even | 408-999-8888 |
| ○ PSCIT540308 | Bill Smith | 408-999-8888 |

[Next Page >>]

Number of remaining channels in this view: 10 — 1202

Customer 6

Edit Selected Customers
Login Required ☑

General Information
- First [Li] Middle [ ] Last [Liu]
- Street [1234 ABC Street] Street [ ]
- City [San Jose] State [CA]
- Work [408-999-8888] Home [ ]
- Email [Liu@minervanetworks.co] Social Security No [999-99-9999]

Account Information: AccountStatus: [N ▼]
- Effective Date [ ] Expire Date [ ]
- Credit Rate [ ] Over CreditRate [ ] Credit Prove By [ ]
- Payment Method [ ] Credit Card Type [ ]
- Card No: [ ] Expiration [ ]
- Card Hold Name [ ]

Service Information: — 1252
- Current Service Description: Subscription Service Package; undefined
- Request New Service Description: Customized Service Includes:
  Live Channels: Basic, HBO,
  Media on Demand Package: VOD Package 1,
  Pause TV Duration: 20hrs
  Internet Access Enabled Request Date [03/15/2000] Request Effective Date [04/01/2000]
Approve ☑ ↙ 1250
[CANCEL] [UNCHANGE] [DONE]

---

Minerva Networks
MEDIA DEMON

ADMINISTRATION
DEVICE
CUSTOMERS
  General Infor ▲
  Sub Acct & Vault
  Notes
LIVE ASSETS
STORED ASSETS
BILLING
SERVICE & PRICING
System Setup
LOG OFF

SYSTEM STATISTICS
Customers 1834
Video Stored 573hrs
Live Channels 85
Bandwidth 4.3Gb/s

ADMIN ASSISTANCE
The device window is used to add and Administer STB device Information.
Mac Address details are entered with serial Numbers and customer details

CUSTOMER LIST — Customer 7

Minerva Networks — MEDIA DEMON

Sidebar (802):
- ADMINISTRATION
- DEVICE
- CUSTOMERS
  - General Infor
  - Sub Acct & Vault ▲
  - Notes
- LIVE ASSETS
- STORED ASSETS
- BILLING
- SERVICE & PRICING
- System Setup
- LOG OFF
- SYSTEM STATISTICS
  - Customers 1834
  - Video Stored 573hrs
  - Live Channels 85
  - Bandwidth 4.3Gb/s
- ADMIN ASSISTANCE
  The device window is Used to add and Administer STB device Information. Mac Address details are entered with serial Numbers and customer details

Find a Customer by [Customer ID# ▼]  Search by [1] [Search]

| Customer ID | Customer Name | Work Phone |
|---|---|---|
| ⦿ PSCIT540301 | Li Liu | 408-999-8888 |
| ○ PSCIT540302 | Ian-Locke | 408-999-8888 |
| ○ PSCIT540303 | Joe Y Cao | 408-999-8888 |
| ○ PSCIT540304 | Peed Majors | 408-999-8888 |
| ○ PSCIT540305 | Jeare-Gecages Fritsch | 408-999-8888 |
| ○ PSCIT540306 | Brian Zhou | 408-999-8888 |
| ○ PSCIT540307 | Bob Even | 408-999-8888 |
| ○ PSCIT540308 | Bill Smith | 408-999-8888 |
| ○ PSCIT540303 | Joe Y Cao | 408-999-8888 |
| ○ PSCIT540304 | Peed Majors | 408-999-8888 |
| ○ PSCIT540305 | Jeare-Gecages Fritsch | 408-999-8888 |
| ○ PSCIT540306 | Brian Zhou | 408-999-8888 |
| ○ PSCIT540307 | Bob Even | 408-999-8888 |
| ○ PSCIT540308 | Bill Smith | 408-999-8888 |

[Next Page >>]  — 1202

Number of remaining channels in this view: 10

---

Edit Selected Customers

General Information
- Nam: Li Liu    Customer ID: PSCIT540301
- Customer Since 07/11/1999
- Address: 1234 ABC Street, San Jose, CA 9999
- Phone: 408-904-1286(work)   408-999-9999(home)
- Email: lliu@minevanetworks.com

Vault Information
```
03/01/00 5:27p rent Movie A rent length:2 weeks    Y Amy
03/04/00 5:27p sch Movie B record space 2:00hr     Y Parent
03/04/00 5:27p sch Movie B record space 2:00hr     Y Johny
03/04/00 5:27p sch Movie C record space 2:00hr     Y Johny
03/04/00 5:27p sch Movie B record space 2:00hr     N Parent
03/04/00 5:27p sch Movie B record space 2:00hr     Y Parent
03/04/00 5:27p sch Movie C record space 2:00hr     N Parent
```
— 1262

Secondary Information — 1260
- Login [Amy ▼]   ☑ PassWord [     ]   Pin [1234]
- Access [     ]   VDD Limit [     ]   Nvod Limit [     ]
- Email ☐   Record ☐   Internet ☐

[CANCEL] [UNCHANGE] [DONE]
[DEL ACCT] [DEL VAULT]

| Minerva Networks | DEVICE LIST | | | | | Device 3 |
|---|---|---|---|---|---|---|
| MEDIA DEMON | Find a Customer by [Serial Number ▼] | | | | | |
| ADMINISTRATION | Search by [PWW00] [Search] | | | | | |
| DEVICE | | | | | Assign to | |
| CUSTOMERS | Device ID | Serial Number | Status | | (CustomerID) | |
| LIVE ASSETS | ⦿ 0 | PWW0023G4372 | On | | PSCIT540301 | |
| STORED ASSETS | ○ 1 | PWW0023G1234 | On | | PSCIT540302 | |
| BILLING | ○ 2 | PWW0023G5678 | On | | PSCIT540303 | |
| SERVICE & PRICING | ○ 3 | PWW0023G6543 | On | | PSCIT540304 | |
| System Setup | ○ 4 | PWW0023G4321 | On | | PSCIT540305 | |
| LOG OFF | ○ 5 | PWW0023G2468 | On | | PSCIT540306 | |
| | ○ 6 | PWW0023G2469 | On | | PSCIT540307 | |
| | ○ 7 | PWW0023G2470 | On | | PSCIT540308 | |
| | ○ 0 | PWW0023G4372 | On | | PSCIT540301 | |
| | ○ 1 | PWW0023G1234 | On | | PSCIT540302 | |
| | ○ 2 | PWW0023G5678 | On | | PSCIT540303 | |
| | ○ 5 | PWW0023G2468 | On | | PSCIT540306 | |
| | ○ 6 | PWW0023G2469 | On | | PSCIT540307 | |
| | ○ 7 | PWW0023G2470 | On | | PSCIT540308 | |

[Next Page >>]  1302

Number of remaining channels in this search:9

[Assign/Edit Device] [Add Device] [Unassign Device] [Del Device]

---

ADD DEVICE

Serial Number: [PWW0023G4372]
MAC Address: [MAC2483473741]
IP Address: [274.145.189.146]
Switch Port ID: [1]    Port: [ ]
Model: [PACE4000]
Status: ⦿ Off ○ On Click Radio Button On to Turn On Now
Schedule Turn On Date: [06/01/2000] [12:00 pm]
Schedule Turn Off Date: [ ]
Customer Who Need Device                          1342

Find a Customer by [Customer ID# ▼]
Search by [ ]                    [Search]          1344

| Customer ID | Customer Name | Work Phone | Home Phone |
|---|---|---|---|
| ⦿ PSCIT540301 | Li Liu | 408-999-9999 | 408-999-9999 |
| ○ PSCIT540302 | Lan Locke | 408-999-9999 | 408-999-9999 |
| ○ PSCIT540303 | Joe Y Cao | 408-999-9999 | 408-999-9999 |
| ○ PSCIT540304 | Reed Majors | 408-999-9999 | 408-999-9999 |
| ○ PSCIT540307 | Bob Even | 408-999-9999 | 408-999-9999 |
| ○ PSCIT540308 | Bill Smith | 408-999-9999 | 408-999-9999 |

[Next Page >>]
Number of remaining channels in this search:10

[Add Next] [Done] [Cancel]

1340

---

SYSTEM STATISTICS
Customers        1834
Video Stored     573hrs
Live Channels    85
Bandwidth        4.3Gb/s ADMIN ASSISTANCE
The device window is
Used to add and
Administer STB device
Information.
Mac Address details
are entered with serial
Numbers and customer
details

Billing2

*Fig. 14B*

PSCT Inc Billing Statement
(April, 2000)

Li Liu
1234 ABC Street
San Jose, CA90000

Customer ID: PSCIT540301   Invoice No:12345
Outstand Balance: $30   Billing Date: April 14, 2000
Amount Due: $10   Payment Due: May 10, 2000

Moview Rental:

| Movie | Rent Date | Charge |
|---|---|---|
| Alien Resurrection | Dec 31, 1999 3:00pm | $1.50 |
| Copycat | Jan 1, 2000 3:50pm | $1.50 |
| Cruel Intentions | Feb 24, 2000 4:00am | $1.00 |
| Platoon | Feb 27, 2000 3:00pm | $1.50 |
| Gone with Wind | Mar 1, 2000 1:00pm | $1.00 |
| Movie G | Mar 2, 2000 1:00pm | $1.95 |
| Movie H | Mar 3, 2000 1:00pm | $1.00 |
| Movie H | Mar 5, 2000 1:00pm | -$1.00 |
| Movie h | Mar 6, 2000 1:00pm | $2.00 |
| Movie K | Mar 6, 2000 1:00pm | $2.00 |
| Movie L | Mar 6, 2000 1:00pm | $2.00 |
| NVOD 1 Movie: American Beauty | Mar 7, 2000 1:00pm | $2.00 |
| Movie N | Mar 7, 2000 1:00pm | $2.00 |
| Movie O | Mar 8, 2000 1:00pm | $2.00 |
| Subtotal: | | $20.45 |

Services:

| Service | Service Date | Charge |
|---|---|---|
| Bronze | Monthly | $29.95 |
| Live Channels | Monthly | $4.00 |
| Artists' Specials | Mar 1, 2000 1:00pm | $1.95 |
| Subtotal: | | $35.90 |

Other

Print Report | Save to file | Close

Billing3

Monthly Report
(April, 2000)

| | |
|---|---|
| Li Liu | Customer ID:PSCIT540301  Invoice No: 12345<br>Outstand Balance: $30  Billing Date: April 14, 2000<br>Amount Due:$10  Payment Due: May 10, 2000 |
| Joe Cao | Customer ID:PSCIT540301  Invoice No: 12345<br>Outstand Balance: $30  Billing Date: April 14, 2000<br>Amount Due:$10  Payment Due: May 10, 2000 |
| Reed Najors | Customer ID:PSCIT540301  Invoice No: 12345<br>Outstand Balance: $30  Billing Date: April 14, 2000<br>Amount Due:$10  Payment Due: May 10, 2000 |
| Ian Locke | Customer ID:PSCIT540301  Invoice No: 12345<br>Outstand Balance: $30  Billing Date: April 14, 2000<br>Amount Due:$10  Payment Due: May 10, 2000 |
| Jean-Georges | Customer ID:PSCIT540301  Invoice No: 12345<br>Outstand Balance: $30  Billing Date: April 14, 2000<br>Amount Due:$10  Payment Due: May 10, 2000 |
| Li Sasaki | Customer ID:PSCIT540301  Invoice No: 12345<br>Outstand Balance: $30  Billing Date: April 14, 2000<br>Amount Due:$10  Payment Due: May 10, 2000 |

| Print Report | Save to file | Close |

*Fig. 14C*

METHOD AND SYSTEM FOR DELIVERING MEDIA SERVICES AND APPLICATION OVER NETWORKS

CROSS-REFERENCE TO RELATED APPLICATIONS

This application is related to (i) U.S. patent application Ser. No. 09/585,707 (MINEP001), filed May 31, 2000, and entitled "METHOD AND SYSTEM FOR PAUSING AND REPLAYING SCHEDULED MEDIA RICH BROADCASTS", the content of which is hereby incorporated by reference; and (ii) U.S. patent application Ser. No. 09/586,247, filed May 31, 2000, and entitled "METHOD AND SYSTEM FOR RECORDING SCHEDULED PROGRAMS WITHOUT LOCAL RECORDING EQUIPMENT", the content of which is hereby incorporated by reference.

BACKGROUND OF THE INVENTION

1. Field of the Invention

The present invention is generally related to media broadcasting and, more particularly, to multimedia delivery systems for delivering media to subscribers over networks.

2. Description of the Related Art

The Internet is a rapidly growing communication network of interconnected computers around the world and is penetrating into every household in the United States and many other countries in the world. Together, these millions of connected computers form a vast repository of multimedia information that is readily accessible by users through any of the connected computers from anywhere at anytime. Multimedia information that is commonly available and deliverable via the Internet may include text information, images (or graphics), video and audio.

Continuous media information such as video and audio content are often the most demanded resources over the Internet. Delivery of such information over the Internet provides many advantages and benefits that cannot be matched by current television cable systems or broadcasting over the air. Given the vast accessibility of the Internet to the general population, many service providers or content providers are starting to broadcast continuous media programs over the Internet.

Users are, however, overwhelmed with the numerous media programs available through the Internet, cable or satellite systems. Recently, localized media service providers have consolidated some of the available programs and redelivered them with locally composed programs to their subscribers as value added services providers. One of the problems the media service providers face is how to efficiently control delivery and management of media services given the many variations that are presented. Media programs are typically received at media service providers from different sources and in different formats. For example, media programs can be received from the s transmissions, the over-the-air broadcasting, the wired cable systems, or private or public networks. The sources may include analog or digital formats. Examples of the digital formats are MPEG (e.g., MPEG1, MPEG2, MPEG4, MPEG7), QuickTime, and the like). Delivering media programs to subscribers when these programs are received in different forms from various different sources poses tremendous challenges to the media service providers. At the same time, the end playing equipment has to be sophisticated enough to accommodate all forms of incoming media signals. As a result, many existing service providers can only provide limited media programs and services to its subscribers.

Generally, the media service providers have to be equipped with many different media management tools to manage, schedule, and deliver the media programs from the various different sources, and thus presents significant overhead and complications to the service provider. In addition, different media service providers desire to provide different programming to their own subscribers. Further, a media service provider may desire to deliver different programming to different sets of subscribers. For example, a media service provider might desire to deliver digital media programs to employees in a corporation while, at the same time, desire to deliver cable television (TV) programs to homes. Generally, two different conventional media management systems are needed to manage and deliver such different media programs. Moreover, whenever there is a change to the services being provided or the format of the media being received or delivered, the media management systems would have to be reconfigured and possibly with new equipment added. The lack of flexibility in configuration and management of conventional media management systems has significantly hindered the ability of the server providers to provide programs in various forms over different mediums and flexible customer service packages.

Thus, there is a need for improved approaches to configuration, management and operation of a media delivery system.

SUMMARY OF THE INVENTION

Broadly speaking, the invention relates to improved approaches to configuration, management and operation of a media delivery system. The media delivery system centrally manages and stores media content and also controls the delivery of media content to subscribers.

According to one aspect of the invention, an administrator can control program scheduling, rates, service packages and system configuration for a media delivery system as well as provide access control to subscriber accounts by corresponding subscribers for desired selected services. Additionally, the administrator may also control billing, transaction monitoring, and customer relations. According to another aspect of the invention, the media delivery system provides subscribers with centrally managed storage for paused or recorded media. Still another aspect of the invention is that the media delivery system can restrict various administrators to different modules of the media delivery system. Yet another aspect of the invention is that services provided by the media delivery system can be restricted differently for different users of a common subscriber account.

The invention can be implemented in numerous ways, including as a method, system, device, or computer readable medium. Several embodiments of the invention are discussed below.

As a media delivery center for delivery of media to users over a network, one embodiment of the invention includes at least: a media receiving unit, the media receiving unit being configured to receive media from one or more media sources; a media storage device, the media storage device being configured to store at least certain of the media being received by the media receiving unit; a media management unit operatively connected to the media receiving unit and the media storage device, the media management unit being configured to manage reception of the media from the one or more media sources, storage of at least the certain of the media in the media storage device, scheduling delivery of media from the media storage device to users; and media delivery hardware operatively connecting the media management unit to the network to facilitate the delivery of media from the media storage device to users.

As a method for delivery media content from a central location to multiple subscribers, one embodiment of the invention includes at least the operations of: configuring subscribers to receive delivery of media content; setting service packages and pricing options make available to users; storing the media content for various television programs or movies in a central media store; multicasting or unicasting certain of the stored media content to one or more of the subscribers.

As a method for delivery media programs from a central location to multiple subscribers, another embodiment of the invention includes at least the operations of: configuring subscribers to receive delivery of a selected set of the media programs over a network, wherein the media programs are received from different sources and different formats; setting service packages respectively for each of the users; reformatting the media programs to one or more predefined formats suitable for transporting over the network; storing the media programs in a central media store; and delivering a selected set of the media programs in the central media store over the network to one or more of the subscribers.

As a media delivery center for delivery of media to users over a network, one embodiment of the invention includes: a media receiving unit, the media receiving unit being configured to receive the media in a first format from one or more media sources; a media platform, coupled to the media receiving unit and receiving the media therefrom, transforming the media a second format suitable for transporting over the network; a media storage device coupled to the media platform, the media storage device being configured to store at least certain of the transformed media from the media platform; and a media management server, coupled to the media platform, configured to control the media platform how to transform the received media in the first format to the second format so that the transformed media can be optimally delivered over the network to the users.

The advantages of the invention are numerous. Different embodiments or implementations may yield one or more of the following advantages. One advantage of the invention is that a media system has integrated various services for the benefit of administrators and service providers. Another advantage of the invention is that the media system has a flexibile design that can be customized to fit service providers business needs. Still another advantage of the invention is that the media system is a centralized system that can support both live and on-demand services for many subscribers. Yet another advantage of the invention is that the media system has a flexible design that can enable subscribers to customized their program guides, services packages (including pause and record services), and the like.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which:

FIG. 1A illustrates a media delivery system in which the invention can be practiced;

FIG. 2A is a block diagram of a media delivery center according to one embodiment of the invention;

FIG. 2C shows a corresponding cache memory configuration for rolling feeding four live broadcasts;

FIG. 2D shows an undated cache memory configuration due to a new live broadcast being fed into the cache memory;

FIG. 3B is a block diagram of a VNP device that is alternatively referred to as a codec or simply encoding device;

FIGS. 3C–3F show respectively exemplary interactive screen shots from which an operator can manage/control the operations of VNP devices employed in a medial delivery center;

FIG. 5B illustrates an exemplary program guide according to one embodiment of the invention;

FIGS. 8A–8E illustrate a series of screens associated with a system setup module;

FIGS. 9A–9F illustrate a series of screens associated with a service and pricing module;

FIGS. 10A–10E illustrate a series of screens associated with a stored asset management module;

FIGS. 11A–11G illustrate a series of screens associated with a live asset management module;

FIGS. 12A–12H illustrate a series of screens associated with a customer management module;

FIGS. 13A–13C illustrate a series of screens associated with a device module;

FIGS. 14A–14C illustrate a series of screens associated with a billing module;

DETAILED DESCRIPTION OF THE INVENTION

Figure 1B:
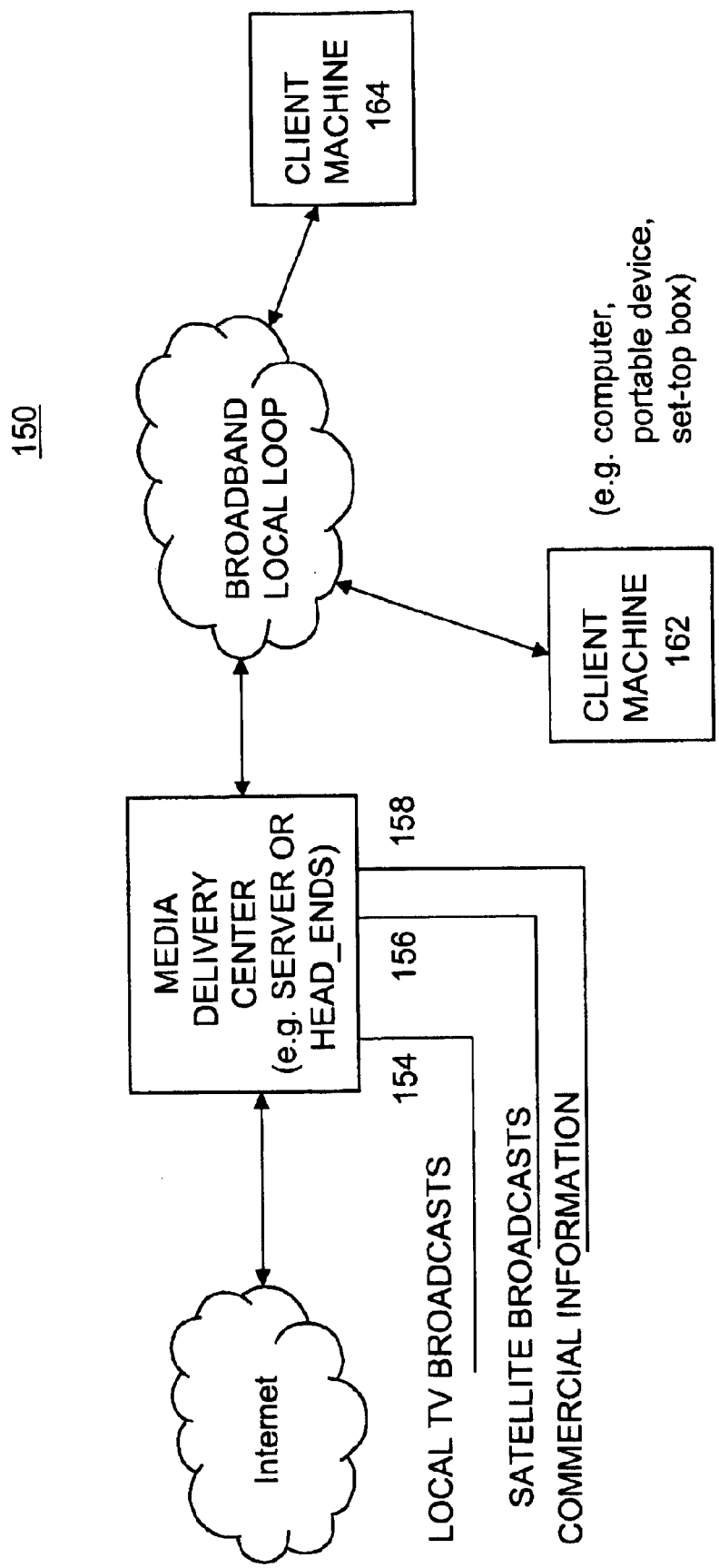
FIG. 1B is a block diagram of a data delivery system according to one embodiment of the invention.

The invention relates to improved approaches to management and operation of a media delivery system. The media delivery system centrally manages and stores media content and also controls the delivery of media content to subscribers.

According to one aspect of the invention, the media delivery system can receive media programs in different forms and be configured to redeliver the media programs to its subscribers in one or more predefined forms suitable to subscriber's needs, delivery mediums and other factors. According to another aspect of the invention, the media delivery system can be readily configured to meet the needs and business objectives of a media service provider. For example, an administrator can control program scheduling, rates, service packages and system configuration for a media delivery system. Additionally, the administrator may also control billing, transaction monitoring, and customer relations.

According to still another aspect of the invention, the media delivery system can be configured to deliver Internet services and provide a mechanism for subscribers to navigate the vast resources available on the Internet and exchange audio/video/text/image (e.g., via electronic mails) with others. Still another aspect of the invention is that the media deliver system can receive commercial information and can be configured to customize the commercial information for delivery to suitable subscribers. For example, the system can be configured to incorporate commercial information with a particular program being viewed to create an impulsive sale opportunity. Further, the popularity of a program among its subscribers can be reported by the system to the producer of the program by monitoring and analyzing respective status of each of the subscribers.

According to still another aspect of the invention, the media delivery system provides subscribers with centrally managed storage for paused or recorded media so that a subscriber can subsequently retrieve the retained media from any device that can be configured to access to the system. Still another aspect of the invention is that the media delivery system can provide different level of services to designated accounts in a general account so that miners assigned to the designated accounts will access only appropriate services while adults under the general account receive full services and possibly monitor the designated accounts. Yet another aspect of the invention is that services provided by the media delivery system can be restricted differently for different users of a common subscriber account.

The detailed description of the invention is presented largely in terms of procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of this aspect of the invention are discussed below with reference to FIGS. 1A–16C. However, those skilled in the art will readily appreciate that the detailed description given herein with respect to these figures is for explanatory purposes as the invention extends beyond these limited embodiments.

FIG. 1A illustrates a media delivery system 100 in which the invention can be practiced. Media contents are provided by one or more media sources (content providers or producers) 102. Examples of media sources include broadcast stations, satellite receivers, television relay stations, and Internet sites that provide continuous media data over the Internet. The media delivery system 100 comprises one or more servers 106 coupled together, of which only one is shown in FIG. 1A. The server 106, typically operated by, a service provider, IP media provider, broadcaster or a media deliver center, can also be referred to as media head-ends. The server 106 can provide continuous media services, such as live transmission, video-on-demand and audio-on-demand, to its subscribers. The server 106 can also provide video/audio mail services, Internet access, and commercial information to its subscribers.

To facilitate the description of the invention, it is assumed below that the media source 102 delivers video programs and the server 106 is configured to provide video services to its subscribers (users). As noted above, it should be recognized that the media source 102 is not limited to delivering or supplying video programs. Those skilled in the art will understand that the description herein can be equally applied to other continuous media forms.

The server 106 communicates with the media source 102 through a delivery agent 104. Depending on implementation, the delivery agent 104 can, for example, represent a receiver, a data network, a transcoder (encoder and decoder), or a converter. When the media source 102 is a satellite dish, a broadcasting or relay station, then the delivery agent 104 includes a receiver which receives television (TV) signals that are often in a form that may need to be processed by a transcoder. Generally, such TV signals are in an analog format. Hence, the delivery agent 104 can include an encoder that digitizes the TV signals and converts the digitized TV signals to a digital format so that the signals can be further processed, stored, and redelivered over a network 108.

On the other hand, when the media source 102 is a network video resource over a data network (e.g., the Internet), the delivery agent 104 may be simply part of the data network or may include a converter. Sometimes, a network video resource provided by a service or content provider is in a different form than the one used by the media deliver center to deliver the program to its subscribers. For example, a program received from the producer is in MEPG 2 while the redelivery format is in MPEG 2 or 4 and thus the received program may/may not be converted depending on the version of the MPEG format.

As described above, the media source 102 may take one of the many available video resources and supply it to the server 106 in an appropriate format via the delivery agent 104. In the following description, unless otherwise specifically required, the server 106 receives one or more appropriate video sources, typically in digital format, via the delivery agent 104 from the media source 102.

The network 108 couples the server 106 to a terminal device 110. The network 108, also referred to herein as a communication medium or a subscriber channel, can be part of a larger network including the Internet, the public switch telephone network (PSTN) or a private telephone network, a public/private data network, or a wireless network. Through the network 108, the terminal device 110 can receive video services provided by the server 106. Although only one terminal device 110 (also referred to as client machine) is illustrated in FIG. 1A, it should be understood that the server 106 typically supports many terminal devices 110 of subscribers. Examples of the terminal device 110 may include a desktop computer, a laptop or notebook computer, a set-top box, and a mobile device. In one embodiment, the terminal device 110 (utilized by one or more subscribers or users) can be coupled to the network 108 by way of a circuit-switched or packet-switched connection. The network 108 can use one or more different transmission mediums, such as a telephone network, a broadband network (e.g., ATM or SONET, optical, xDSL or copper wiring), etc. It is, however, useful that the transmission mediums have high bandwidths to support delivery of media-rich content and the quality of service (QoS) thereof.

FIG. 1B is a block diagram of a data delivery system 150 according to one embodiment of the invention. The data delivery system 150 can represent one embodiment of the media delivery system 100 illustrated in FIG. 1A. The data delivery system 150 includes a video delivery center 152 that controls the delivery of video content. The video delivery center 152 receives media-rich broadcasts, such as television or video, from various sources. As shown in FIG. 1B, the video delivery center 152 can receive local TV broadcasts 154 and satellite broadcasts 156. The video delivery center 152 can also receive commercial information 158 that may be in video, audio or images forms. In addition, the video delivery center 152 can couple to the Internet 158 and thereby also receive Internet broadcasts at the video delivery center 152. Regardless of the sources of the media-rich broadcasts or programs received therefrom, the media-rich content (e.g., video content) thereof is stored in the video delivery center 152. If desired, the media-rich broadcasts or programs can be initially converted, if required, to one or more predefined formats and stored in the video delivery center 152, preferably in a digital form. Depending on an agreement between the video delivery center 152 and the producers of the programs, the retention of the programs in the video delivery center 152 may be based on a rolling feeding, temporary catching or long-term storage, which will be further explained below. According to one embodiment, the video delivery center 152 operates to receive the different types of broadcasts and to formulate them into digital content data that is subsequently streamed as scheduled or on-demand broadcasts to various clients.

To distribute the scheduled or on-demand programs from the video delivery center 152, the video delivery center 152 couples through a broadband local loop 160 to client machines 162 and 164. Although only two client machines 162 and 164 are shown in FIG. 1B, the video delivery center 152 can support many client machines. Examples of client machines include personal computers, portable computers, Personal Digital Assistants (PDAs), set-top boxes, handheld computers, etc. In one embodiment, the video delivery center 152 is provided in a local region and able to couple to the broadband local loop 160 and thus has access to the client machines 162 and 164. The broadband local loop 160 offers broadband network access between the video delivery center 152 and the client machines 162 and 164. For example, the broadband local loop 160 can use one or more of xDSL, ATM, SONET, fiber optic lines, PSTN, or CAT-5. Similarly, the video delivery center 152 can also receive videos from one or more the client machines and forward the videos to destinations specified by the user. Further, the video delivery center 152 can permit the users to navigate the resources over the Internet.

FIG. 2A is a block diagram of a media delivery center 200 according to one embodiment of the invention. The media delivery center 200 represents the principal, centrally-located components of the media system. The media delivery center 200 includes a media receiving unit 202 that receives incoming media content from various media sources. The media sources include, but are not limited to, a media provider (MP), a television (TV) broadcast, a satellite dish (SD), the Internet (IN), and a commercial provider (CP). The media receiving unit 202 operates to receive the media content from the various media sources and perform encoding and/or transformation operations to present the media content in a digital form in accordance with a communication protocol used for communications between the media delivery center 200 and the client machines. Typically, the resulting media content is in a digital format that may be one of various compressed formats (i.e., MPEG).

The media delivery center 200 also includes a media management unit 204. The media management unit 204 receives the digital media content from the media receiving unit 202 and serves to manage the delivery and storage of the media content through use of a media management system 205. The media management unit 204 can support live delivery, Near Video On-Demand (NVOD) delivery, or Media On-Demand (MOD) to subscribers over a network. In this regard, the media management unit 204 can store media content in a media storage device 206. In one embodiment, the media storage device 206 is a file server or a large database. In another embodiment, the media storage device 206 is a video server. The media content stored in the media storage device 206 can be streamed or delivered to subscribers over the network by media delivery hardware 208. As noted above, the media content can be streamed or delivered as live, nearly on-demand, or on-demand. The media delivery hardware 208 can stream or deliver the media content to subscribers over the network using one or more of unicast, multicast and broadcast approaches.

The media management unit 204 can also be readily configured by a media service provider (e.g., administrator or operator) to meet its own needs and business objectives. An administrator can configure the channels, rates, schedules and the like for the overall media system. As will be further described below, the administrator through interaction with the media management system 205 can place certain programs in a set of predefined channels, manage program schedule, package different service packages, administrate subscriber accounts, monitor popularity of certain programs, manage proper delivery of commercial information related to programs or subscribers, etc. In other words, the media management unit 204 allows an administrator of the media system to customize the media system to their particular business needs. Hence, the media delivery center 200 allows for the providing and management of media services to subscribers over the network.

Figure 2B:
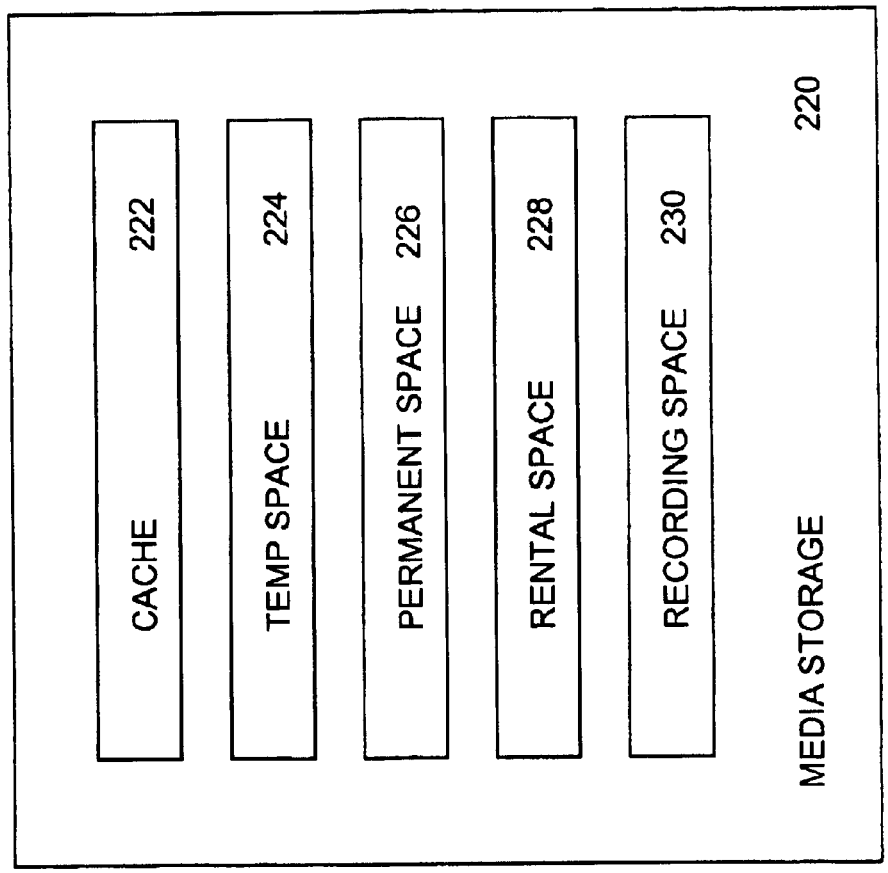
FIG. 2B shows an exemplary storage configuration to facilitate the efficient operations of the media delivery center.

The media storage device 206 facilitates the operations of the media delivery center by providing storage space to cache or store the video sources received from the media receiving unit 202. The storage spaces may include a cluster of video servers or stacks of optical or magnetic storage discs, each being labeled accordingly and accessible when contents stored therein are to be delivered. FIG. 2B shows one configuration of a media storage 220 in which a cache area 222, a temporary space 224, a permanent storage space 226, a rental space 228 and a recording space 230 are respectively allocated. The cache area 222 provides a mechanism to buffer the received live video broadcasts (i.e., live assets) for broadcasting to subscribers of the video delivery center. The temporary space 224 provides spaces for the video delivery center to store data for temporary uses, such as a short-term program guide, commercial information, latest programs available for video-on-demand, or any programs that will be deleted after broadcast. The permanent space 226 is typically used by the video delivery center to store assets owned by the video delivery center, the assets may include purchased movies or other videos available to the subscribers for a fee. To provide the flexible use of the services, the rental space 228 is provided to certain subscribers for their own use and storage of content therein. Examples of the uses of the personalized rental space may include temporary storage of a paid movie that can be made available by the subscriber and/or his/her designated viewers, a personal video library, a personal journal, a calendar, address books and video bookmarks. The recording space 230 is reserved for some programs that may be popular among subscribers. For later retrieval or viewing of the programs, some of the subscribers may request a part or whole of the programs be recorded (e.g., through pause or record requests). To efficiently use the storage 220, the recording space 230 is storing such programs for a limited time, typically charging a fee for the use of the space.

Sometimes a viewer wants to review a certain past portion of a live program being broadcast. To facilitate the replay of a past portion of a live program that is being broadcast or an entire live program that has already been broadcast, a portion of the cache area 222 can be configured to dynamically fit the length of a plurality of programs. FIG. 2C shows that a cache memory portion 240 of the cache area 222 can be dynamically configured to accommodate each of programs being cached according to one embodiment of the invention. While the cache area 222 is receiving the live feed (broadcast) from the media receiving unit 202, depending on the length of each of the programs, the cache memory portion 240 is intelligently segmented to buffer content (data) of the programs as it arrives. As shown in FIG. 2C, according to one example, there are four programs P1, P2, P3 and P4 being cached while the program P4 is in progress of being broadcast. The memory spaces 242, 244, 246 and 248 are respectively allocated to buffer the entire programs P1, P2, P3 and P4. If a user desires to roll back (i.e., replay) any of the programs, the memory portion 240 can provide the data to be transmitted to the user such that the user can view the programs offset from its broadcast. When a new program P5 arrives as shown in FIG. 2D, rather than squeezing in the new program in a limited free space, the memory portion 240 can be dynamically reconfigured to remove (i.e. drop) the program P1 in a predefined logic (e.g., first-in-first-out) from the cache memory portion 240 to accommodate the entire program P5 in memory space 250 so that the programs P2, P3, P4 and P5 are now available for replay if requested by a subscriber.

Figure 2E:
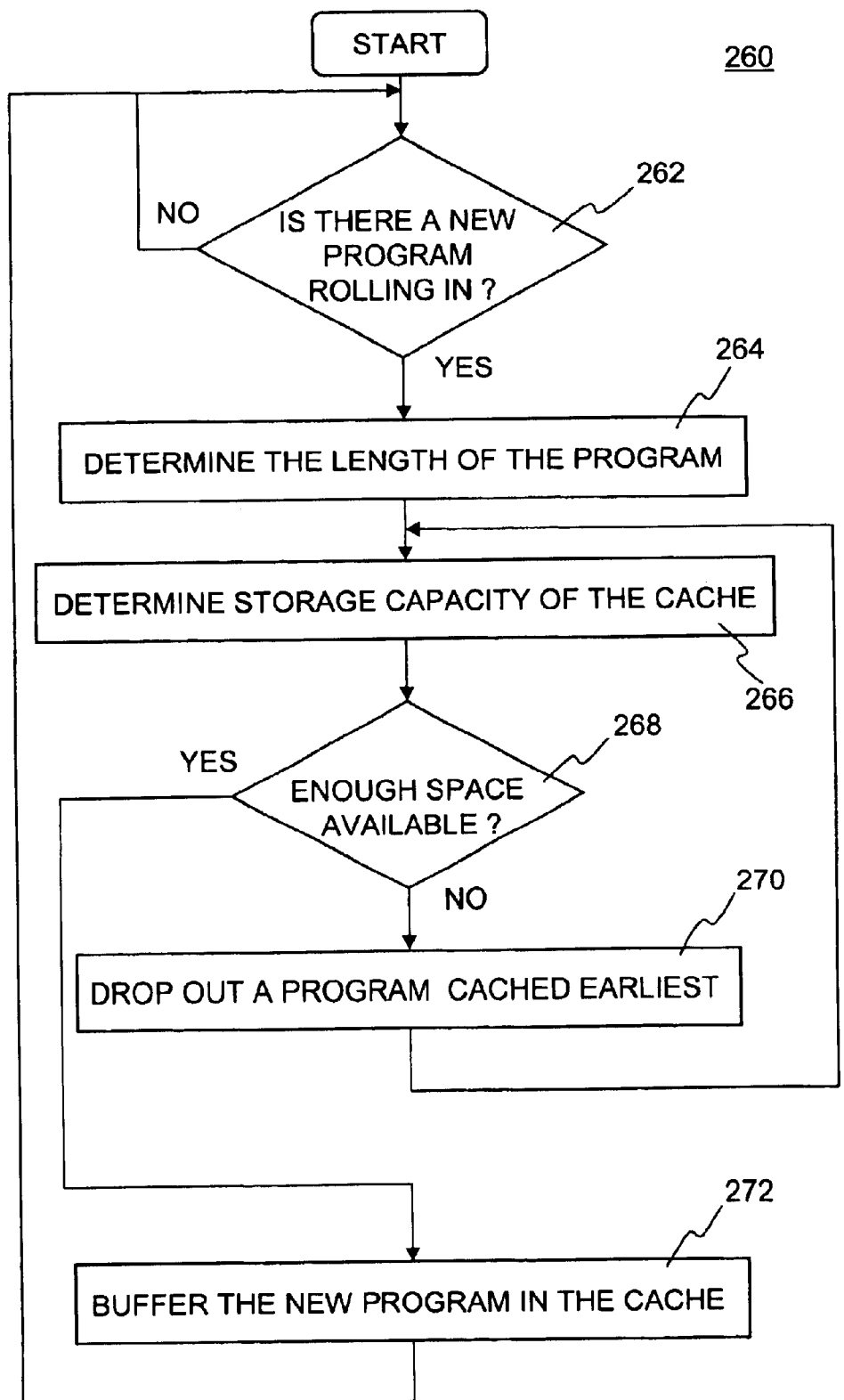
FIG. 2E shows a process flowchart of dynamically reconfiguring the cache memory so that a replay of any portion of the cached programs becomes possible.

FIG. 2E illustrates cache management processing 260 according to one embodiment of the invention. The cache management processing 260 operates, for example, to dynamically reconfigure the cache memory portion 240. The cache management processing 260 begins with a decision 262 that determines whether the cache memory portion 240 receives a new program. In other words, the cache management processing 260 determines whether a new program is polling in. To facilitate the discussion of the cache management processing 260, a new program is defined herein to have contents that are not related to a program currently being broadcast, be produced from a different producer, or have a significant spatial break between segments of data block. For example, a program that is currently played is a world/national news reporting from CNN Headlines, the new program may be a movie or a local new reporting. Optionally, when the program is in a compressed format (e.g., MPEG) and comprises a series of separate data segments, each new segment starting a different data block may be considered as a new program.

In any event, when the decision 262 determines that a new program has not started to roll in, the cache management processing 260 awaits until a new program is fed in. Once the decision 262 determines that a new program is fed in and started to be broadcast, the cache management processing 260 moves to determine 264 the length of the new program (i.e., how long the program is going to last). For example, the new program might be a half-hour news reporting program or 2 gigabytes data that may be provided in a program feeding instruction or a header of the data. In any case, the length of the new program represents storage requirements information. The amount of available space in the cache memory portion 240 is also determined 266. Next, a decision 268 determines whether the cache memory portion 240 has enough available space (available storage capacity) to receive the new program. If the decision 268 determines that the available storage capacity is less than the storage requirements information, then an older program held in the cache memory portion 240 is removed (i.e., dropped) from the cache memory portion to free some space to accommodate the new program. Typically, the older program that is chosen to be discarded is the one that was cached first among all the programs currently being cached in the cache memory portion 240. After the chosen program is removed, the cache management processing 260 moves back to 266 to determine if the available storage capacity is now large enough to accommodate the new program. If the available storage capacity is still not sufficient, then operations 266–270 are repeated until there is sufficient space available in the cache memory portion 240 to buffer the new program 272.

To further understand the processing 260, it is assumed that the cache memory portion 240 is allocated for 100 Gigabytes and five programs P1, P2, P3, P4 and P5 respectively denote data blocks of 10, 40, 15, 30 and 50 Gigabytes in length and that were fed in with that order. In other words, with respect to FIG. 2C, the programs P1, P2, P3 and P4 are currently cached in the cache memory portion 240 while the program P4 is being delivered to the client machines. In one embodiment, a viewer can effectively rewind the program P4 back and, if desired, continue rewinding all the way to the beginning of the program P1, and thus allows the viewer to view any portion therebetween. When the program P5 starts to feed in, the cache memory portion 240 must reconfigure to receive the program P5. As the free space is the cache memory portion 240 is only 5 Gigabytes at this point and thus is not sufficient to accommodate the program P5. Hence, the program P1 that was cached earliest is dropped (or removed) so as to free 10 Gigabytes of space. As a result, the total available space is 15 Gigabytes which is still not enough to accommodate the program P5. Hence, the next oldest program in the cache memory portion 240 is the program P2 and must be dropped to free more space. When the program P2 is dropped, the total free space is now 55 Gigabytes. At this point, the program P5 can be cached in the cache memory portion 240. As a result, a viewer now can access any portions of the programs P3, P4 and P5.

Referring now back to FIG. 2A, the media delivery hardware 208 is a transmission equipment that enables the data from the medial storage device 206 to be properly delivered to the subscribers. In one embodiment, the media deliver hardware 208 includes amplifiers to energize signals carrying the data for broadcasting over different mediums. In another embodiment, the media deliver hardware 208 includes network switches and routers (such as those provided by Cisco Systems, Inc.) to properly route the data to registered subscribers according to one or more of the data delivery modes such as broadcasting, multicasting and unicasting.

Figure 3A:
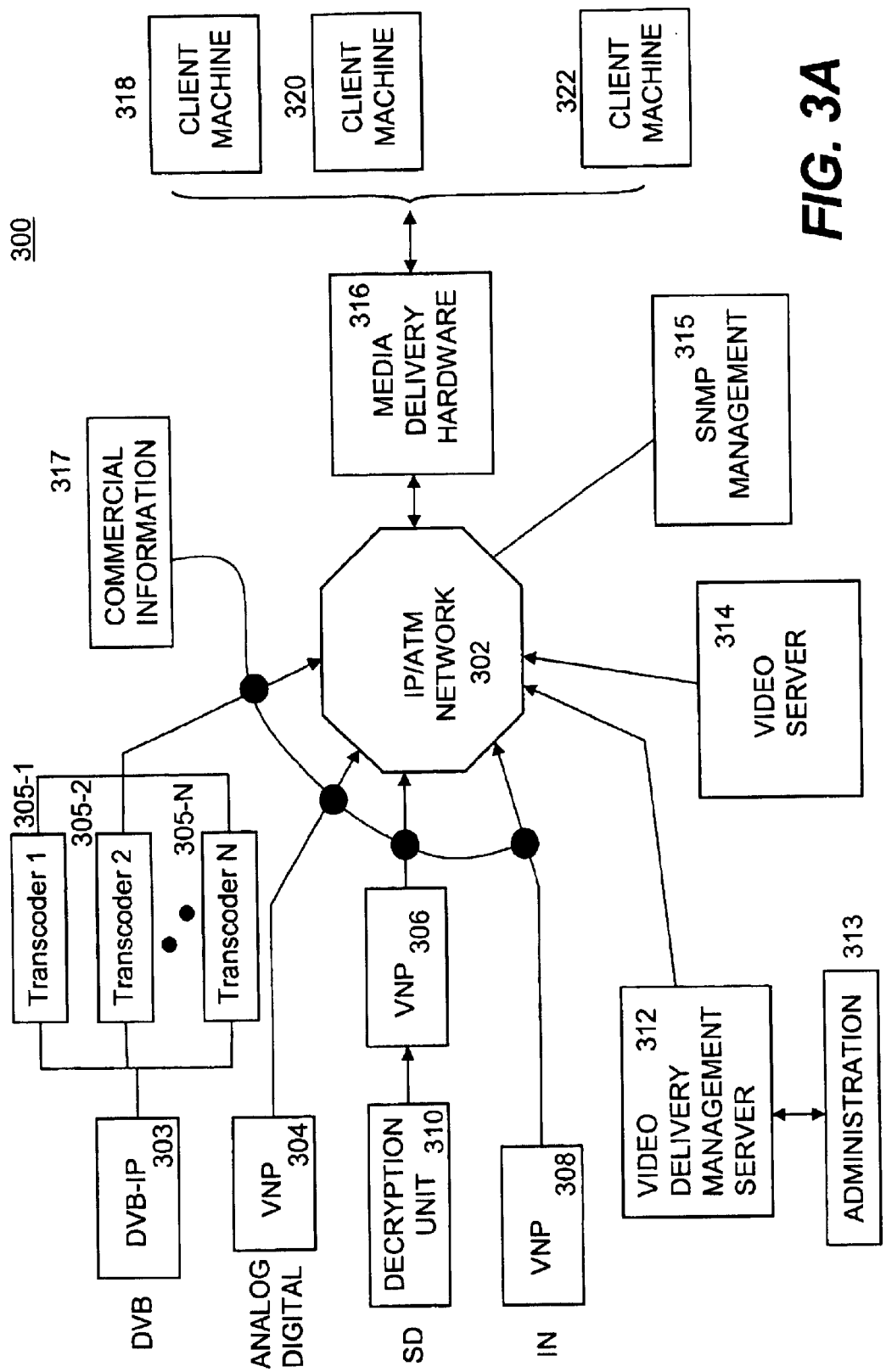
FIG. 3A is a block diagram of a media system according to one embodiment of the invention.

FIG. 3A is a block diagram of a media system 300 according to one embodiment of the invention. The media system 300 is designed to function similar to the media delivery center 200 illustrated in FIG. 2A. However, the media system 300 is shown in a network environment. In particular, the media system 300 includes an Internet protocol (IP)/ATM network 302. Typically, the IP/ATM network is a local network that interconnects hardware units of the provider of media services using the media system 300. To provide an applicable digital video for incoming media content from a television (TV) broadcast, a satellite dish (SD) or the Internet (IN), video network platform (VNP) devices 304, 306 and 308 are used to perform an conversion (including encoding) process. To accommodate digital video broadcast (DVB), a DVB-IP De-Multiplexer 303 is employed to receive and distribute DVB streams over IP networks and coupled to a bank of transcoders 305 which may provide a streaming rate, for example, from a few hundred kilo bit per second to a few hundred Mega bit per second. Each of the transcoders 305 (including a bypass) can be selected to provide an optimum encoded bit for transport over a subsequent IP network. Together with the transcoders 305, the DVB-IP De-Multiplexer 303 is capable to redistribute and reformat pre-encoded video content for distribution over an IP network. According to one embodiment that will be further described below, a VNP device can be configured to provide the functions of the DVB-IP De-Multiplexer 303 and the transcoders 305.

FIG. 3B shows a functional block diagram of a VNP device 330 according to one embodiment of the invention. The VNP device 330 may correspond to any one of the VNP devices in FIG. 3A. To accommodate all kinds of video signals, the VNP device 330 includes a port interface 332 that may combine together all types of input ports (not shown in the figure). Examples of the input ports may include, but not be limited to, a data port (e.g. an Ethernet port), a SDI port, an AES/EBU (Audio Engineers Society/European Broadcasting Union) port, a Video port, an L/R Audio port, a S-Video port. Generally, the port interface 332 outputs two different formats: digital data (e.g., file or streaming) and analog signals. The digital data may come from various sources in compressed or uncompressed format. Examples of the digital data may include, but be not limited to, MPEG1, MPEG2, MPEG4, MPEG7, Quicktime, MP3, MS ASF (Advanced Streaming Format) and AVI (Audio Visual Interleaved) files. Depending on the final digital format transported over a medium to the subscribers, compressed digital data are typically decoded first in a decoder 336 to recover the original digital data that goes through a multiplexer (MUX) 338 and compressed by an encoder 340. The decoder 336 and the encoder 340 may be implemented in hardware, software or combination of both, which is known to those skilled in the art. It should be noted, however, that the encoder 340 can be dynamically controlled by quality/format control signals generated/formed from, for example, the media management system 205 of FIG. 2A, which will be further described below. In one situation, the final delivered video data format is MPEG4 with a best quality factor while the incoming video data is in MPEG2. The encoder 340 can thus configured to encode the incoming video data that has been decoded (i.e., digital video data) according to the requirements, namely, parameters are set such that compressed video data is in MPEG4 with the best quality factor of 10, wherein the quality range is from 1 to 10 with 10 being the best).

When the incoming video data is DVB, the video data bypass the decoder and are transcoded in conformity with the required transmission bit rate by using one more more appropriate transcoders in the transcoders 341. An interface 342 enables the VNP 330 to effectively communicate with a media storage device in one embodiment and with a media delivery hardware in another embodiment. If the VNP 330 and the media storage device are coupled together through a local area network, the interface 342 may be an Ethernet or IP interface. If the VNP 330 is coupled directly to the media delivery hardware, the interface 342 is configured to ensure proper handshaking and data transfers with the media delivery hardware. Examples of the protocol supported in the interface 342 may include, but not be limited to, HTTP (Hypertext Transfer Protocol), RTP (Real-Time Transport Protocol), RTSP (Real-Time Stream Control Protocol), IP (Internet Protocol), SMTP (Simple Mail Transfer Protocol), MPEG transport, RSVP (Reservation Protocol) differential services, and H.323 (Audio/Video/Data Standard).

It should be noted that only one channel (i.e., video/audio) is depicted in FIG. 3B, there can be multiple channels in parallel, the outputs thereof can be properly handled in an output module 354. Regardless, it should be clear to those skilled in the art that the description above is equally applied to audio data as well. In fact, the audio data coming together with the video data can be processed in a similar manner and/or in parallel and the final compressed audio data can then be combined with the compressed video data to be cached or transported over a communication medium.

When the incoming program is in analog, the audio and video signals are respectively digitized in the digitizer 344, which typically includes a digitizer for audio signals and a digitizer for video signals. The MUX 338 is controlled to select an appropriate source to ensure that the subsequent processing is correct.

To be complete, in some implementations, the communication medium with the subscribers can sometimes require that signals be analog. As the cached programs are digital, the programs are converted to the analog format before being transported. The video/audio channel 346 is designed to handle the conversion and includes an interface 348, a decoder 350 and a digital-to-analog converter (DAC) 352. The interface 348 ensures that a compressed video received from a data line is properly received for the conversation.

The decoder 350 is configured to decode the compressed video and may be implemented in hardware, software or a combination of both. In one embodiment, the decoder 336 is utilized to perform the conversation. The DAC 352 finally converts the decompressed digital video to analog signals. It should be noted that the interface 342 and 348 and the decoder 336 and 352 are depicted separately to facilitate the description of one embodiment of a VNP device. Those skilled in the art will understand that an actual implementation of a VNP device can employ only one interface and one decoder therein to achieve the desired functions and results. Further, it should be understood that not every functional block has to be implemented to facilitate the operations of a media delivery system.

Figure 3C:
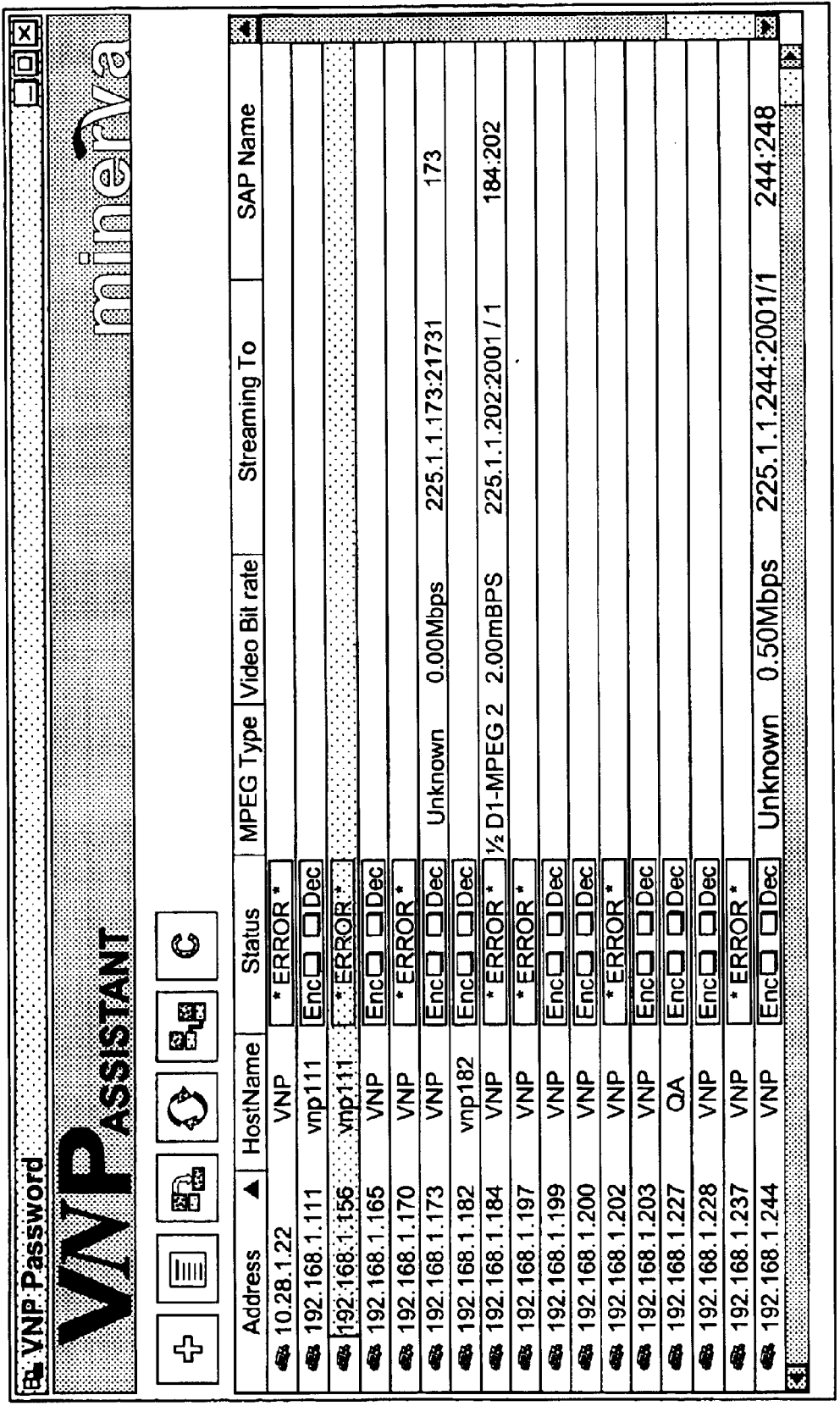

The output circuitry 354 is preferably controlled by a media management system (e.g., the media management system 205) to output appropriate signals/data suitable for the communication medium over which the signals/data will be transported to the subscribers. FIG. 3C illustrates an exemplary screen to monitor/control a number of the VNP devices employed in a media delivery center according to one embodiment of the invention. As shown in FIG. 3C, each of the VNP devices is coupled to a data network and assigned to a port address listed in the column labeled "Address". The second column labeled "HostName" lists an identifier of each of the VNP devices, for example, vnp111 or vnp156. The third column labeled "Status" allows an operator to monitor the status of each of the VNP devices. When a VNP device is not functional (e.g., powered off), the status shows "ERROR", which may require an attention from an operator. In operation according to one embodiment, a VNP device functions in an either decoding or encoding mode. The fourth column labeled "MPEG Type" can show what type of compression a compressed video is in when it is in the decoding mode or what type of compression a video is being compressed to when it is in the encoding mode. The fifth column "Video Bitrate" can show the data speed (e.g., bit rate) of the video being processed (i.e., encoding). The sixth column "Streaming to" shows where the processed (e.g., encoded) video is destined, typically, to a cache memory or a broadcasting device identified by another address. The seventh column "SAP Name" is used to show a session protocol or pertinent message to keep the operator aware what is going on in the corresponding VNP.

Figure 3D:
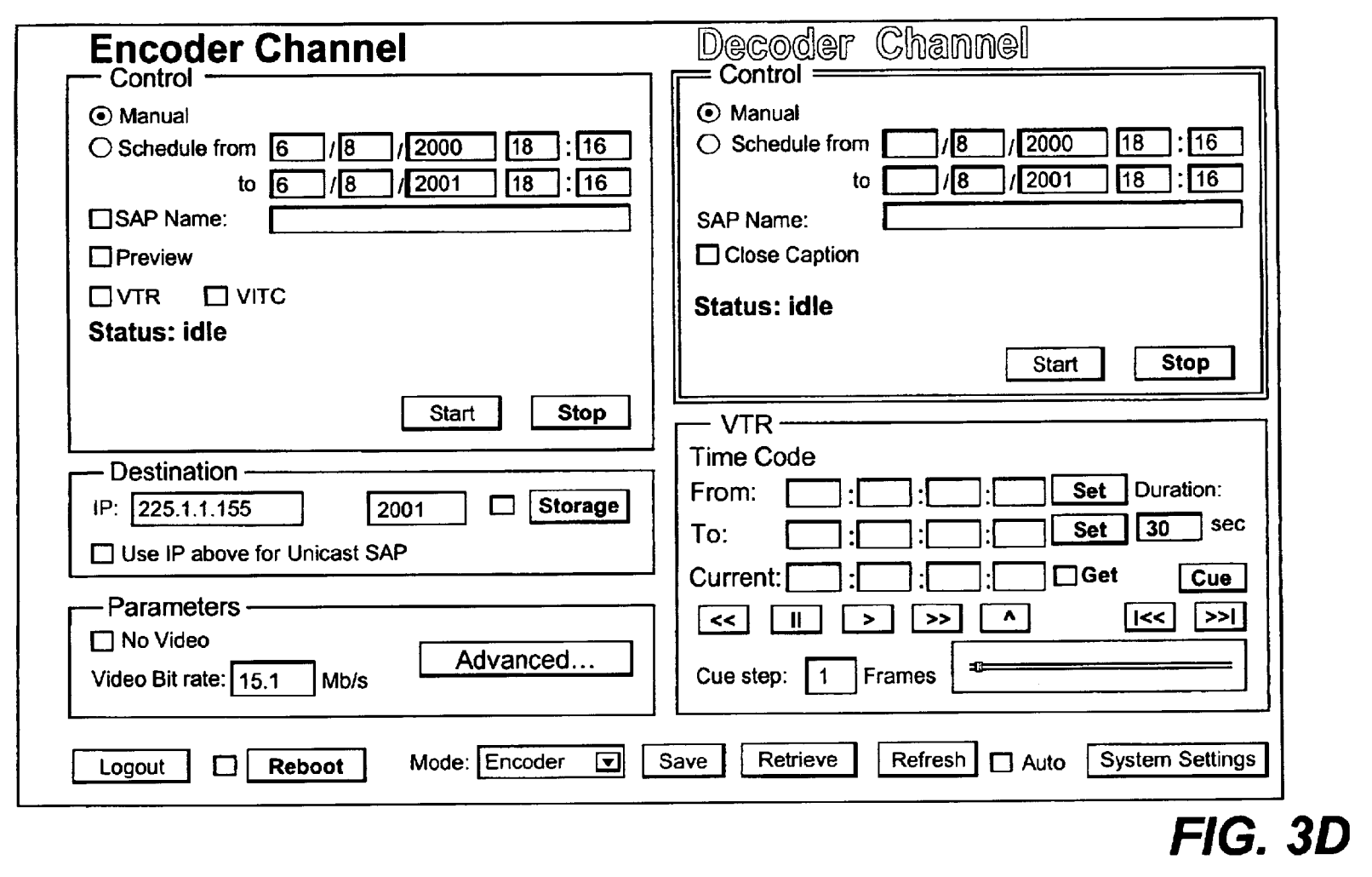
Figure 3F:
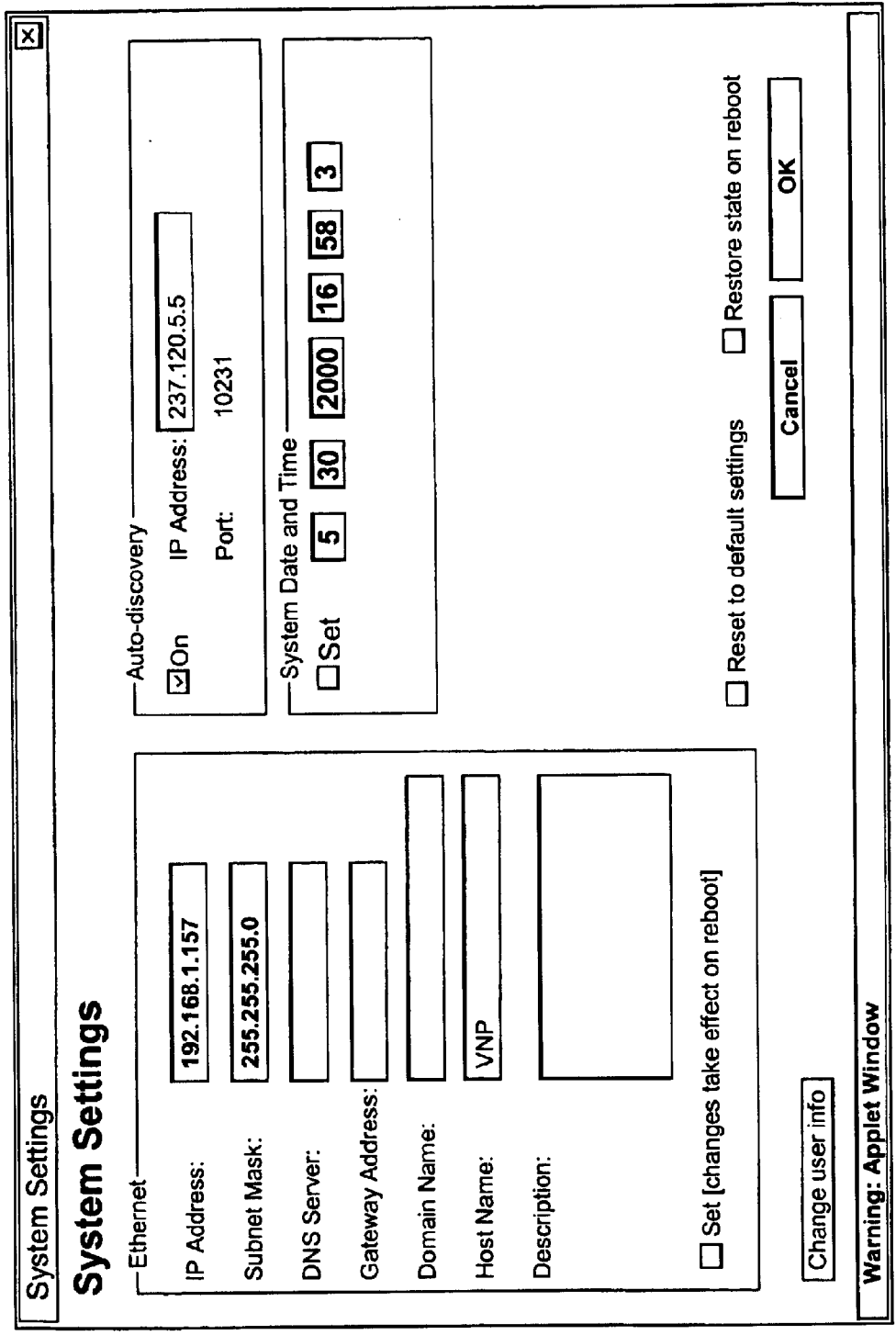

FIG. 3D shows an exemplary control screen used to control a selected VNP device and may be launched by activating (i.e., selecting or clicking-on) one of the VNP devices in FIG. 3C. The control screen of FIG. 3D permits the operator to assign the selected VNP to a designated port which a device may be coupled thereto to receive encoded video. In addition, various parameters may be manually inputted or controlled. When the advanced button is activated, it launches another screen shown in FIG. 3E which is an encoder setup screen to control the settings of the encoding process to ensure that the video data are encoded appropriately for subsequent delivery. Each different set of settings in FIG. 3E will cause the media management system to generate corresponding control signals that control the encoder 340 to function differently. FIG. 3F further shows an exemplary system setup screen in which the operator can, for example, redirect a VNP device to another device.

Figure 3G:
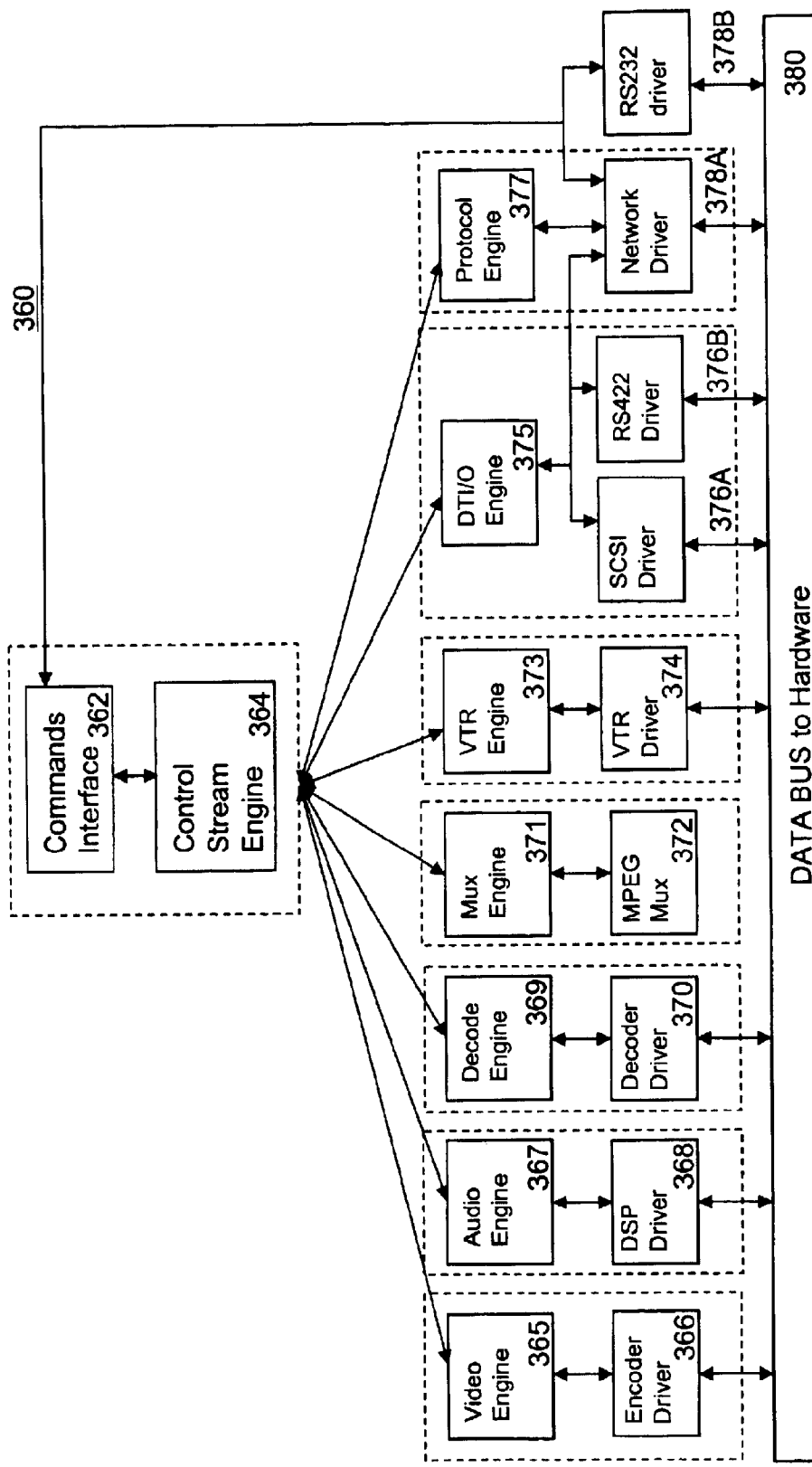
FIG. 3G shows an architecture of a VNP device according to one embodiment.

FIG. 3G shows an architecture 360 of a VNP device according to one embodiment. A command interface module 362 is configured to allow an operator to directly control the operations of a selected VNP device, typically in a bank of VNP devices. The command interface module 362 is coupled to a control stream engine 364 that is designed to control the inflows of various media streams or files. The control stream engine 364 is coupled in parallel to a number of engines including a video engine 365, an audio engine 367, a decode engine 369, a Mux engine 371, a VTR engine 373, a DTI/O engine 375, and a protocol engine 377. Each of the engines may be implemented in software, hardware or a combination of both. In particular, the video engine 365 is responsible for processing video signals or streaming data through a video encoder driver 366 which may be implemented with an encoding chip, DVEXPERT, from C-Cube Microsystems, Inc. located at 1778 McCarthy Blvd., Milpitas, Calif. 95035. The audio engine 368 is used to control the processing of audio signals through a digital signal processing driver 368 which may be implemented with a DSP chip 50302 provided by Motorola, Inc. The decode engine 369 is responsible for decoding video signals or streaming data through a video decoder driver 370 which may be implemented with a decoding chip, Ziva, also from C-Cube Microsystems, Inc. The Mux engine 371 controls the signal flows through a multiplexer 372 (e.g., MPEG multiplexer) to ensure the signals are properly routed and processed. The VTR driver 373, together with the VTR engine 374, is used to communicate with a video recording device. The DTI/O engine 375 is responsible for data input/output interface. In the current embodiment as shown in FIG. 3G, the I/O interface is built upon a SCSI driver 376A, a RS422 376B and Ethernet driver 378A. The protocol engine 377 ensures that the VNP can properly communicate with a data network by providing one or more proper protocols. In the current embodiment as shown in FIG. 3G, the Ethernet driver 378A and a RS232 driver are used. The implementation of drivers 372, 374, 376A, 376B, 378A and 378B become evident to those skilled in the art in view of the above description and their provided functions in the system. All of the drivers 366, 368, 370, 372, 374, 376A, 376B, 378A and 378B are coupled to a data bus 380 on which video data are received/transported from/to one or more devices.

Figure 3H:
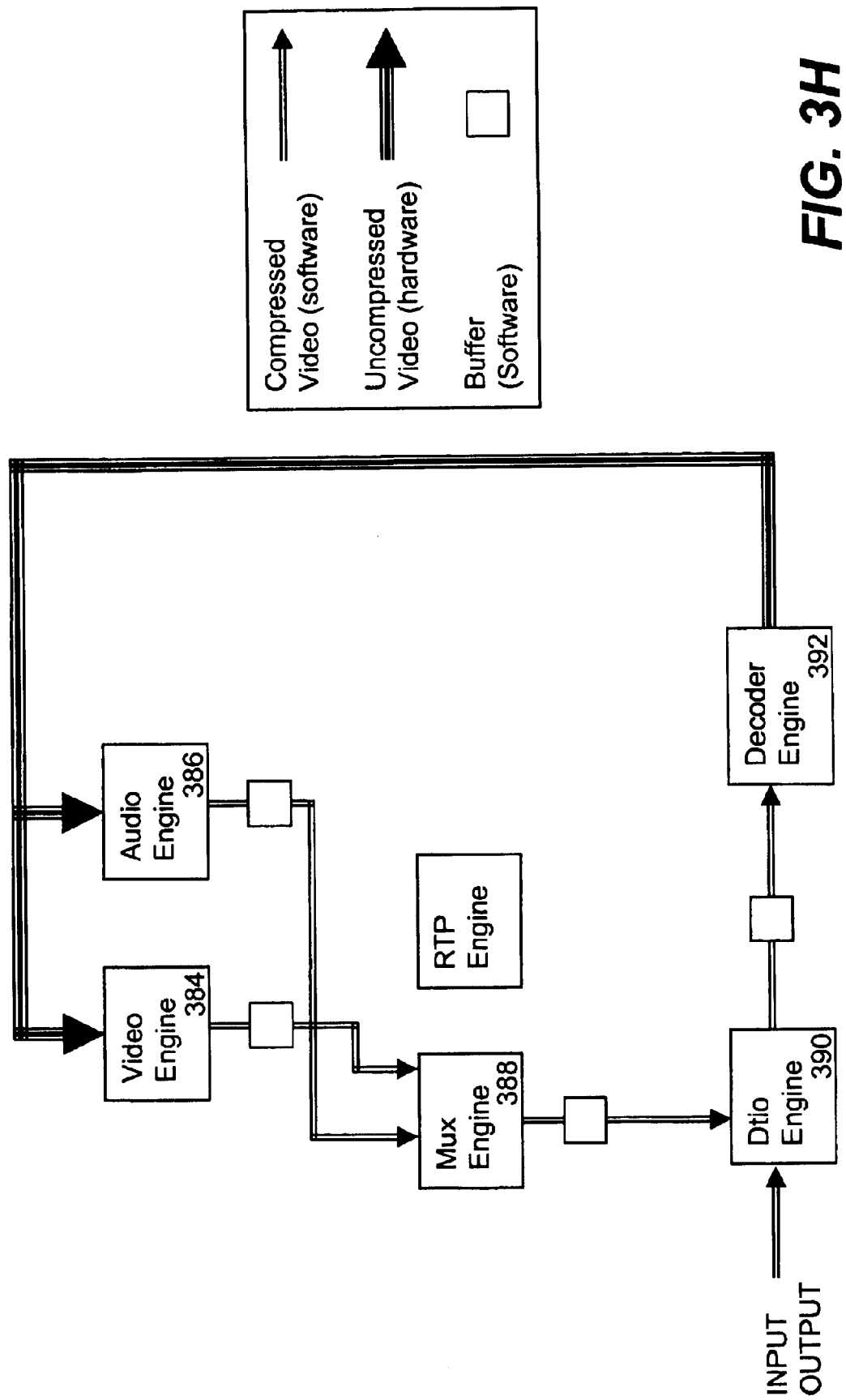
FIG. 3H shows a data flow in a transcoder implemented in a VNP device.

FIG. 3H shows a data flow in a transcoder 382 and shall be understood in conjunction with FIG. 3G. As an input, video/audio data (i.e., uncompressed data) are coming to DTI/O engine 390 and decoded in a decoder engine 392 that produces uncompressed data. The uncompressed data typically comprise both audio/video data and are fed to a video engine 384 and an audio engine 386 for an encoding process. The video engine 384 and the audio engine 386 may, for example, correspond to the engines 365 and 367 in FIG. 3G. Through a Mux engine 388, the compressed data can be streamed to the DTI/O engine 390 that directs the data to a next proper device coupled to a data bus.

Referring now back to FIG. 3A, sometimes, satellite broadcasts being received via the satellite dish (SD) are encrypted, a decryption unit 310 can be provided to perform a decryption process. The VNPs 304, 306 and 308 are network devices that couple to the IP/ATM network 302. The encoding provided by the VNPs 304, 306 and 308 can be performed in near real-time for live media. As described above, the VNPs 304, 306 and 308 can also output IP multicast streaming of the encoded live content for delivery of the live content to various subscribers.

With respect to satellite transmissions, the decryption unit 310 performs decryption and outputs the media content in a digital/analog format that is input to the VNP 306. When the media content has an encoded bit rate that is too high for the capabilities of IP network or the subscriber channels (e.g., DSL, Ethernet), the media content must be transcoded to fit the bandwidth supported in the IP network. As described above, the DVB-IP De-Multiplexer 303, along with the bank of transcoders 305, can be implemented in a VNP device. Hence the VNP 306 is configured to reduce/increase the rate of the MPEG stream to an appropriate bit rate while maintaining the integrity of the MPEG stream.

The media system 300 also includes a video delivery management server 312. The video delivery management server 312 is a server that couples to the IP/ATM network 302. The video delivery management server 312 manages the storage and delivery of media content (e.g., videos) as well as manages the setup, customization and monitoring of media services offered to subscribers. In one embodiment, the video delivery management server 312 is accessed through an administration interface 313 to perform the operations associated with the media management unit 204 illustrated in FIG. 2.

The media system 300 also includes a video server 314 that includes a media management system to efficiently manage, store and catalog media content (namely, videos) that are deliverable by the media system 300. The video server 314 provides storage for the media content (e.g., videos) and represents a network device that operates to provide media storage. In one embodiment, the video server 314 performs the operations associated with the media storage device 206 illustrated in FIG. 2A. The media content stored at the video server 314 can be delivered by media delivery hardware 316 to client machines 318, 320 and 322 of various subscribers. In one embodiment, the connection between the media delivery hardware 316 and the client machines 318, 320 and 322 is over a public network. In one embodiment, the public network includes a broadband link to the client machines 318, 320 and 322. For example, the broadband link can be a xDSL channel. In alternative embodiments, the media delivery hardware 316 can couple to the client machines 318, 320 and 322 over other types of links, including cable or wireless. The client machines 318, 320 and 322 preferably have high quality graphics display capabilities and operate to provide playback of live and stored content from various encoders or video servers. In one embodiment, the client machines 318, 320 and 322 have a short boot cycle, no hard drive, and support a client interface (e.g., HTML and JavaScript). The client interface allows a viewer to perform various interactions with the media management system for desired services or applications offered by the media delivery center.

To support and manage network protocols in various subscriber channels, a SNMP (Simple Network Management Protocol) management module 315 is employed to govern network management and monitor devices coupled to the network 302 and their functions. The details of SNMP can be obtained from the Internet Engineering Task Force (IETF) Requests for Comments (RFCs).

In addition, the media system 300 includes a commercial information server 317 that typically operates with the video deliver management server 312. The commercial information server 317 receives commercial information from service/product promoters and retain the commercial information therein for a limited time. The commercial information is generally registered with the video deliver management server 312 so that the media management system in the video deliver management server 312 knows the purposes or contents of the commercial information. When appropriate, the media management system causes the commercial information stored in the commercial information server 317 to be released to a certain group of subscribers to create more effective product/service promotions. For simplicity, servers 312, 314, 315 and 317 are depicted separately. However, those skilled in the art will understand that the functions provided by these servers may not be necessarily implemented respectively in several different servers.

Figure 4A:
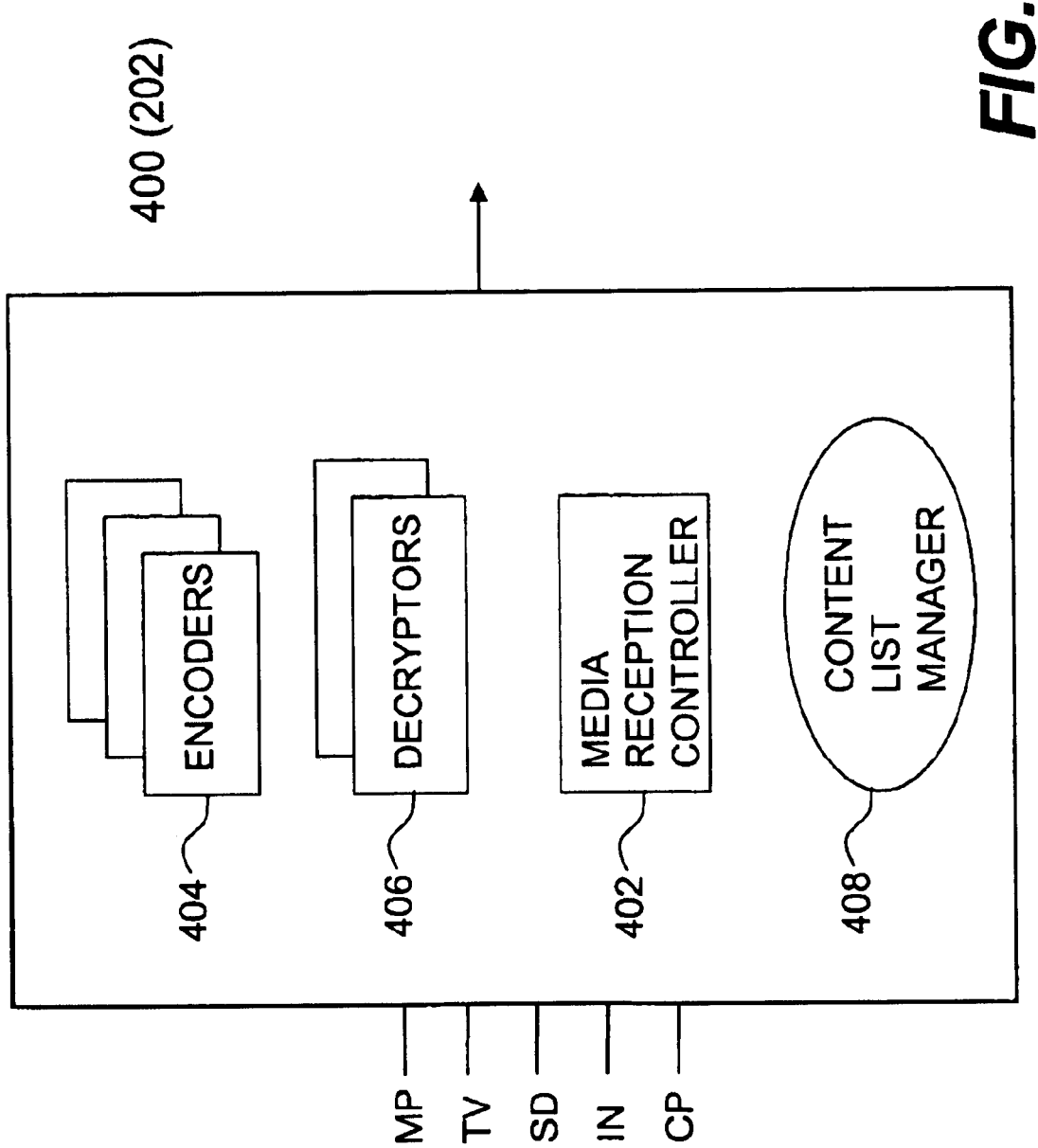
FIG. 4A is a block diagram of a media receiving unit according to one embodiment of the invention.

FIG. 4A is a block diagram of a media receiving unit 400 according to one embodiment of the invention. The media receiving unit 400 is, for example, suitable for use as the media receiving unit 202 illustrated in FIG. 2A.

The media receiving unit 202 includes a plurality of encoders 404 and a plurality decrypters 406. Typically, the encoders 404 (e.g., VNP devices) are utilized by incoming TV broadcast or satellite broadcasts such that the content can be converted into a compressed and/or digital format. For example, the compressed and/or digital format can be MPEG. The output of the encoders 404 can also be in an IP data format for transmission across networks using a communication protocol (e.g., HTTP/IP and WTP). With the media content provided in an IP format, the media content is able to be transmitted through the media system as well as to subscribers. The decrypters 406 are used when the incoming media content is encrypted, as often the case from the satellite dish transmissions. The media receiving unit 400 also includes a media reception controller 402. The media reception controller controls the operation of a media receiving unit 400 so that incoming content from the various media sources can be controlled and processed in the appropriate manner. For example, TV broadcasts may not need to undergo any decryption, whereas satellite transmissions often need to be decrypted. Also, Internet broadcasts typically do not need encoding or decryption, but could use the encoders 404 to perform an adjustment in the degree of compression. In one embodiment, the encoders 404 can be configured to perform bit rate change, e.g., from a higher rate to a lower rate to accommodate the bandwidth of the communication medium associated with the subscriber channels. The media reception controller 402 can also service the commercial provider (CP) such that incoming commercials that are to be utilized during delivery of media content can also be placed in a suitable transmission format. The media receiving unit 400 also includes a content list manager 408. The content list manager 408 maintains a list of the content being received. In one respect, the media reception controller 402 can function closely with the content list manager 408 so that some of the commercial programs (e.g., advertisements and promotions) can be inserted in the regular programs properly.

Figure 4B:
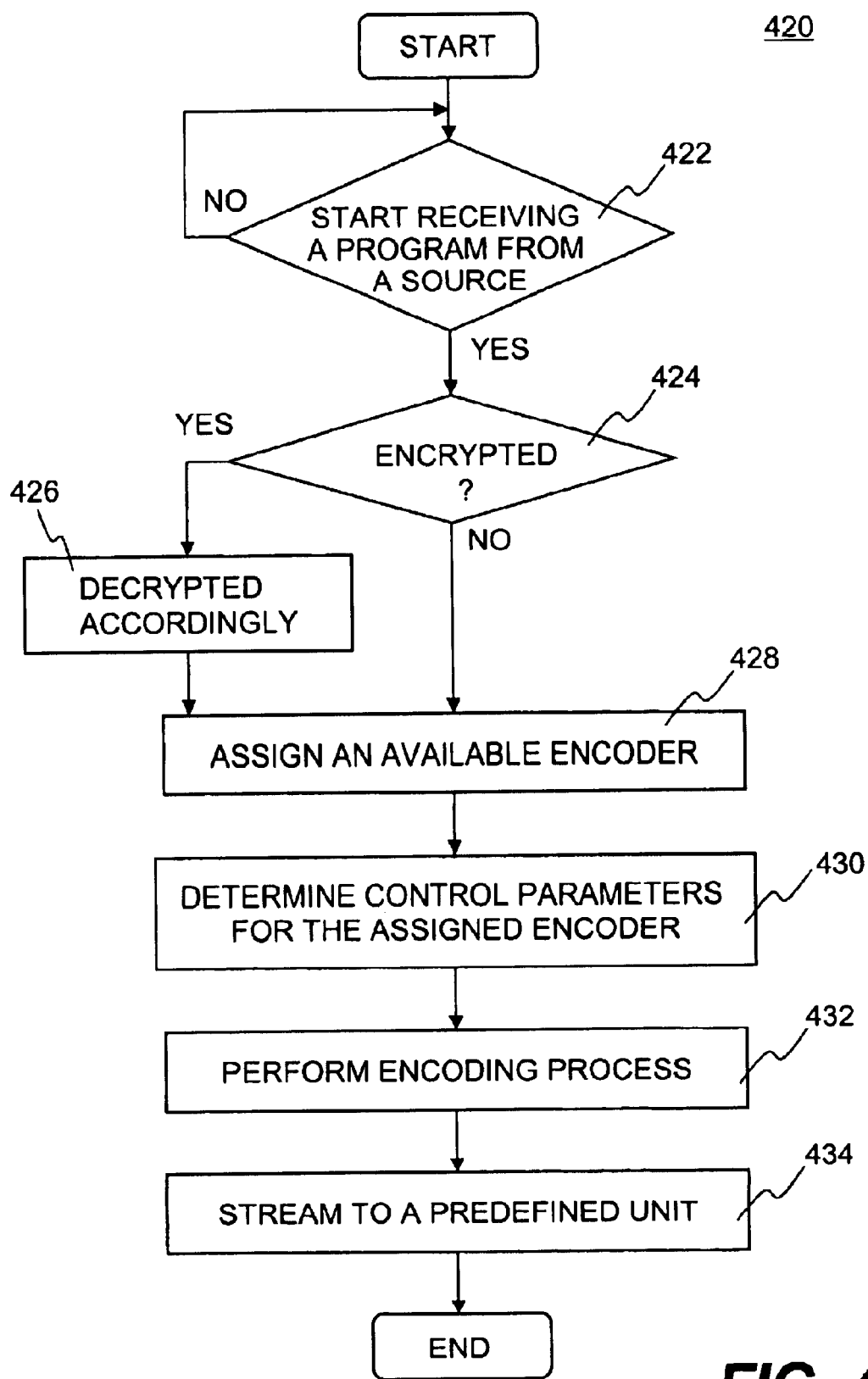
FIG. 4B shows a reception and encoding process according to one embodiment of the invention.

FIG. 4B shows a reception and encoding process 420 according to one embodiment of the invention. The reception and encoding process and shall be understood in conjunction with FIGS. 3A–3H and FIG. 4A. The reception and encoding process 420 starts with a decision 422 to determine if a program is being fed in from a source. The program may be received from a satellite receiver, a cable feeder, a data network, and various production companies. When a program arrives, the reception and encoding process 420 first checks whether the program is encrypted. Sometimes, the program is delivered from an open network (e.g., the Internet or the satellite relay) and is therefore encrypted. The means for encrypting programs for transporting via an open network is well known in the art. Next, at decision 424, it is determined that the program is encrypted, the reception and encoding process 420 operates to decrypt 426 the program. If it is determined at the decision 424 that the program is not encrypted, then the reception and encoding process 420 bypasses the decrypting 426 operation.

In any event, following operation 426 or following operation 424 directly, an encoder is assigned 428 to the channel through which the program is fed in. The assignment is preferably performed through a control illustrated in FIGS. 3C and 3E. Further, the encoder may be provided or implemented by the VNP device described above. In order words, the encoder may perform a decoding process before an encoding process takes place as shown in FIG. 3B. By assigning 428 an encoder to the channel, the assigned encoder is dedicated to process the incoming program and stream it to an appropriate device such as the media storage device 206 of FIG. 2A (e.g., cache memory portion).

As illustrated in FIGS. 3C and 3D, after the encode is assigned 428, a number of control parameters for the encoder can be assigned 430. The control parameters may include, but not be limited to, what encoding scheme shall be performed and suitable for subsequent subscriber channels, quality factor setting (e.g., 1-coarse to 10-very fine), expected bit rates to fit the bandwidth of the channels, etc. Then, with the control parameters assigned 428, then the reception and encoding process 420.performs 432 an encoding process. Following the encoding process, the output of the processed program is streamed 434 to a device determined.

It should be noted that the reception and encoding process 420 is not limited to video or audio programs. Quite often the feeding programs (sources) are from businesses that desire to take advantage of the popularity of the subscribers belonging to a media delivery center. For example, subscriber-oriented commercial programs can be delivered to subscribers.

As will be described in greater detail below, the media management system in the media delivery center is able to record viewing habits and likes/dislikes of each of the subscribers in one embodiment of the invention. With the statistic measurement of the subscribers, the commercial programs can be more effectively promoted. According to one embodiment of the invention, the commercial programs are managed in the content list manager 408 that can be accessed when one of the commercial programs therein are to be delivered.

Figure 5A:
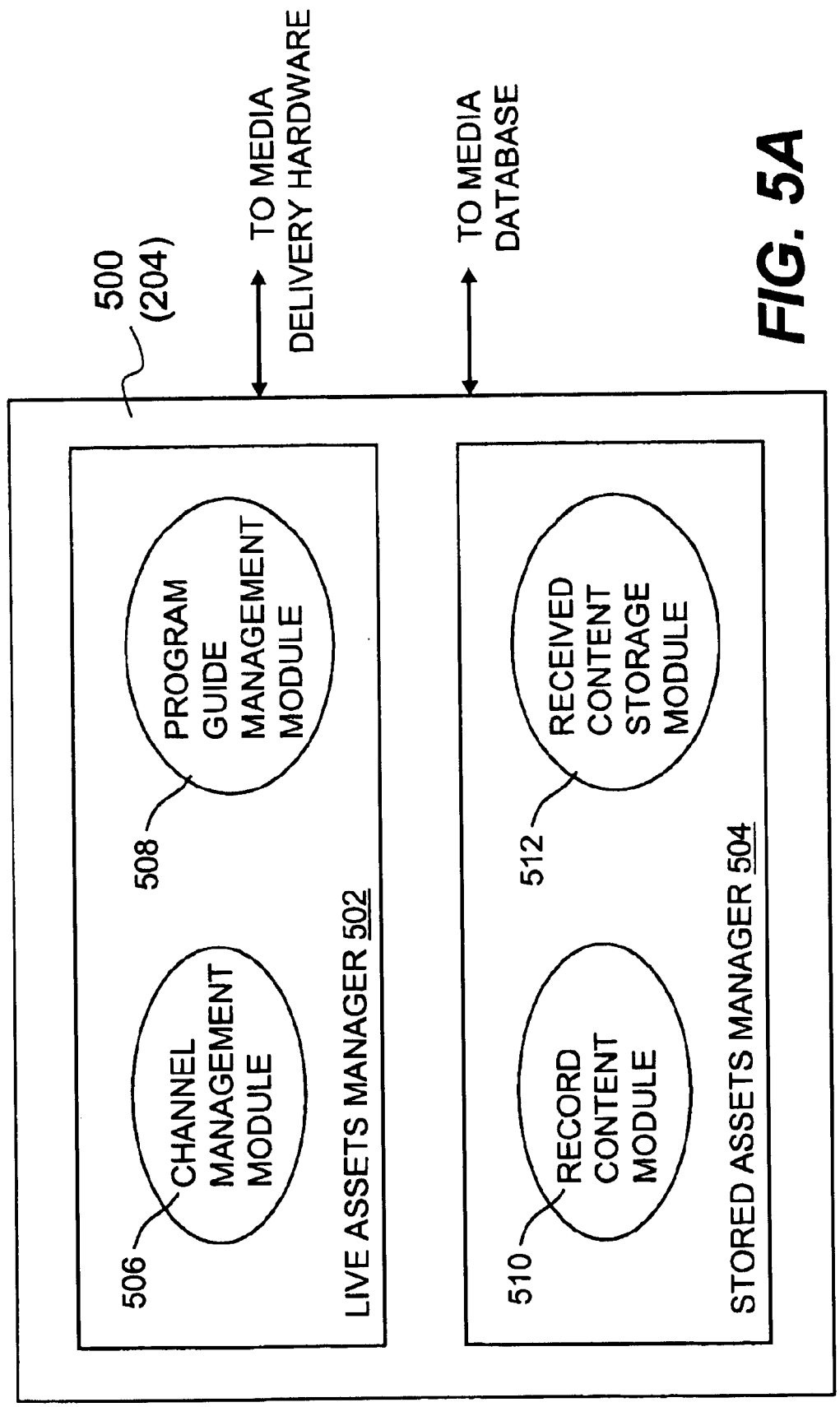
FIG. 5A is a block diagram of a media management unit according to one embodiment of the invention.

FIG. 5A is a block diagram of a media management unit 500 according to one embodiment of the invention. The media management unit 500 is, for example, suitable for use as the media management unit 204 illustrated in FIG. 2A.

The media management unit 500 includes a live assets manager 502 and a stored assets manager 504. In one embodiment, the live assets manager 502 and the stored assets manager 504 are implemented in the media management system 205 illustrated in FIG. 2A. The live assets manager 502 serves to manage live broadcasts being received by the media receiving unit 202 such that the live broadcasts are saved and/or delivered to subscribers over the network as desired. The live assets manager 502 includes a channel management module 506 and a program guide management module 508.

The channel management module 506 allows an administrator to manage the channels that are to be delivered or available to the subscribers from the media system. Often, the media system will receive numerous incoming broadcasts from the various media sources. The channel management module 506 determines which ones of these incoming broadcasts are to be carried (live or storage) by the media system. Those incoming broadcasts being carried live are temporarily cached and then delivered to interested subscribers. Those incoming broadcasts that are to be stored for later delivery are stored in the media database. Those incoming broadcasts that are not being carried live or stored can be discarded. The media management module 506 can also allow channel numbers to be assigned to particular broadcasts. The media management module 506 can also enable customers to receive and/or select those channels to be transmitted to them.

The program guide management module 508 allows the media management unit 500 to provide a program guide to subscribers. The program guide can be formulated by the program guide management module 508. The program guide can also be dependent upon the channel arrangement that has been authorized by the channel management module 506. In this regard, subscribers can access program guide that reflects only the media content available to the subscribers. Still further, an individual subscriber, or groups of subscribers, can further customize their program guide to better fit their preferences and needs so that they are able to easily and efficiently examine their program guide with respect to their interests and available channels.

FIG. 5B illustrates an exemplary program guide 520 according to one embodiment of the invention. The program guide 520 can originate from the program guide management module 508. In one embodiment, the program guide 520 is implemented with a markup language and is downloaded to a client machine for display and updated at predefined times. The program guide 520 originally lists all the channels being serviced by the media delivery center. A viewer can navigate all the channels. For the convenience of the viewer, the program guide 520 can include a current time bar 552 that is preferably highlighted. The current time bar 552 may be 0.5 or 1 hour in width and may be highlighted with a highlighted board or colored differently from the rest of the program guide so that a viewer is able to notice immediately what programs are currently being played.

In one implementation, a subscriber is permitted to access his/here own account to customize the program guide 520 to fit his/her own needs. For example, the subscriber is able to customize the number of hours before or after the current time bar 552. As a result, the subscriber can see/determine what program is being played or viewed in certain channels at a glance without extensive surfing through tens, perhaps hundreds of channels.

Figure 5C:
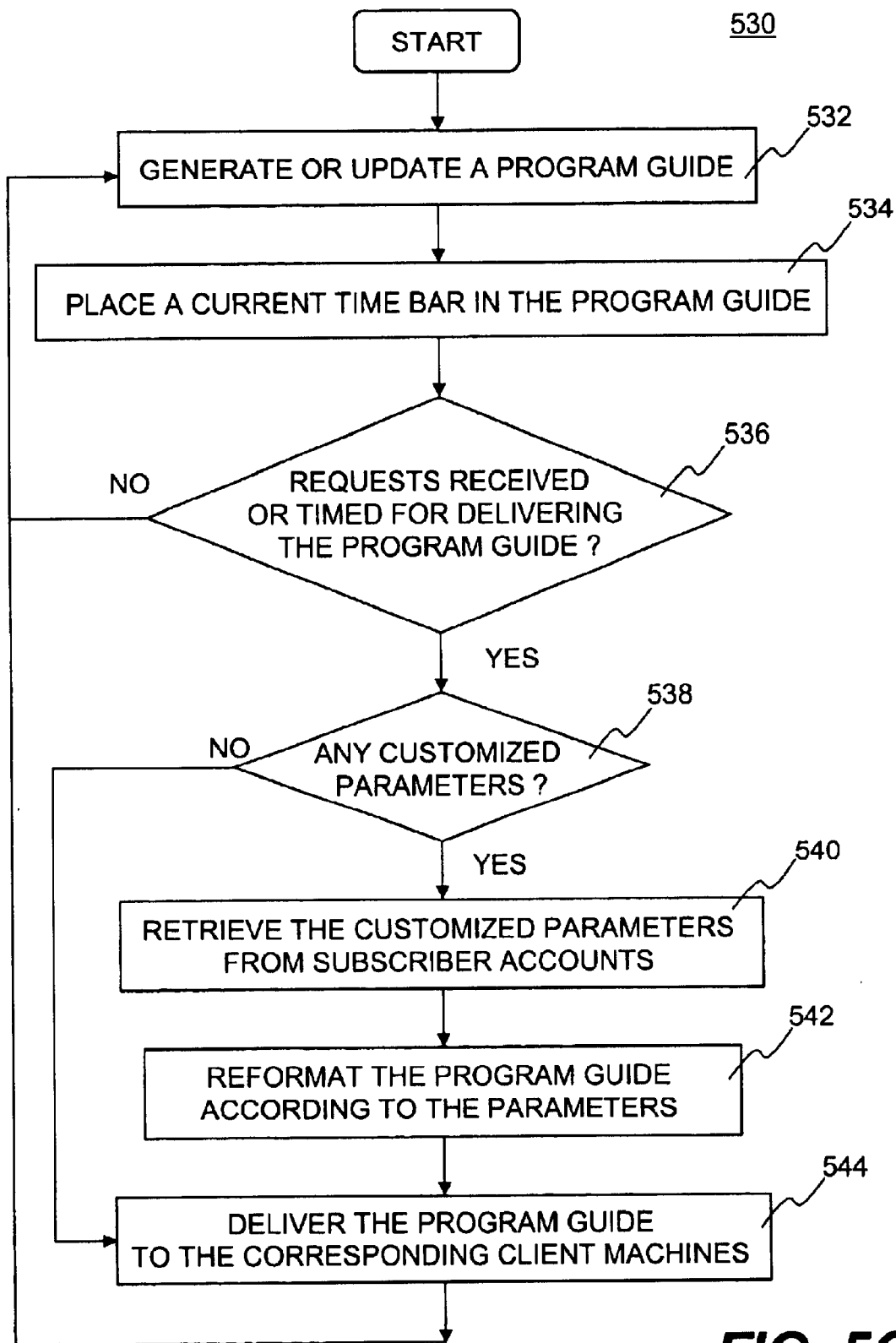
FIG. 5C shows a flowchart of the program guide processing according to one embodiment of the invention.

FIG. 5C shows a flowchart of program guide processing 530 according to one embodiment of the invention. The program guide processing 530 operates to provide a program guide to one or more client machines. Typically, the program guide processing 530 begins when one or new programs are newly received from a feeding source or some changes are to be made to the program guide. In a preferred implementation, the program guide processing 530 proceeds in the program guide management 508 that closely functions with the channel management module 506 of FIG. 5A.

Initially, a program guide is generated or updated 532. The program guide may be viewed as a tablet, if displayed, that lists many time slots, each is associated with a program to be broadcast as scheduled. A current time bar is generated according to a current time in the media delivery center or a client machine and placed 534 in the program guide. A decision 536 then determines if there is one or more requests received from the client machines for an updated program guide or if a predefined time has arrived. If not, then the program guide processing can end or return to operation 532. On the other hand, when it is determined that there are such requests or it is time to deliver an updated program guide, than an updated program guide shall be delivered to the client machines receiving services from the media delivery center. More particularly, a decision 538 determines if any of the subscribers have preferences regarding the program guide. The subscribers can set their preferences by setting parameters in their subscriber accounts. If there are no preferences, then the program guide is delivered 544. In one embodiment, the program guide is delivered 544 to a cache memory in the client machine so that the subscribers have a whole view of the program guide prepared at operation 532. On the other hand, if the decision 538 determines that each of the subscribers has his/her preference, then the corresponding parameters are retrieved 540 from his/her account. Then, the program guide is reformatted 542 according to the parameters. After the program guide is reformatted 542, the program guide is delivered 544 to the corresponding client machines.

As described above and further below, each of the subscriber accounts in the media management system can be customized by the administrator or the customer (subscriber) according to a particular service agreement with the customer or preferences set by the customer. These customized results are controlled by a number of parameters in each of the account. For example, one account can access a limited 10 channels from 3:00 PM to 9:00 PM, another account can access all the channels any time but the account holder prefers to see a guide with only 10 commonly access channels. Hence, the parameters are respectively retrieved 540 from each of the accounts and used to reformat 542 the program guide for one or more subscribers. As a result, there are often a number of customized program guides created, each being formatted according to a corresponding subscriber's requirements. These customized program guides are then respectively delivered to the corresponding client machines. Typically, each of customized program guides will include the current time bar.

Referring now back to FIG. 5A, the stored assets manager 504 serves to manage the media content stored in the media database. Such media content are referred to as "stored assets". In contrast to live content, the stored assets are the media content that can be delivered to subscribers when desired. The stored assets manager 504 includes a record content module 510 and a received content storage module 512. The record content module 510 operates to facilitate the recording of content to the media database. The media content to be recorded by the record content module 510 can be the media content associated with a pause or record request issued by a subscriber. The received content storage module 510 operates to store the incoming media content received by the media receiving unit 202 into the media database.

Figure 6:
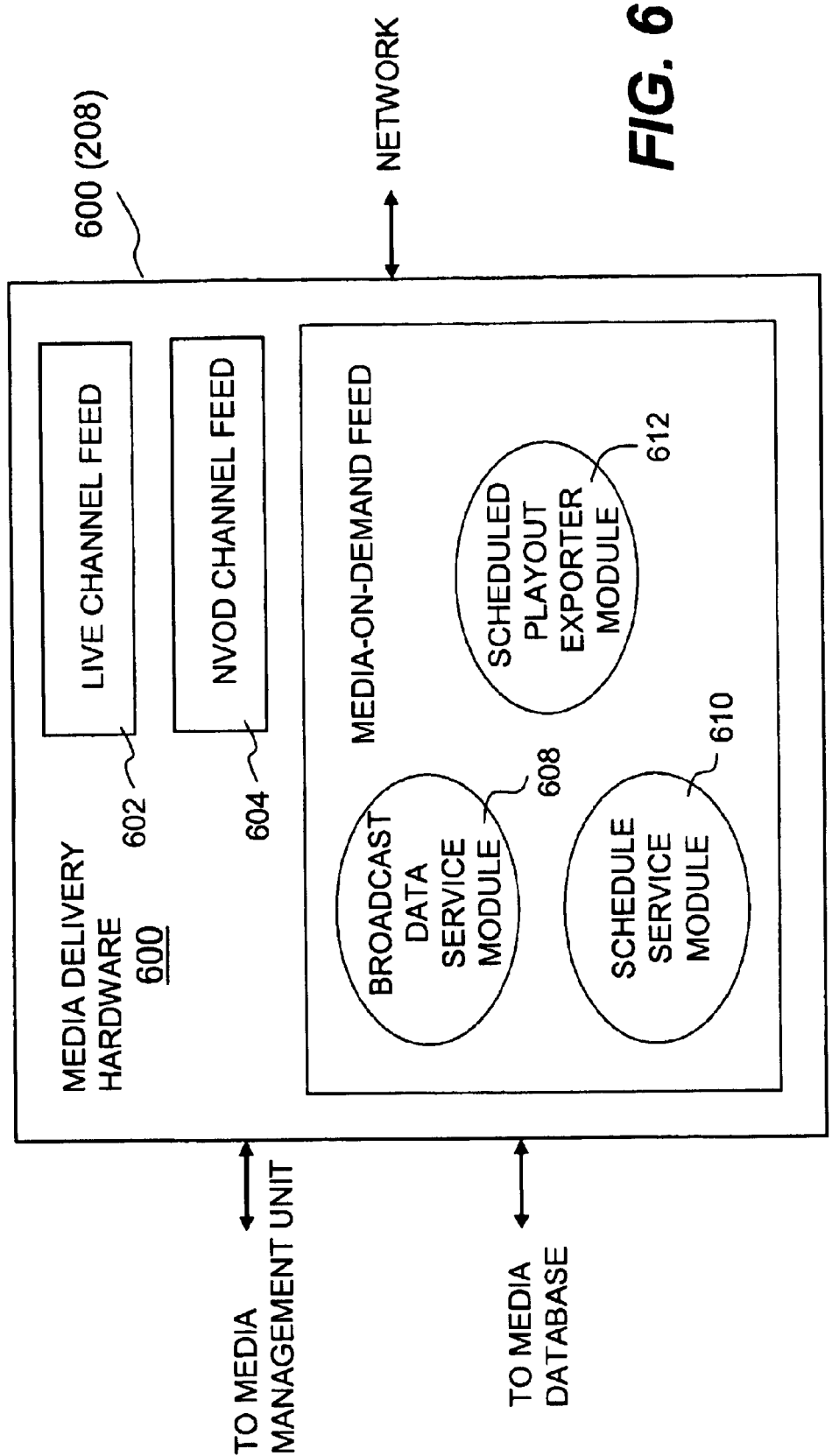
FIG. 6 is a block diagram of media delivery hardware according to one embodiment of the invention.

FIG. 6 is a block diagram of media delivery hardware 600 according to one embodiment of the invention. The media delivery hardware 600 is, for example, suitable for use as the media delivery hardware 208 illustrated in FIG. 2A. The media delivery hardware 600 can also be referred to as a video head-end.

The media delivery hardware 600 includes a live channel feed 602, a NVOD channel feed 604, and a media-on-demand feed 606. The live channel feed 602 serves to control the transmissions of live broadcasts over the network to subscribers. The delivery of the media content for live broadcasts is typically dependent upon a schedule for live content that has been set by the media management unit 204. In one embodiment, the media contents for a live broadcast is delivered over the network using multicasting and the IP protocol. The NVOD channel feed 604 serves to control the delivery of NVOD type media content over the network to subscribers. In one embodiment, the media contents for NVOD is delivered over the network using unicasting or multicasting and the IP protocol. The media-on-demand feed 606 serves to control the delivery of on-demand media content over the network to subscribers. In one embodiment, the media content for media-on-demand is delivered over the network using unicasting or multicasting and the IP protocol. In the case of media-on-demand delivery, the delivery of the media content is typically not dependent on a determined schedule.

The media on-demand feed 606 includes a broadcast data service module 608, a scheduler service module 610, and a scheduled playout exporter module 612. The broadcast data service module 608 serves to guide the retrieval of the media content from the media database and cause the media content to be transmitted (e.g., streaming) over the network. The media content can be broadcasted, unicasted, or multicasted over the network. Broadcast refers to transmission of content such that anyone able to receive the transmitted content. Unicast, also called one-to-one cast, refers to transmission of content to a particular subscriber. Multicast refers to transmission of content to a group of particular subscribers. In a data network, the address of a receiver is specified in a unicast communication packet while a unique address is used for specifying a broadcast communication packet. To provide efficient delivery of data to more than one but not all receivers, a special range of addresses designated for network multicast sessions are used in a multicast communication packet.

The scheduler service module 610 serves to schedule the delivery of certain media content to particular subscribers that requested such media content. In this regard, the particular subscribers can be identified by the IP addresses of the client machines. The scheduled playout exporter module 612 serves to control the distribution of media content from the media database in accordance with a determined play schedule which is typically used in near media-on-demand (NMOD) services. In a typical NMOD service, a particular program is repeatedly started according to a predefined schedule. For example, a new movie, because of its popularity, is scheduled to be played every 10 minutes so that more subscribers can participate in the show from the beginning. According to one embodiment, the movie can be cached in a particular location in a storage device in the media delivery center. The location of the movie in the storage device, which may include a pair of starting and ending addresses, is provided to the scheduled playout exporter module 612 that can be configured to associate the location with each of the scheduled times. As a result, only one recorded copy is retained in the storage device while multiple copies at different intervals can be provided to subscribers.

Figure 7A:
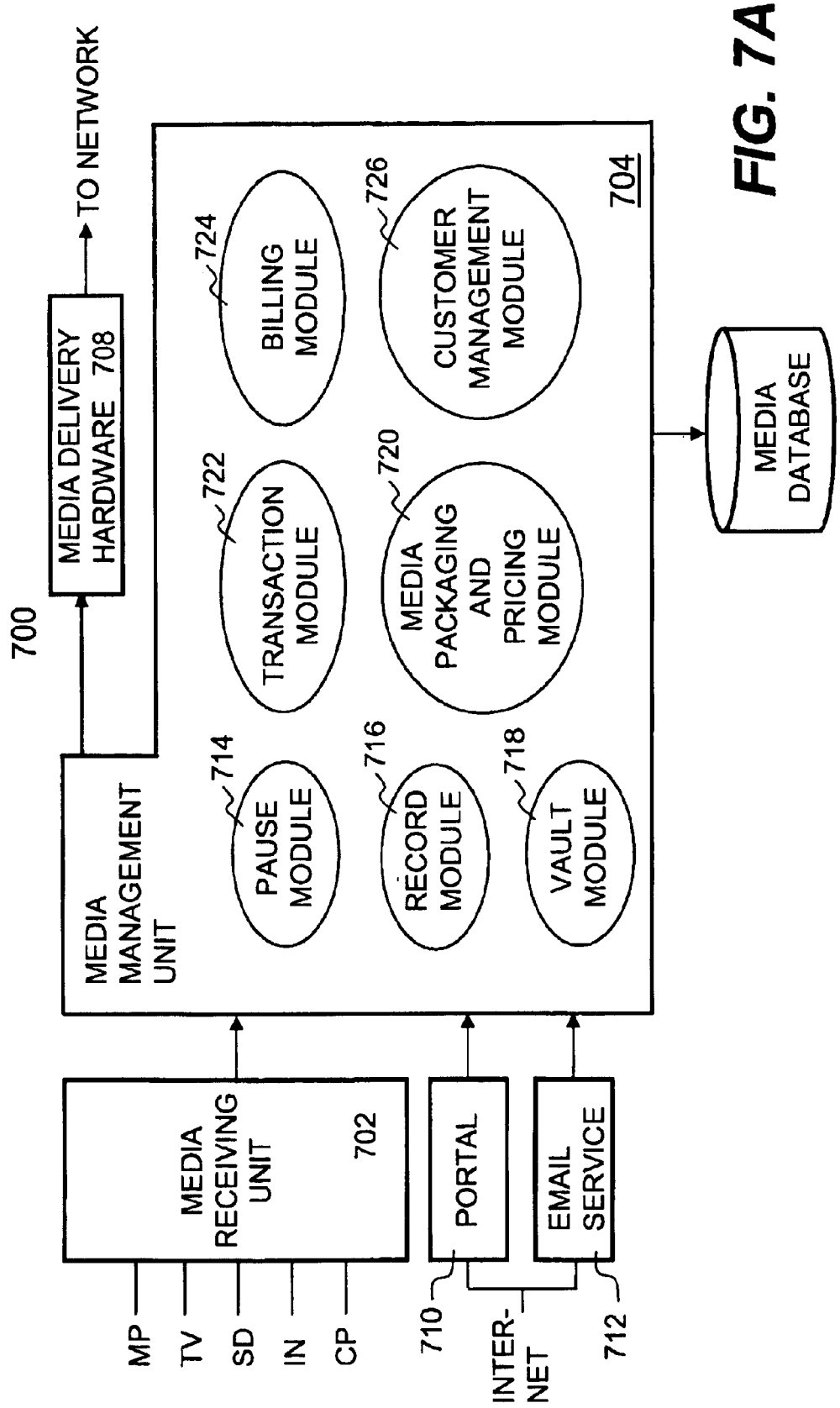
FIG. 7A is a block diagram of a media delivery center according to another embodiment of the invention.

FIG. 7A is a block diagram of a media delivery center 700 according to another embodiment of the invention. The media delivery center 700 represents a more detailed embodiment than the media delivery center 200 illustrated in FIG. 2A.

The media delivery center 700 includes a media receiving unit 702 that receives incoming media content from various media sources. A media management unit 704 controls the overall operation of the media delivery center 700. The media management unit 704 also couples to a media database 706 and media delivery hardware 708. The media database 706 stores the media content that is received and to be potentially delivered to subscribers via the media delivery hardware 708 over a network. The media receiving unit 702, the media database 706 and the media delivery hardware 708 are generally similar to the media receiving unit 202, the media database 206 and the media delivery hardware 708 of the media delivery center 200 illustrated in FIG. 2A.

In addition, the media delivery center 700 includes a portal 710 and an email service 712. The portal 710 and the email service 712 couple to the Internet and provide additional services to subscribers of the media system via the media delivery center 700. In other words, subscribers to the media system can access the Internet through the portal 710. Additionally, subscribers to the media system 700 can be provided with email capabilities through the email service 712. Hence, email and Internet access can be integrated into the media system.

The media management unit 700 is an integrated solution that allows for the overall management of the media system. In addition to the description of the media management system 500 discussed above with respect to FIG. 5A, the media management unit 700 can further include a pause module 714, a record module 716, and a vault module 718. The pause module 714 serves to control a pause functionality that is offered to subscribers so that they may effectively pause their viewing of a broadcasted program. The record module 716 allows subscribers to record programs for later viewing. The content being recorded is stored in the media database 706, and is thus in a central location. Additional detail on pausing and recording is contained in: (i) U.S. patent application Ser. No. 09/585,707, filed May 31, 200, and entitled "METHOD AND SYSTEM FOR PAUSING AND REPLAYING SCHEDULED MEDIA RICH BROADCASTS", the content of which is hereby incorporated by reference; and (ii) U.S. patent application Ser. No. 09/586,247, filed May 31, 2000, and entitled "METHOD AND SYSTEM FOR RECORDING SCHEDULED PROGRAMS WITHOUT LOCAL RECORDING EQUIPMENT", the content of which is hereby incorporated by reference.

The vault module 718 serves to provide personal storage for subscribers of the content recorded or paused either by the owner thereof or other designated subscribers who have limited access to the owner's account. In addition, the vault module 718 can provide a mechanism to facilitate a personal library and a bookmark.

According to one embodiment, the content or program recorded in the personal storage associated with a vault is identified by an index that includes location information of where the content recorded is located in a storage device, a title thereof, who and when the content was requested by for the retention, The index can be kept in a list maintained in the vault module 718 for the corresponding account. In some implementations, the index may be forwarded or emailed to another account. As a result, the subscriber of the other account can access the index to see what is in the corresponding vault.

A personal library is defined herein a collection of programs that a subscriber desires to review from time to time. The difference with respect to a media or video bookmark is that the programs in the personal library are typically stored in a storage space (e.g., a rental space) designated to the account, perhaps for a fee. On the other hand, while a bookmark maintains a list of indexes identifying where the indexed programs are stored remotely, the indexed programs may be in the personalized rental space or in the stored assets storage. Both of the personal library or the media bookmark are preferably accessed from a designed interactive element, such as a Vault icon, which will be further described below.

Figure 7B:
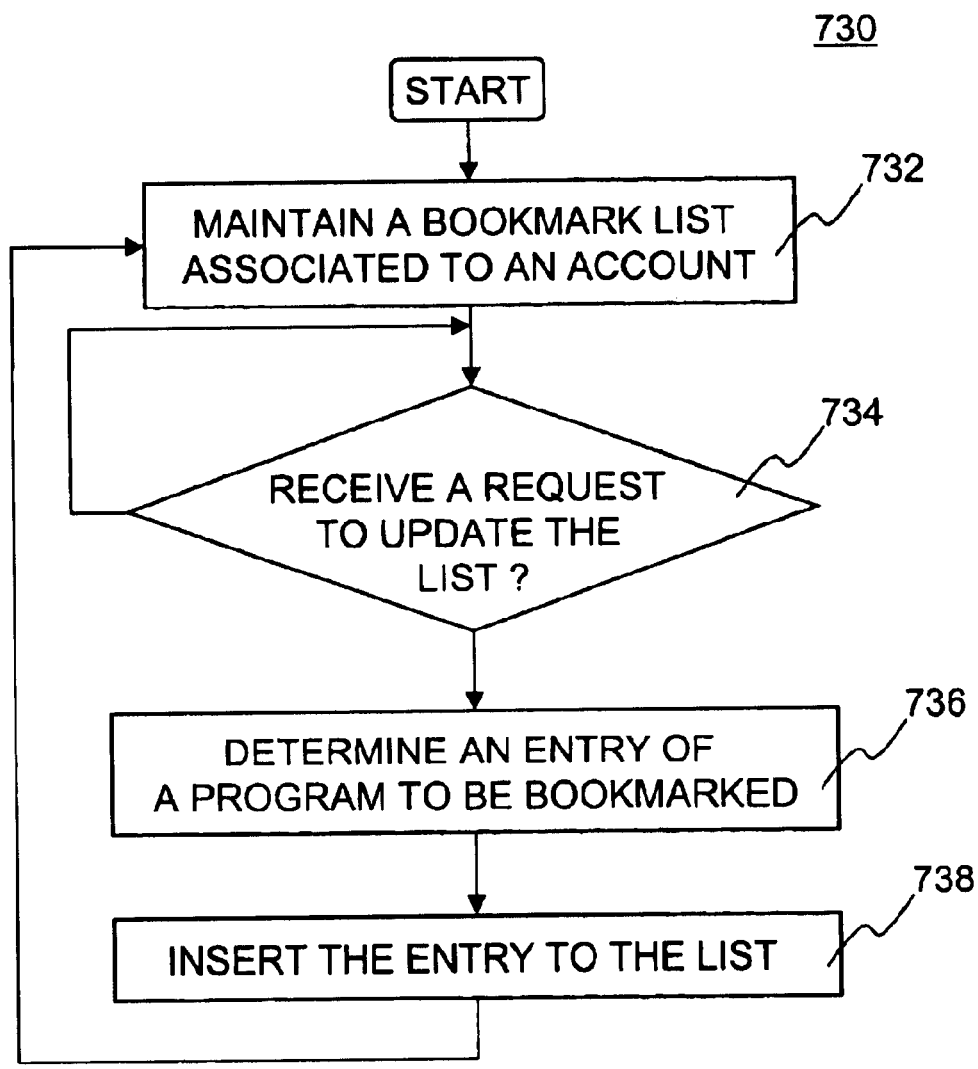
FIG. 7B shows a flowchart of a server-side bookmark list process according to one embodiment of the invention.

FIG. 7B shows flowchart of a bookmark list process 730 according to one embodiment of the invention. The bookmark list process 730 manages a bookmark list for a subscriber account in a media deliver center. A bookmark list is maintained 732 such that it is associated with an account. The bookmark list may be maintained through the media management system 205 of FIG. 2A and can be implemented using a linked list structure. In one embodiment, each account has a bookmark list that is directly resident in the account. In another embodiment, all bookmarks are located in a storage space and each of the bookmarks is coupled to a corresponding account. In either case, only the authorized subscriber is permitted to update the bookmark list in the account.

At a decision 734, a server that hosts the bookmark determines if a request to update the bookmark list has been received. Typically, a request to update bookmark list is sent out by a subscriber at a client machine through which the subscriber has located an interesting program and desires to bookmark the program. Generally, the program is one of the programs serviced and stored by the media deliver center. Upon determining that such request has been received, the bookmark list process 730 goes to determine 736 an entry that includes where the program is located in a storage device, the title and length of the program. The entry is then inserted 738 into the bookmark list. By now, the bookmark list has been updated with the new entry and is available for selection.

Figure 7C:
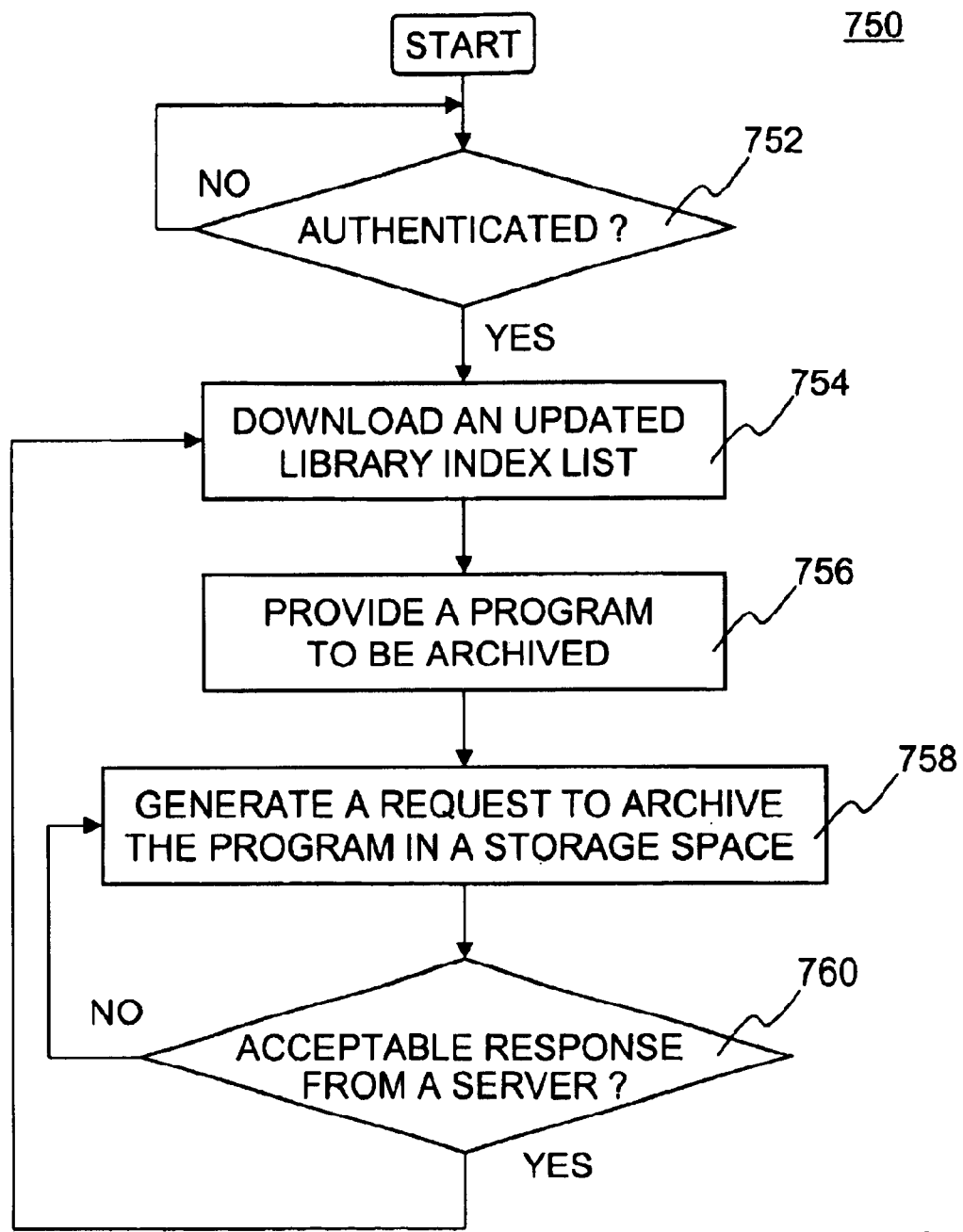
FIG. 7C shows a flowchart of a client-side video library process according to one embodiment.

It should be evident to those skilled in the art that the bookmark list process 730 can similarly be applied to a process of maintaining a personal library through maintaining a library index list. To fully understand the operation of the process of maintaining a personal library, FIG. 7C shows a flowchart of a library update process 750 according to one embodiment of the invention and may be understood in conjunction with FIG. 7B (with the bookmark list replaced with the library index list).

The library update process 750 begins with a decision 752 that determines whether a subscriber associated with a client device is authenticated. The client device is used by the subscriber to communicate with a media delivery center to receive the media services or applications. When the decision 752 determines that the subscriber is not authenticated, the library update process 750 cannot be carried out due to lack of authentication. In one embodiment, the authentication is checked based on username and password that can be verified against information in the corresponding subscriber account.

Once the decision 752 determines that proper authentication has been provided, then a library index list is received 754. In one embodiment, the library index list is downloaded from the media delivery center. The library index list typically includes entries, each corresponding to a previously stored program and having information on where the program is located in a storage space, production information, date and length of the program. The library index list is preferably assembled in a markup language, such as HTML, and each entry is a hyperlink that can be activated when displayed on a display screen.

The subscriber then provides 756 a program to be archived in the library. The program may be one of those programs provided by the media delivery center. In addition, the program can be provided by the subscriber from a local equipment such as a digital video camera. The use of a local source enables the subscriber to make his/her own videos and store them with the media delivery center in his/her video library. In any event, once the program to be archived is provided 756, a request to archive the program in a storage space is generated 758 in the client machine. The request may include IP addresses thereof and the server and information of the length or data capacity, or an ID of the selected program. Upon receiving the request, the media delivery center determines an entry for the corresponding library index list (similar to operation 736 of FIG. 7B). Before the entry is formed, the media delivery center may check the subscriber's account to see whether the account is permitted to accept the program (particularly when the subscriber is archiving the programs other than provided by the media delivery center, namely, user-provided programs). In one situation, the media delivery center needs to check if the account has subscribed enough storage spaces to archive the program. If the media delivery center cannot perform the archiving for one reason or another, a response is returned to the client machine. A decision 760 determines whether the client machine receives a response from the media delivery center that the library was successfully updated. When the decision 760 determines that the library update was refused, the library update process 750 can make another request by returning to operation 758. On the other hand, when the decision 760 determines that the library update was (or can be done) successful, then the media delivery center has updated the library list. In the case of user-provided programs, after the decision 760 determines that they can be done, their storage is achieved by being uploaded from the client machine to the storage space of the media delivery center. In either case, the media deliver center stores the received program in a storage space associated to the account of the requesting subscriber. Following the successful storage or archiving of the program, the list update process 750 returns to operation 754 where the updated library list is received. Typically, the updated library list is displayed by the client device.

Referring now back to FIG. 7A, the media management unit 700 further includes a media packaging and pricing module 720, a transaction module 722, a billing module 724, and a customer management module 726. The media packaging and pricing module 720 allows the media management unit 704 to customize its service packages and to also customize its pricing options. The transaction module 722 monitors subscriber's transactions request with respect to the media delivery center 700. For example, if a subscriber requests to receive a video-on-demand, the transaction module 722 can record an indication to cause the subscriber to be charged for that special service. As another example, the transaction module 722 can monitor that amount of time subscribers have used pause or record services. The billing module 724 can serve to automate the billing of each of the subscribers in accordance with their channel package as well as any special services they have utilized, such as pause, record, or on-demand request. The customer management module 726 allows the media management unit 704 to track customer requests, complaints and the like. The customer management module 726 also allows for the storage of customer related information including statistic measurement of viewing habits and likes or dislikes based on, for example, the viewing time on each of or predefined channels.

The media management system employed in a media delivery center provides a graphical user interface for a user, namely, an administrator (or operator), to interact with the media system (i.e., the media management system). FIGS. 8A–14C are representative screen shots associated with administrative functions that are provided by the media system. These screen shots are illustrative of administrative operations and features of the media system but are not to be deemed as limiting the invention.

The media system allows an administrator to interact with the media management unit of the media system through the graphical user interface. The graphical user interface can also be referred to as an administrator-client user interface. The administrator-client user interface provides a series of user interface screens to enable the administrator to interact with the media management unit. One of the features and advantages provided in the media system is the built-in flexible mechanism that permits the media system to be customized to fit its business needs and objectives. Another feature and advantage of the media system is to free the media system from any specific requirements set forth by different media delivery centers, thereby a generic media system is provided and permits each media delivery center to customize the media system in a desired way.

According to one embodiment, these user interface screens pertain to various modules. These modules include system setup, service and pricing, stored asset management, live asset management, customer management, device configuration, and billing.

Figure 8A:
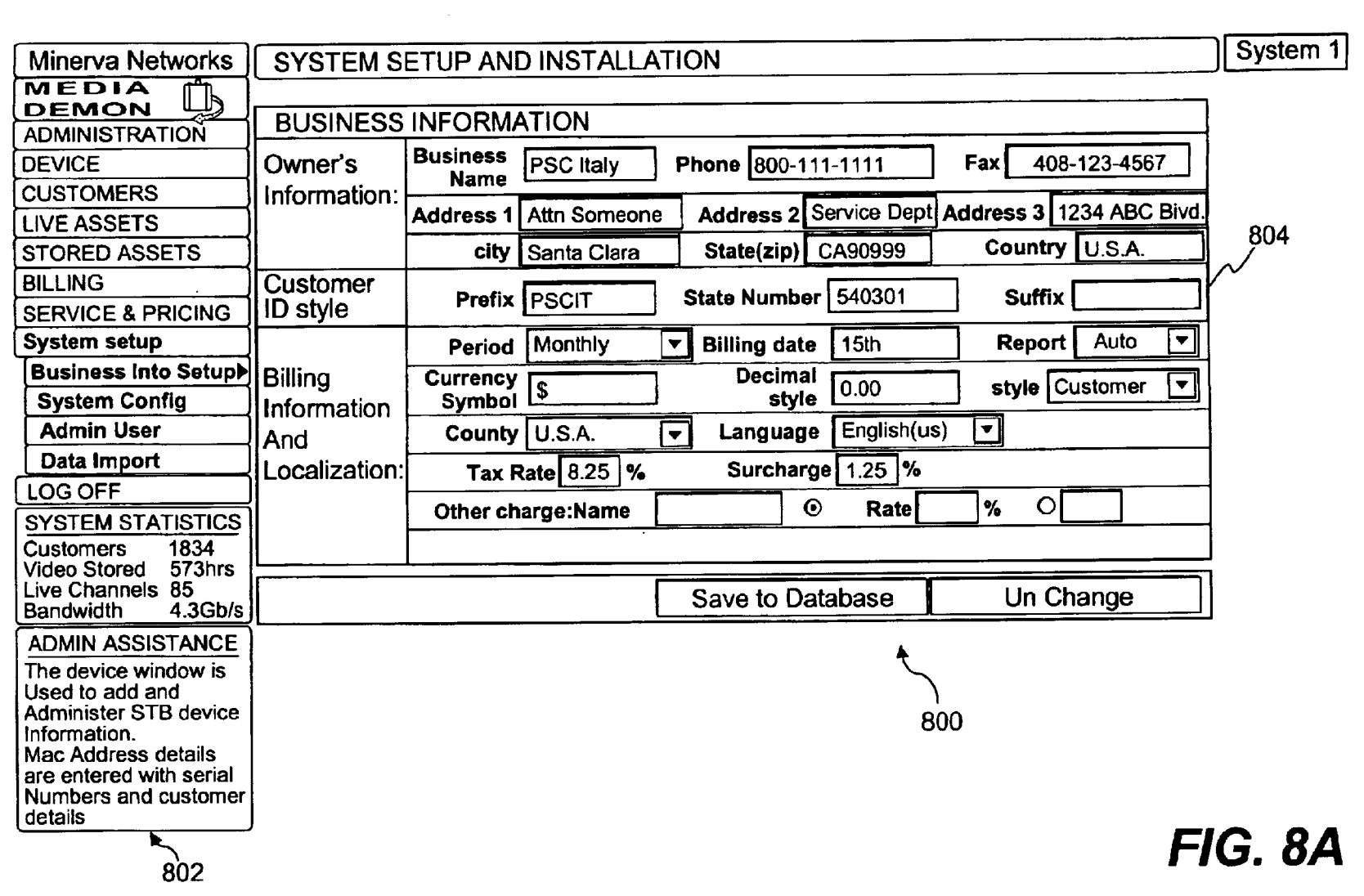
Figure 8E:
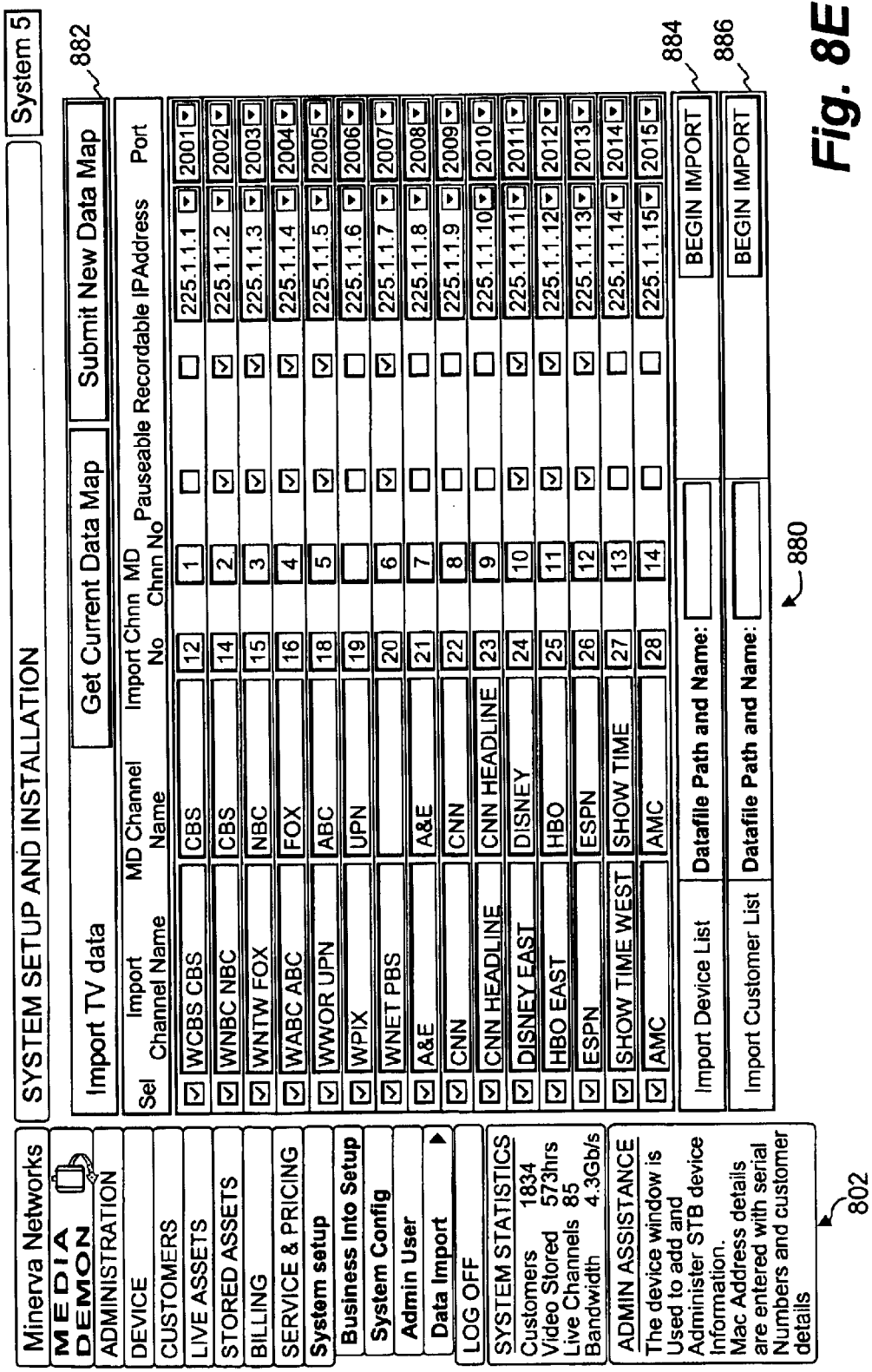

The system setup module includes a series of screens as depicted in FIGS. 8A–8E. FIG. 8A is a screenshot of a business information setup screen 800 according to one embodiment of the invention. The business information setup screen includes a navigation and information area 802 and a business information entry area 804. The navigation and information area 802 includes links (e.g., hyperlinks) to other modules of the administrator-client user interface as well as information pertaining to system statistics and administrative assistance. The business information entry area 804 presents a form that allows the administrator to enter information on a particular business. The information, for example, includes owner information, customer ID style, and billing information and localization information.

FIG. 8B is a screenshot of a system configuration screen 820 according to one embodiment of the invention. The system configuration screen 820 includes the navigation and information area 802 as discussed above, a system configuration area 822, a VNP configuration area 824, and an add new VNP area 826. The system configuration area 822 allows the administrator to configure the system with respect to program guide and channel information, video standard, and demon control. The VNP configuration area 824 illustrates the VNPs that are available in the media system as well as whether a channel has been assigned to them. In this regard, the VNP has an identifier (ID), an IP address, and a port number. A channel can be assigned to a particular VNP and have an assigned channel name, and an assigned channel number. The VNP configuration area can also provide a channel type and indicate whether pause or record are available for the assigned channel. The add new VNP area 826 allows a VNP device to be configured for addition to the media system. In addition, the system configuration screen 820 can also allow a VNP of the media system to be edited or deleted.

FIG. 8C is a screenshot of an administration user screen 840. The administration user screen 840 includes the navigation and information area 802, an administration user management area 842, and an add new administration user area 844. The administration user management area 842 lists those users who are registered with the system with administrator access. For each administrator, their name, account status and login are provided. In addition, with respect to each of the various modules available by the media management unit, the administration user management area 842 can also indicate whether or not the particular administrator has access to such modules. Accordingly, certain administrators can have access to limited modules as appropriate. The add new administration user area 844 allows information to be entered for a new administration user as well as the ability to limit the new administration user's access to certain modules. The administration user screen 840 can also allow an administration user (administrator) of the media system to be edited or deleted by selection of an edit admin. button 846 or delete admin. button 848, respectively. FIG. 8D illustrates an administration user screen 860 according to one embodiment of the invention. The administration user screen 860 represents the administration use screen 840 in FIG. 8C after the edit admin. button 846 is selected. The administration user screen 860 includes an edit selected administration user 862. The edit selected administration user 862 can be utilized to edit a selected one of the previously existing administration users.

FIG. 8E is a screenshot of a data import screen 880 according to one embodiment of the invention. The data import screen 880 includes the navigation and information area 802, an import TV data area 882, an import device list area 844, and an import customer list area 886. The import TV data area 882 allows various incoming channels to be selected for import, assigned an system channel name and/or system channel number, selected whether or not the channels are pausable or recordable, and assigned IP addresses and ports for the imported TV data. The assignment of imported channels to internal channels and their attributes is referred to as data mapping or data map, and the import TV data area 802 allows the current data map to be displayed or a new data map to be submitted.

The service and pricing module includes a series of screens that allow service packages and various pricing components to be managed by an administrator. These screen are depicted in FIGS. 9A–9F.

Figure 9B:
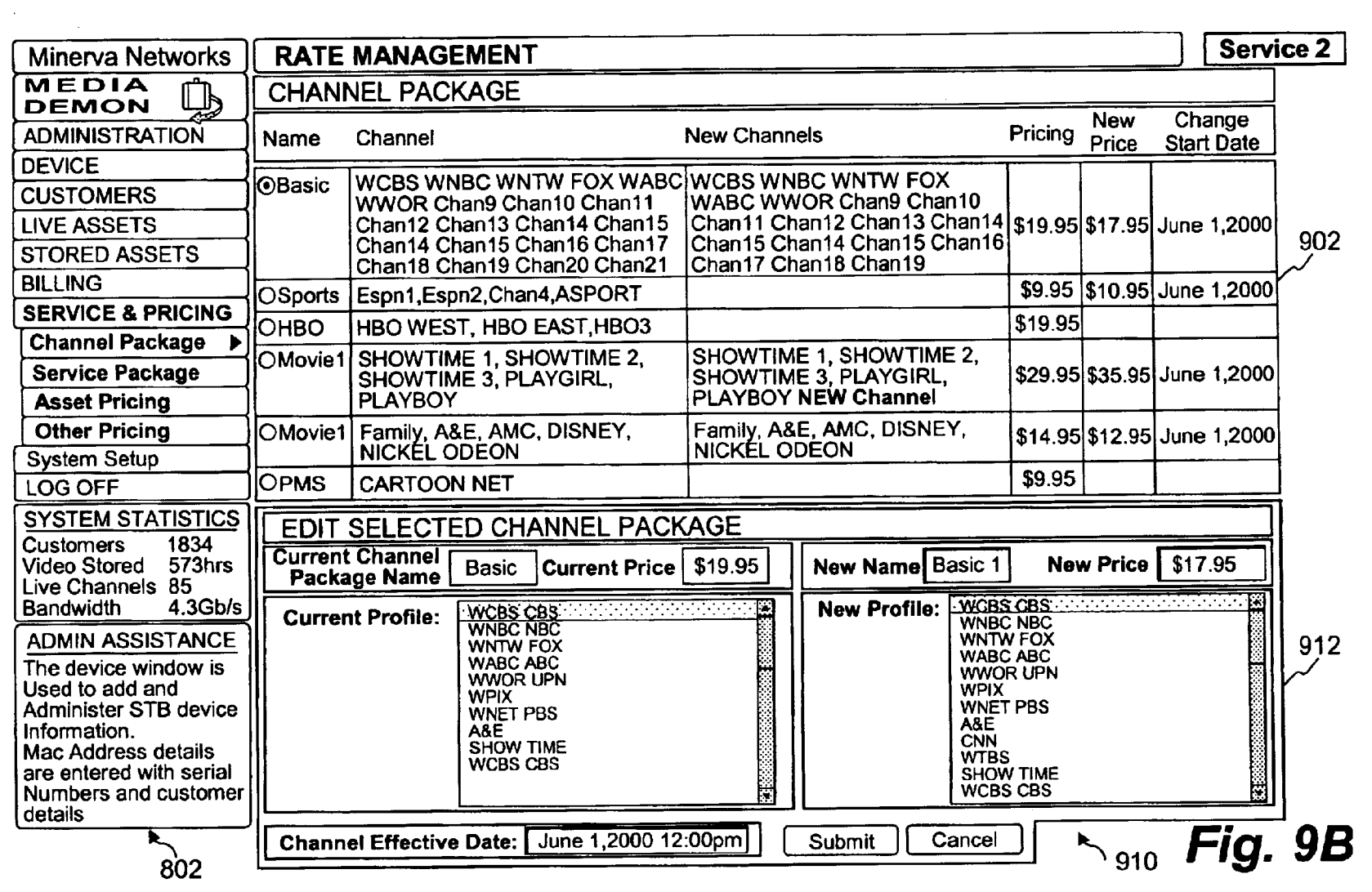

FIG. 9A is a screenshot of a channel package pricing screen 900 according to one embodiment of the invention. The channel package pricing screen 900 includes the navigation and information area 802, a channel package area 902 and an add new channel package area 904. The channel package area 902 list the existing channel packages by their names and associates channel and processing information therewith. The add new channel package area 904 allows an administrator to provide a new channel package, set its price and its start date. Besides adding a new channel package, the channel package processing screen 900 can also enable an administrator to edit or delete a channel package. FIG. 9B illustrates a channel package pricing screen 910. The channel package pricing screen 910 includes the navigation and information area 802, the channel package area 902, and an edit selected channel package area 912. For a particular channel package that is selected in the channel package area 902, the edit selected channel package area 912 enables the administrator to alter the attributes of a particular channel package and set a date as to when the changes to the channel package become effective.

FIG. 9C is a screenshot of a service package pricing screen 920 according to one embodiment of the invention. The service package pricing screen 920 includes the navigation and information area 802, a service package area 922, and an add new service package area 924. The service package area 922 lists the available service packages that have been previously defined. For each of the packages, the displayed information includes: package name, services, pricing, promotion package, promotion start date, promotion end date, new services, new price, and new pricing start date. The services provided with a service package include a channel package as well as possibly additional services such as pause, record and/or Internet access. The add new service package area 924 allows a new service package to be created. For each new service package being created the information provided at the add new service package area 924 includes: new service package name, associated channel package(s), pricing for the service package, start date, promotion package, promotion start date, promotion end date, amount of record space (e.g., in hours), and whether pause and/or Internet access are provided with the service package. Such information can also be referred to as attributes of the service package. The service package pricing screen 920 also allows an administrator to edit or delete an existing service package. FIG. 9D illustrates a screenshot of a service package pricing screen 930 according to one embodiment of the invention. The service package pricing screen 930 is generally similar to the service package pricing screen 920 illustrated in FIG. 9C. However, the service package pricing screen 930 includes an edit selected service package area 932 instead of the add new service package 924. The edit selected service package 932 allows a particular service package selected in the service package area 922 to be edited by the administrator. Accordingly, an administrator is able to not only create new service packages (FIG. 9C) but also modify the attributes associated with existing service packages (FIG. 9D).

FIG. 9E is a screenshot of an asset pricing screen 940 according to one embodiment of the invention. The assets are stored assets that can be delivered to subscribers as VOD or NVOD. The asset pricing screen 940 includes the navigation and information area 802, a VOD set pricing area 942, and a NVOD set pricing area 944. The VOD set pricing area 942 allows a stored asset to be assigned to a VOD set which can have a number of rates (pricing levels) associated therewith. For example, with respect to the VOD set "1st Syn." there are four possible pricing levels A, B, C and D whose rates are provided. Note that these rates (Pricing) are set so that the stored assets can be aged automatically. The rental times (Rental Time) for the rates also can age automatically. Hence, for each rate type, there is a cost (Pricing) and a time period (Change Time) before the asset is changed to the next level. The VOD sets can also be created, altered or deleted. The NVOD pricing area 944 is similar to the VOD pricing area 942. For those stored assets used for NVOD, there is a field (Rental Time) that indicates when/how long the subscriber has to view the NVOD stored asset.

FIG. 9F illustrates a screenshot of another pricing screen 960 according to one embodiment of the invention. The other pricing screen 960 includes the navigation and information area 802, a record space rental pricing area 962, a special offer area 964, and a pause and Internet access area 966. The various areas 962, 964 and 966 provided with the other pricing screen 960 enable an administrator to set prices for the various other features or services that can be provided with a service package or as a supplement thereto. The record space rental pricing area 962 indicates the price for renting a certain number of hours of recording space and allows new prices to take effect on an effective date. The special offer area 964 allows special offers to be defined, priced and have a start and end date on the availability of the special offers. The pause and Internet access area 966 allows the rates for pause and Internet access to be defined as well as to allow for new pricing to be set to take effect on an effective date.

The stored asset management module of the graphical user interface includes a series of screens that allow stored assets to be added, edited, deleted, profiled or scheduled for recording. These screen are depicted in FIGS. 10A–10E.

FIG. 10A is a screenshot of a stored assets list management screen 1000 according to one embodiment of the invention. The stored assets list management screen 1000 includes the navigation and information area 802, a stored assets list area 1002, an asset profile area 1004, and an assets command area 1006. The stored assets list 1002 provides a list of the stored assets within the media system. The stored assets within the stored assets list can be listed (ordered) in a variety of different ways based on browser category, subcategory, rating, type, etc. The asset profile area 1004 provides a profile for a selected one of the stored assets. For example, the assets profile area 1004 provides information such as title, episode title, category, subcategory, rating, encode type, asset added by, asset added date time, VOD set, NVOD set, NVOD channel, current trailer, trailer list, location (storage location) and description. The assets control area 1006 allows an administrator to delete, edit or add assets to the stored assets list 1002. In addition, when adding assets to the stored assets, there are several options on how the assets can be added. For example, assets can be added from a newly received assets list, from entering data manually, or from a scheduled recording from a program guide.

When assets are to be added from the newly received assets list, a stored asset management screen 1010 illustrated in FIG. 10B can be presented to the administrator according to one embodiment of the invention. The stored asset management screen 1010 includes the navigation and information area 802, the stored assets list 1002, and an add assets from asset list area 1012. The add assets from asset list area 1012 allows assets to be added to the stored assets from an identified asset list. Typically, some or all of the profile information for the assets being added is imported from the newly received assets list.

Figure 10C:

When assets are to be added from a scheduled recording from a program guide, a stored asset management screen 1020 illustrated in FIG. 10C can be presented to the administrator according to one embodiment of the invention. The stored asset management screen 1020 includes the navigation and information area 802, the stored assets list 1002, and an add assets from program schedule area 1022. The add assets from program schedule area 1022 displays at least a portion of a program schedule and allows an administrator to select to record a program from the program schedule. Once a program has been selected, profile information for this selected program can be automatically filled in and/or entered or modified by the administrator.

Figure 10D:

When assets are to be added manually, a stored asset management screen 1030 illustrated in FIG. 10D can be presented to the administrator according to one embodiment of the invention. The stored asset management screen 1030 includes the navigation and information area 802, the stored assets list area 1002, and an add assets by entering data area 1032. Here, an administrator can add profile information pertaining to an asset to be added to the stored assets by manually entering data into the form provided in the add assets via the entering data area 1032.

Still further, when stored asset information is to be edited or modified, a stored asset management screen 1040 illustrated in FIG. 10E can be presented to the administrator according to one embodiment of the invention. FIG. 10E is a screenshot of a stored asset management screen 1040 according to one embodiment of the invention. The stored asset management screen 1040 includes the navigation and information area 802, the stored assets list 1002, and a modify asset area 1042. Here, an administrator can interact with the modify asset area 1042 to alter previously determined profile information for the particular asset being modified.

The live asset management module of the graphical user interface includes a series of screens that allow live assets to be added, edited, deleted from channels offered by the media system. These screen are depicted in FIGS. 11A–11G.

Figure 11A:
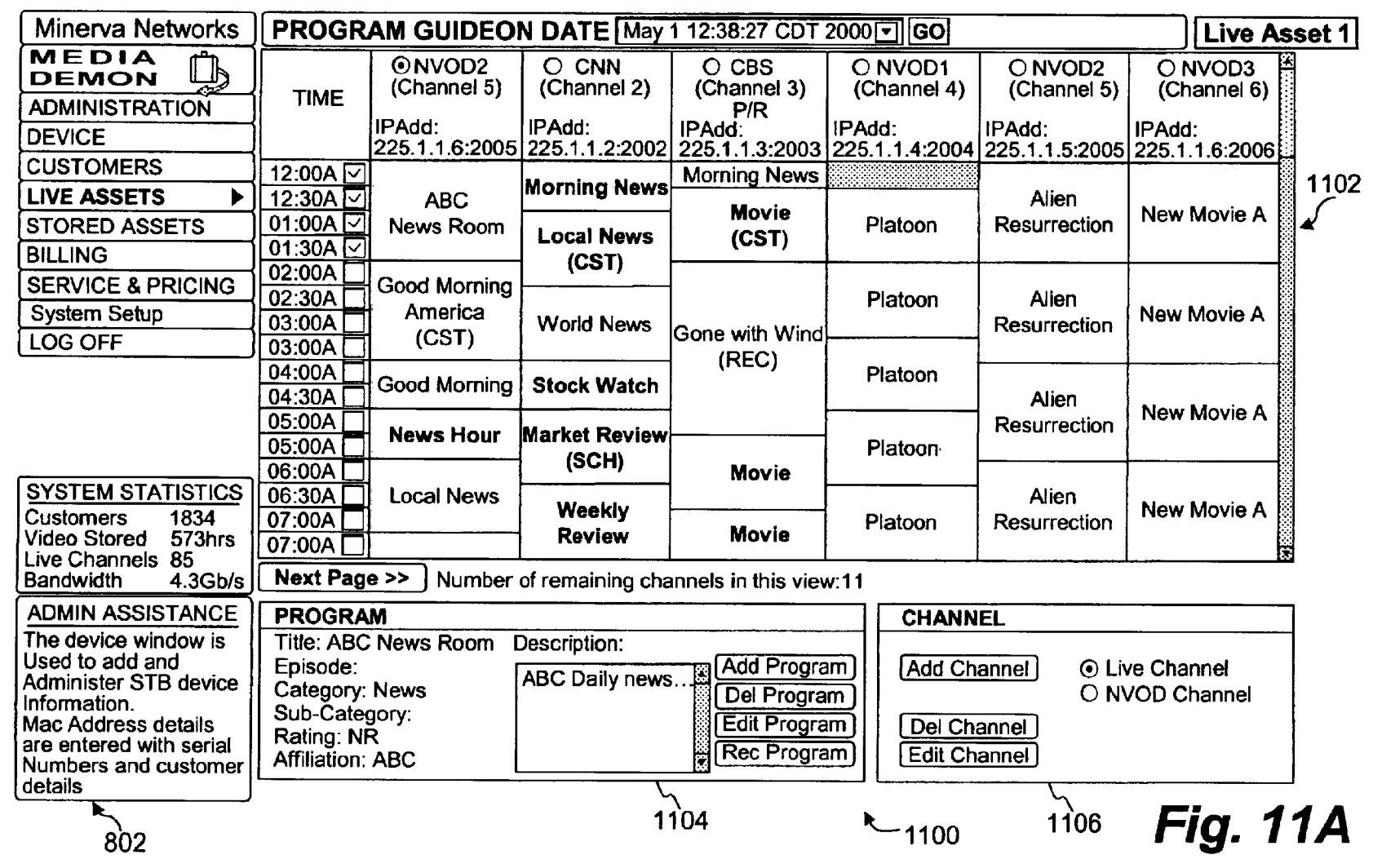

FIG. 11A is a screenshot of live asset management screen 1100 according to one embodiment of the invention. The live asset management screen 1100 includes the navigation and information area 802, a program guide area 1102, a selected program area 1104, and a selected channel area 1106. The program guide area 1102 displays a program guide of the various channels and programs being offered as live assets by the media system. The programs are arranged in a grid-like fashion with rows pertaining to time slots and columns pertaining to channels. The selected program area 1104 provides certain profile information about a selected program and enables the administrator to add, delete, edit or record programs. The selected channel pertains to the channel that has been selected with respect to the program guide illustrated in the program guide area 1102. In this example, channel 1 has been selected. The selected channel area 1106 pertains to the channel that has been selected with respect to the program guide illustrated in the program guide area 1102. The selected channel area 1106 allows an administrator to add, delete or edit a channel. The channel can be either a live channel or a NVOD channel.

Figure 11B:
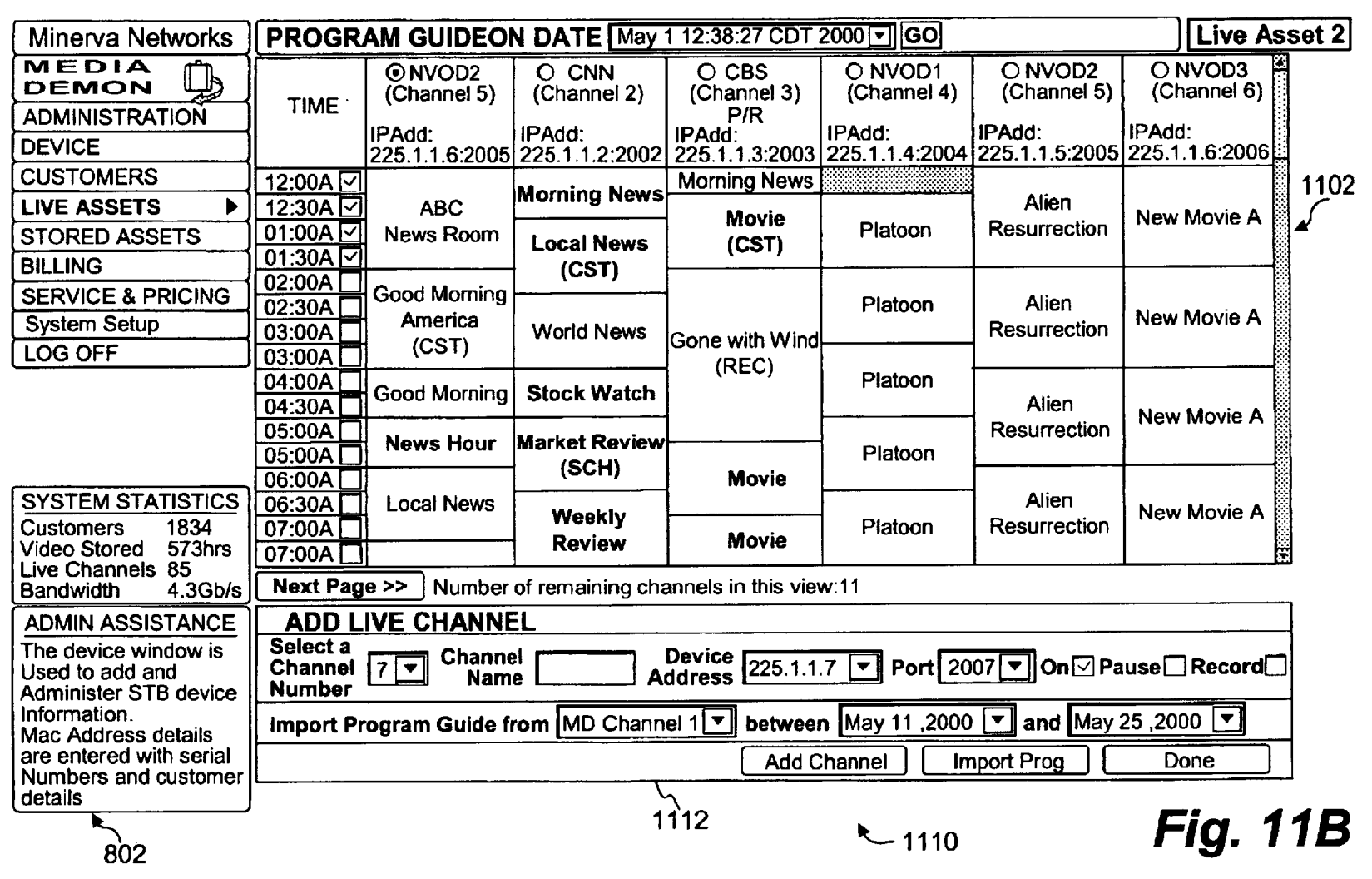
Figure 11C:

FIG. 11B is a screenshot of a live asset management screen 1110 according to one embodiment of the invention. The live asset management screen 1110 follows from the live asset management screen 1100 illustrated in FIG. 11A after the administrator has requested to add a live channel using the selected channel area 1106. The live asset management screen 1110 includes the navigation and information area 802, the program guide area 1102, and an add live channel area 1112. The add live channel area 1112 allows the administrator to add a live channel to the program guide and thus make it available. In adding a live channel, the administrator can enter a channel number, channel name, device address, port, and indicate whether a channel is on, and indicate whether pause or record are available. In addition, a program guide for this added live channel can be imported from another channel. Similarly, FIG. 11C illustrates a live asset management screen 1120 according to one embodiment of the invention. The live asset management screen 1120 includes the navigation and system area 802, the program guide area 1102, and an add NVOD channel area 1122. The add NVOD channel area 1122 allows the administrator to add a NVOD channel to the program guide and thus make the newly created channel available. In this example, the administrator can provide a channel number, channel name, device address, port, and whether channel is on. The administrator can also set a start date and time, a number of days to repeat the content and how often to repeat each day. Further, the administrator can select available content from an NVOD content list.

Figure 11D:

FIG. 11D is a screenshot of a live asset management screen 1130 according to one embodiment of the invention. The live asset management screen 1130 includes the navigation and information area 802, the program guide area 1102 and an edit NVOD channel area 1132. The edit NVOD channel area 1132 allows an administrator to modify an existing channel, such as with respect to channel number, channel name, device address or port. The edit live channel area 1132 can also allow the administrator to turn a channel on and off.

Figure 11E:

FIG. 11E is a screenshot of a live asset management screen 1140 according to one embodiment of the invention. The live asset management screen 1140 includes the navigation and system area 802, the program guide area 1102, and a edit live channel area 1142. The edit live channel area 1142 allows an administrator to modify the attributes (properties) of an existing live channel. In particular, the administrator can interact with the edit live channel area 1142 to change channel number, channel name, device address or port. Furthermore, an administrator can also toggle the channel on and off, indicate whether the channel can be paused, and indicate whether the channel can be recorded.

FIG. 11F is a screenshot of a live asset management screen 1150 according to one embodiment of the invention. The live asset management screen 1150 includes the navigation and information area 802, a program guide area 1152, and an add program to the selected live channel area 1154. The program guide area 1152 displays a program guide and allows for the selection of program regions within the program guide. Here, for example, there is an opening in the program guide for channel 3 at the time slot from 2:00 AM to 5:00 AM. The add program to the selected live channel area 1154 allows the administrator to identify a program to be placed in the selected open region within the program guide. In adding the program to the selected live channel, the administrator can enter profile information pertaining to the program, such as title, episode title, category, subcategory, rating, affiliation and description.

Figure 11G:

FIG. 11G is a screenshot of a live asset management screen 1160 according to one embodiment of the invention. The live asset management screen 1160 includes the navigation and system information area 802, the program guide area 1102, and an edit selected program area 1162. With respect to the selected program "Gone with the Wind" appearing on channel 3 between 2:00 AM and 5:00 AM in the program guide, the selected program can be edited as to its profile information by the administrator using the edit selected program area 1162.

The customer management module of the graphical user interface includes a series of screens that allow an administrator to monitor customer interactions. These screen are depicted in FIGS. 12A–12H.

Figure 12A:
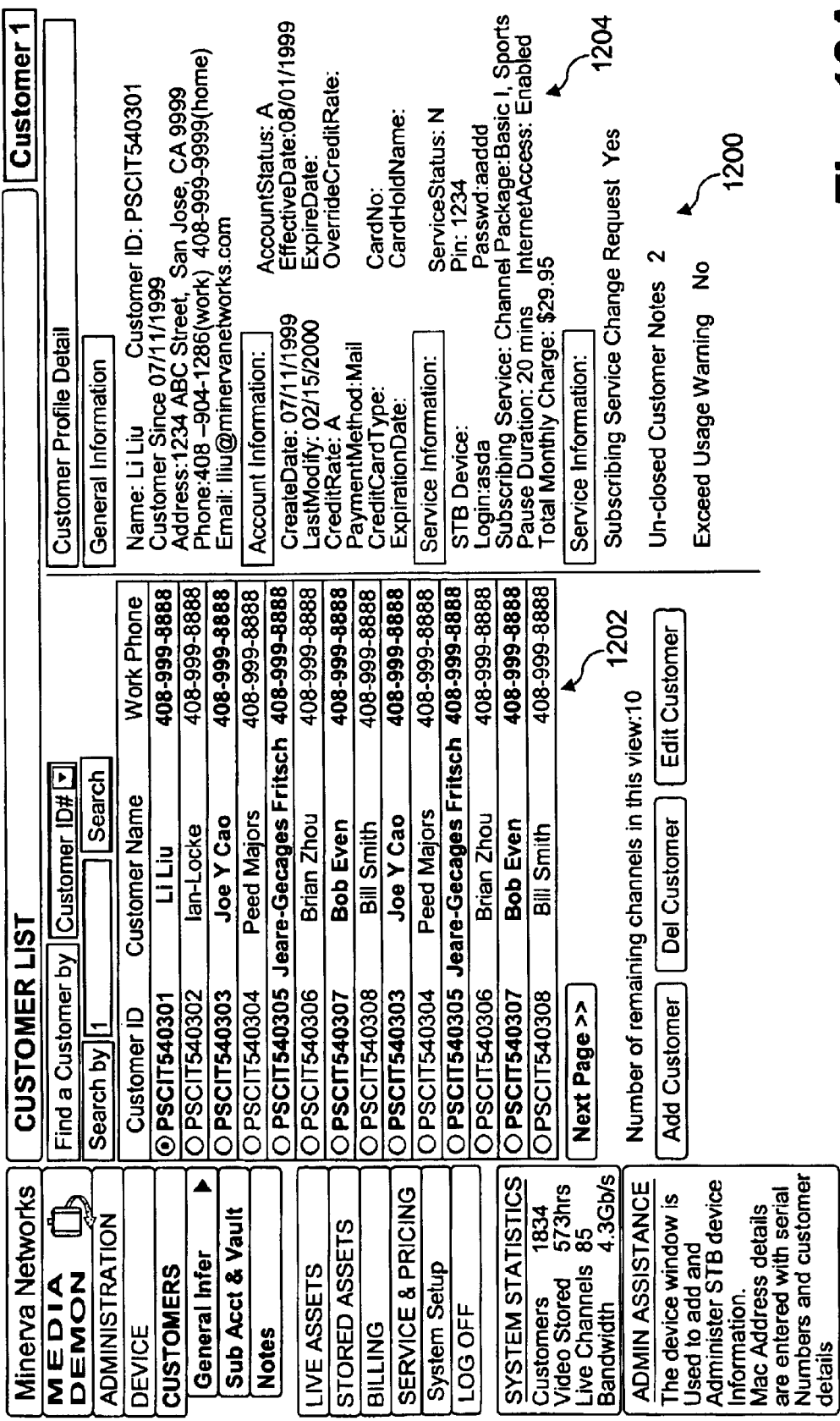

FIG. 12A is a screenshot of a customer management screen 1200 according to one embodiment of the invention. The customer management screen 1200 includes the navigation and information area 802, the customer list area 1202, and a customer profile detail area 1204. The customer list area 1202 displays a customer list which includes those customers of the media system. The customer list typically includes information such a customer name and customer ID. Additionally, the ordering of the customer list can be varied and searches can be performed on the customer list such as to locate customers by their attributes (e.g., customer ID or name). The customer profile detail area 1204, in this example, provides information (detailed profile) to the administrator about a selected one of the customers from the customer list. Namely, in this example, the detailed profile about the selected customer includes general information, account information, service information, and administrative attention information can be provided.

FIG. 12B is a screenshot of a customer management screen 1210 according to one embodiment of the invention. The customer management screen 1210 includes the navigation and information area 802, the customer list area 1202, and another customer profile area 1212. The customer profile area 1212 includes general information, vault information, secondary account information and administrative attention information pertaining to the selected customer. As compared with the customer management screen 1200, the customer management screen 1210 includes vault information in the customer profile information. The vault information indicates information about programs that have been recorded on behalf of the selected customer. These recorded programs can be either scheduled live programs that are recorded or rented programs that are recorded for a period of time for the customer's benefit. The vault information can also indicate whether the content has been played back from the vault. In other words, the vault represents central media storage for the customers, with each customer (account) having their own personal vault. A customer account can have secondary accounts for other users of the account besides the primary user. The secondary account information indicates any secondary accounts that is might be associated with the account. These secondary accounts can have restricted access levels and other limited service. For example, recording or email capabilities could be disabled, Internet capability could be disabled, and limits (e.g., dollar limit) can be set for VOD or NVOD usage.

Figure 12C:
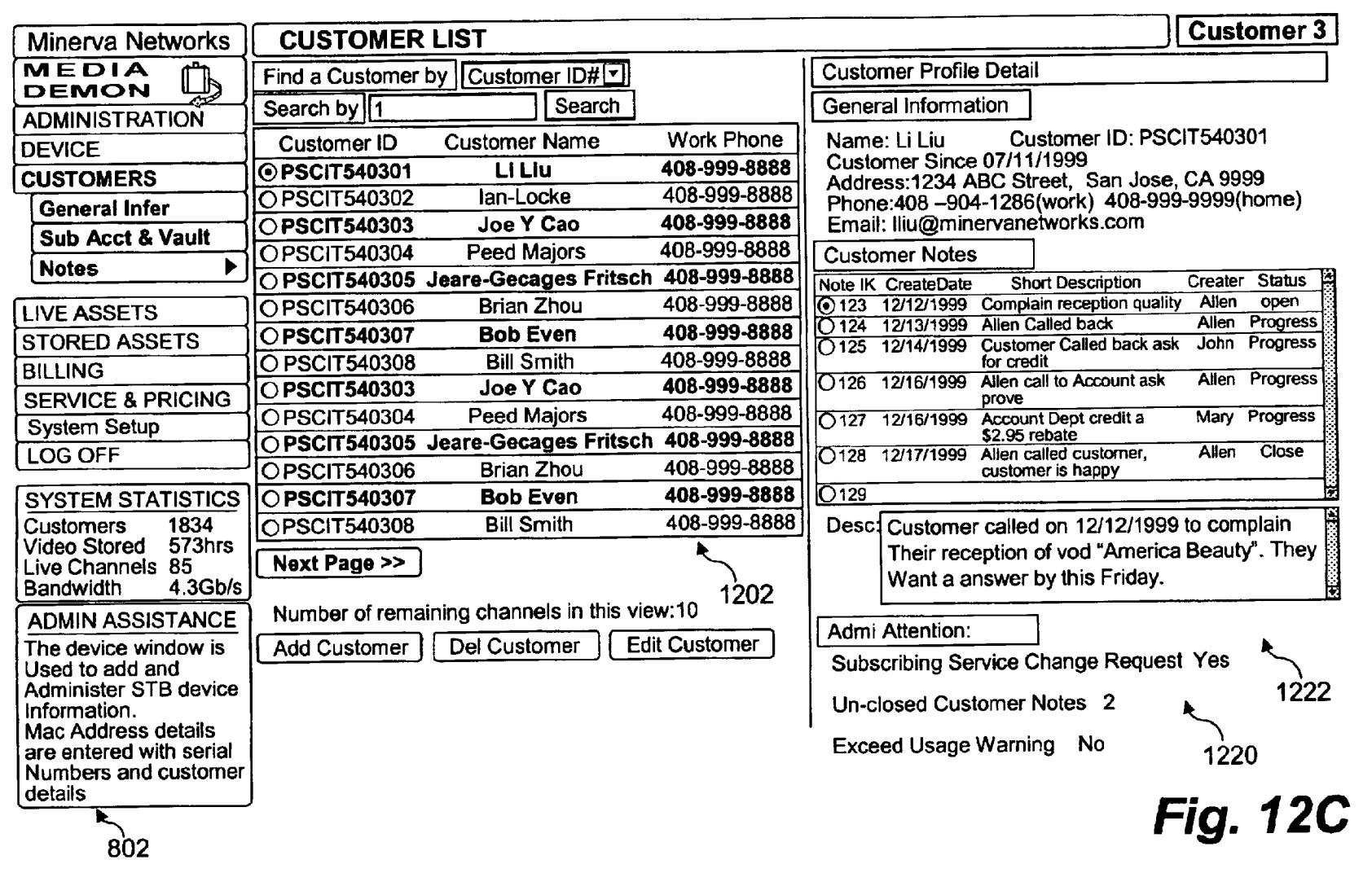

FIG. 12C is a screenshot of a customer management screen 1220 according to one embodiment of the invention. The customer management screen 1220 includes the navigation and information area 802, the customer list area 1202, and a customer profile detail area 1222. In this representative screenshot, the customer profile detail area 1222 includes general information, customer notes, and administration attention information. The customer notes provide a historical account of customer complaints and actions taken in response to those complaints so that the administrator can easily review the status of the complaints. In this regard, the customer notes can also indicate whether the status of the complaint is open, in progress, or closed. Besides status, the customer notes can indicate creation date, short description, creator, and possibly a detailed description.

Figure 12D:

FIG. 12D is a screenshot of a customer management screen 1230 according to one embodiment of the invention. The customer management screen 1230 includes the navigation and information area 802, the customer list area 1202, and an add customers area 1232. When the administrator desires to add a customer to the media system, and thus to the customer list, an add customer button can be selected. Then, in response to such a selection, the customer management screen 1230 can be presented to the administrator. Then, the administrator can interact with the add customers area 1232 to provide information about the customer being added to the media system. Such information pertaining to the customer includes name, address, account information, and services information. With respect to the service information, a customer ID, a login, a password, a PIN number, an effective date, an expiration date, and a selected service package can all be indicated. Here, the selected service package is one of the defined service packages. However, if a customized service package is desired, then a customized service button 1234 can be selected. If the customized service button 1234 is selected, then the customer management screen 1230 is updated to a customer management screen 1240 as illustrated FIG. 12E. The customer management screen 1240 is generally similar to the customer management screen 1230, except that additional selections are able to be made under the services portion of an add customers area 1242. These additional selections pertain to the particular service being supplied to the customer. For example, after the service package is selected, the add customers area 1242 provides the administrator the ability to enhance the selected service package by live channels, internet access, record duration or pause TV. Also, the administrator can select a standard service button 1244 to return to the customer management screen 1230 in which these enhancements to the selected service packages are not illustrated.

FIG. 12F is a screenshot of a customer management screen 1250 according to one embodiment of the invention. The customer management screen 1250 includes the navigation and information area 802, the customer list area 1202, and an edit selected customer area 1252. Here, the administrator can interact with the edit selected customer area 1252 to edit the customer information pertaining to a selected one of the customers. More particularly, as shown in FIG. 12F, the edit selected customer area 1252 allows the administrator to edit general information, account information or service information pertaining to the selected customer. It should be noted that the service information allows a customer to request a new service arrangement and to allow that new service to begin on an effective date. FIG. 12G is a screen shot of a customer management screen 1260 according to one embodiment of the invention. The customer management screen 1260 includes the navigation and information area 802, the customer list area 1202, and an edit selected customer area 1262. Here, the edit selected customer area 1262 allows the administrator to review or interact with general information, vault information, and secondary account information. For example, the administrator can interact with the secondary account information to edit the parameters of the secondary accounts, thereby restricting access or setting limits as appropriate. As another example, the administrator can delete entries from the vault on behalf of the customer.

Figure 12H:
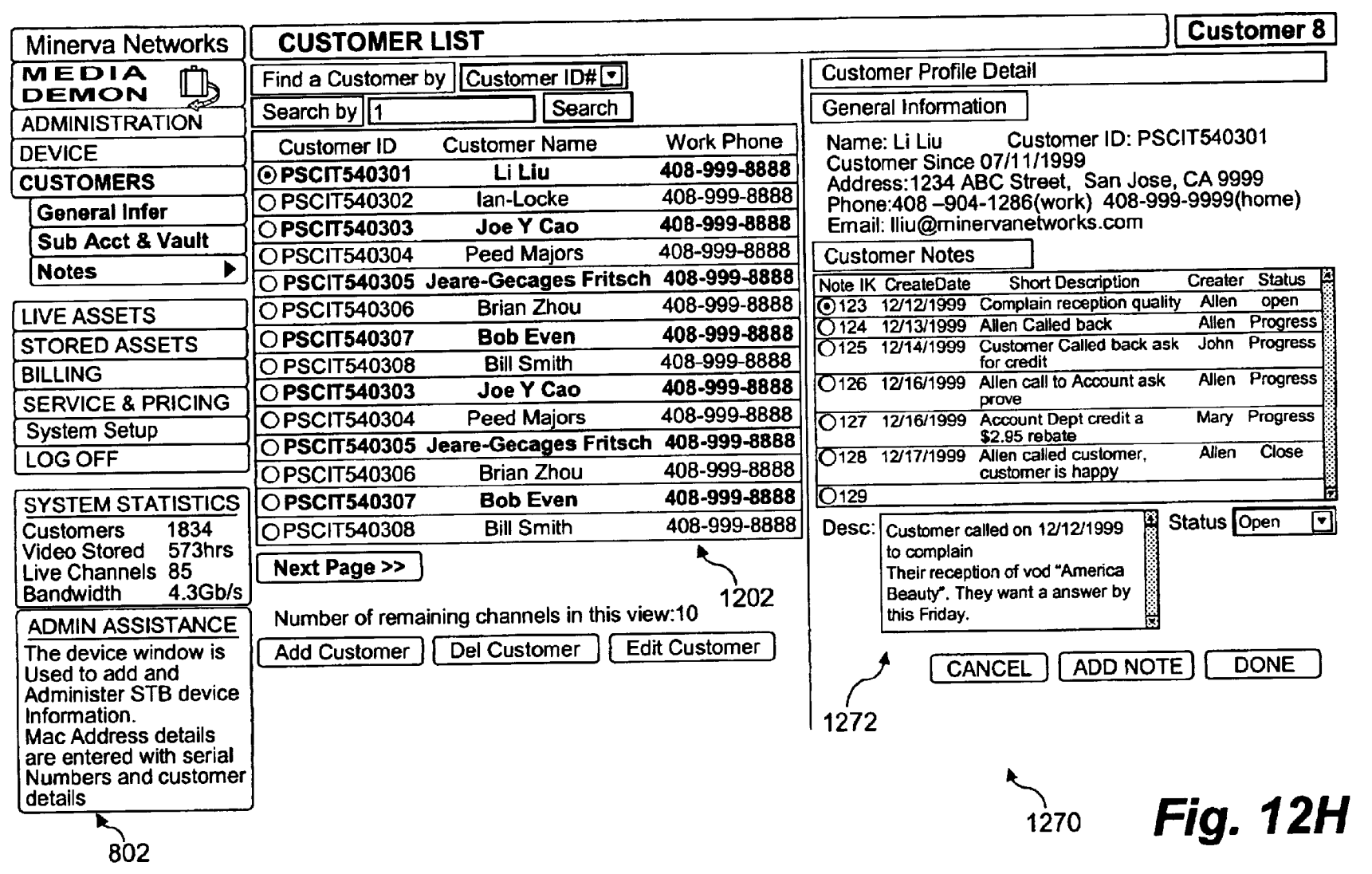

FIG. 12H is a screenshot of a customer management screen 1270 according to another embodiment of the invention. The customer management screen 1270 includes the navigation and information area 802, the customer list area 1202, and an edit selected customer area 1272. Here, the edit selected customer area 1272 includes general information and customer notes. With respect to the customer notes, the administrator is able to interact to review the historical account of complaints and responses as well as to obtain additional detail on such matters. The administrator can also add a note to the customer notes with such note providing a status to particular items.

The device module of the graphical user interface includes a series of screens that allow an administrator to configure devices (e.g., set-top boxes) for the media system. These screens are depicted in FIGS. 13A–13C.

Figure 13A:
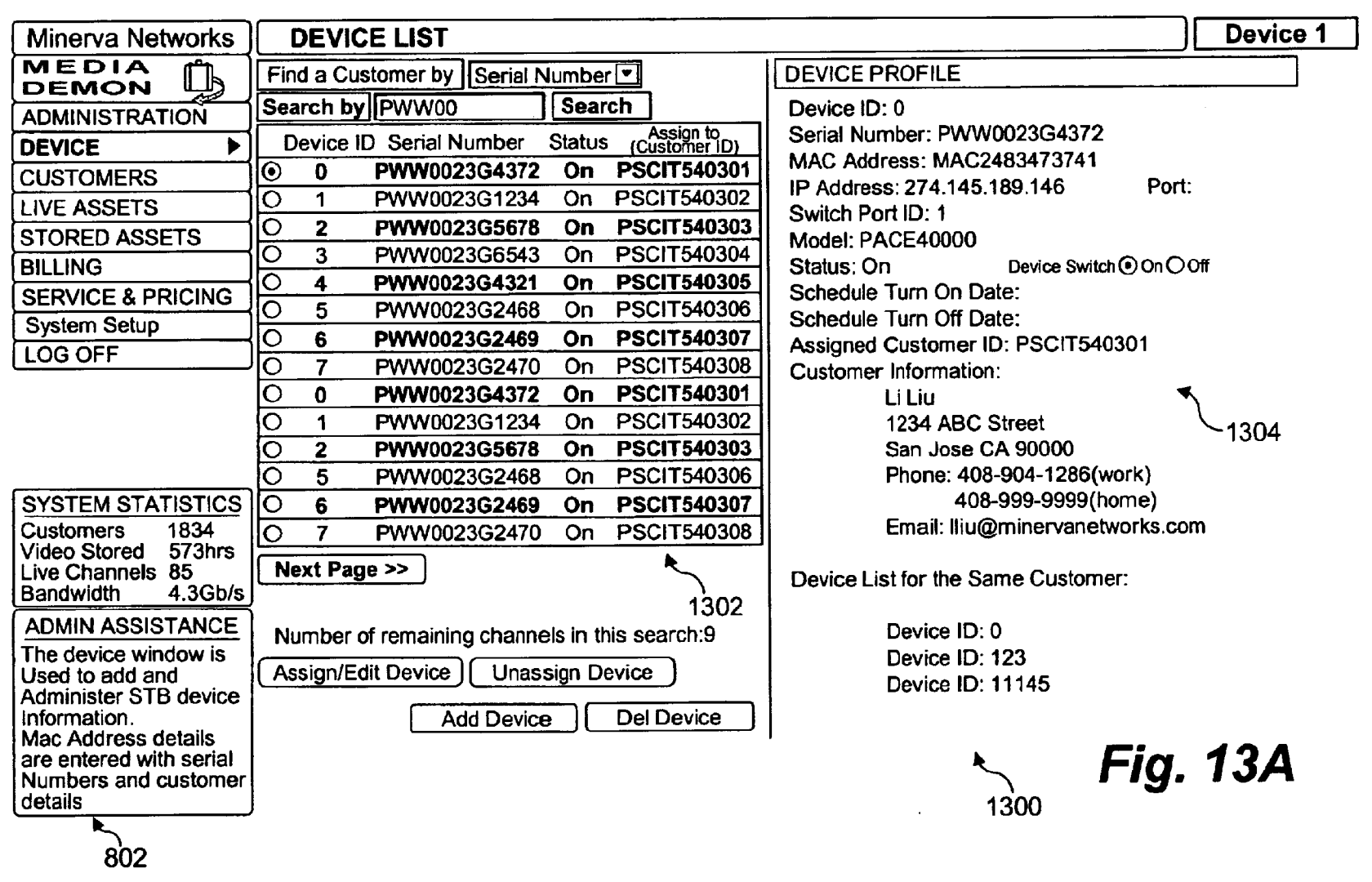

FIG. 13A illustrates a screenshot of a device configuration screen 1300 according to one embodiment of the invention. The device configuration screen 1300 includes the navigation and information area 802, a device list area 1302, and a device profile area 1304. The device list area 1302 includes a device list of those devices associated with the media system. The listing of the devices in the device list can be ordered or searched in a variety of different ways. In addition, one or more of the devices in the device list can be selected for processing. The device configuration screen 1300 facilitates the assigning or unassigning of devices, adding new devices, deleting existing devices, or editing devices. The device profile area 1304 lists profile information for the selected one or more devices in the device list. As illustrated in FIG. 13A, the device profile can include information such as device ID, serial number, MAC address, IP address, switch port ID, model, status, schedule turn on date, scheduled turn off date, assigned customer ID, customer information, and device list for same customer.

Figure 13B:
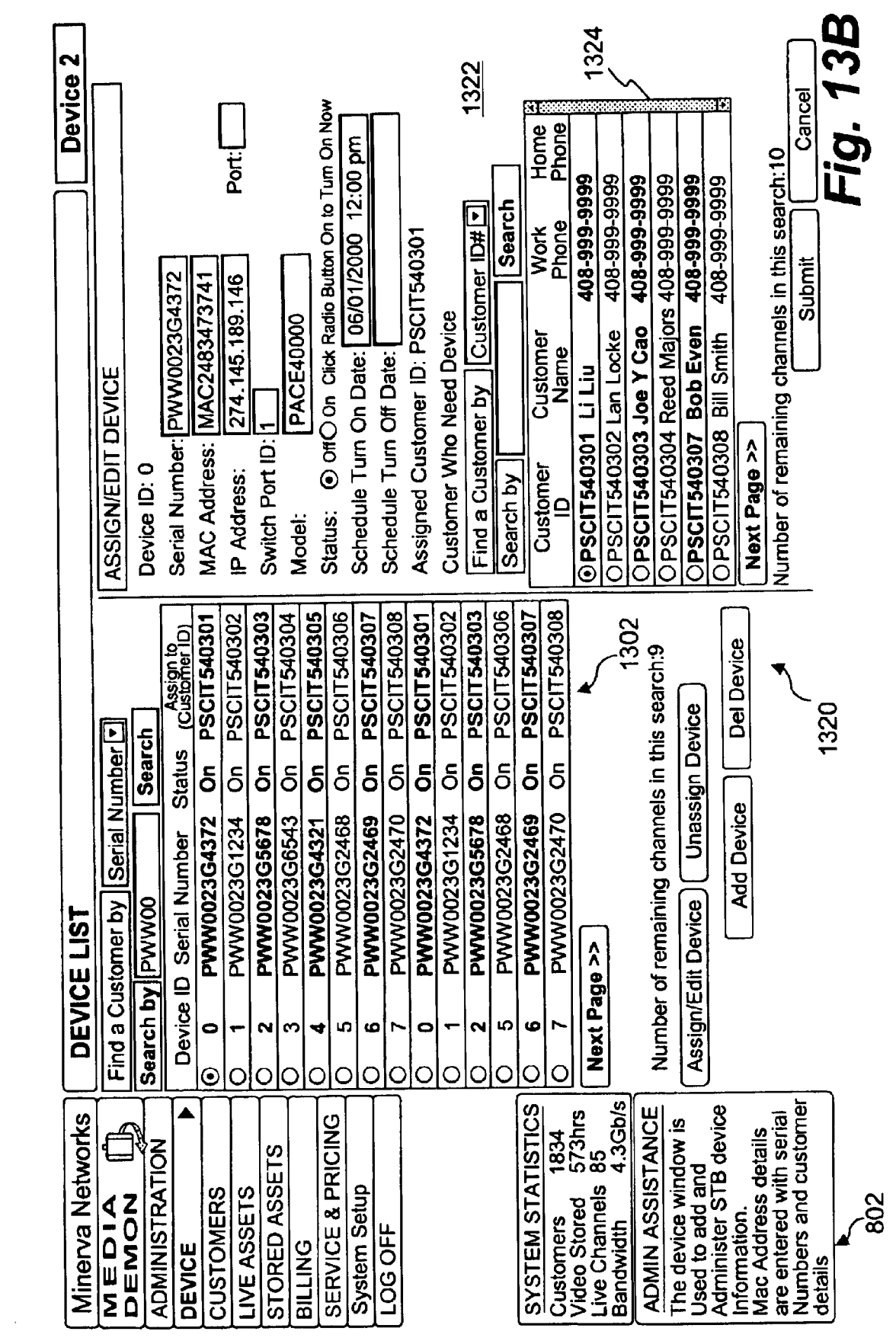

When the administrator selects an assign/edit device button 1306 of the device configuration screen 1300, a device configuration screen 1320 is displayed (presented to the administrator) as illustrated in FIG. 13B. The device configuration screen 1320 is similar to the device configuration screen 1300 except that the device profile area 1304 is replaced with an assign/edit device area 1322. The assign/edit device area 1322 allows the administrator to edit certain device information and to also assign the device to customers. To facilitate the assigning of the device to customers, the assign/edit device area 1322 can include a customer list 1324. The customer list 1324 can be ordered or searched in a variety of ways to facilitate the locating of one or more customers of interest.

When the administrator selects an add device button 1308 from the device configuration screen 1300, a device configuration screen 1340 is displayed (presented to the administrator) as illustrated in FIG. 13C. The device configuration screen 1340 is similar to the device configuration screen 1300 except that the device profile area 1304 is replaced with an add devices area 1342. The add devices area 1342 allows the administrator to enter device information, such as serial number, MAC address, IP address, switch port ID, model, status, schedule turn on date, schedule turn off date. In addition, the add devices area 1342 allows the administrator to designate those customers who need or will utilize the device being added. In this regard, the add devices area 1342 includes a customer list 1344. The customer list 1344 can be searched or ordered in a variety of ways to facilitate the locating of one or more customers of interest.

The billing module of the graphical user interface includes a series of screens that allow an administrator to perform billing functions. These screen are depicted in FIGS. 14A–14C.

Figure 14A:

FIG. 14A illustrates a screenshot of a billing information screen 1400 according to one embodiment of the invention. The billing information screen 1400 includes the navigation and information area 802, a billing report area 1402, a customer billing detail area 1404, and a billing correction area 1406. The billing report area 1402 provides a list of customers together with their corresponding account balance information. As shown in FIG. 14A, for each customer there can be displayed information such as customer ID, customer name, address, outstanding balance, and overdue balance. The customer billing detail area 1404 displays detailed billing information with respect to a selected one of the customers listed in the billing report area 1402. The billing correction area 1406 allows corrections to be made to a customer's billing data. Further, the billing information screen 1400 can include a print report button 1408 which, when pressed, causes a billing statement to be printed (billing report) for at least the selected customer. A representative sample billing statement is illustrated in FIGS. 14B and 14C, where FIG. 14B illustrates the first portion of the billing statement and FIG. 14C represents a second and final portion of the billing statement.

The media system allows subscribers (customers) to interact with the media system through a graphical user interface to receive media content. The graphical user interface can also be referred to as an subscriber-client user interface. A representative subscriber-client user interface is illustrated in FIGS. 15A–15F. The subscriber-client user interface is presented to subscribers (users) via terminal devices or client machines. As noted above, terminal devices or client machines can include a desktop computer, a laptop or notebook computer, a set-top box, and a mobile device. In one embodiment, the terminal devices or client machines operate a network browser to communicate with the media system via the network.

Figure 15A:
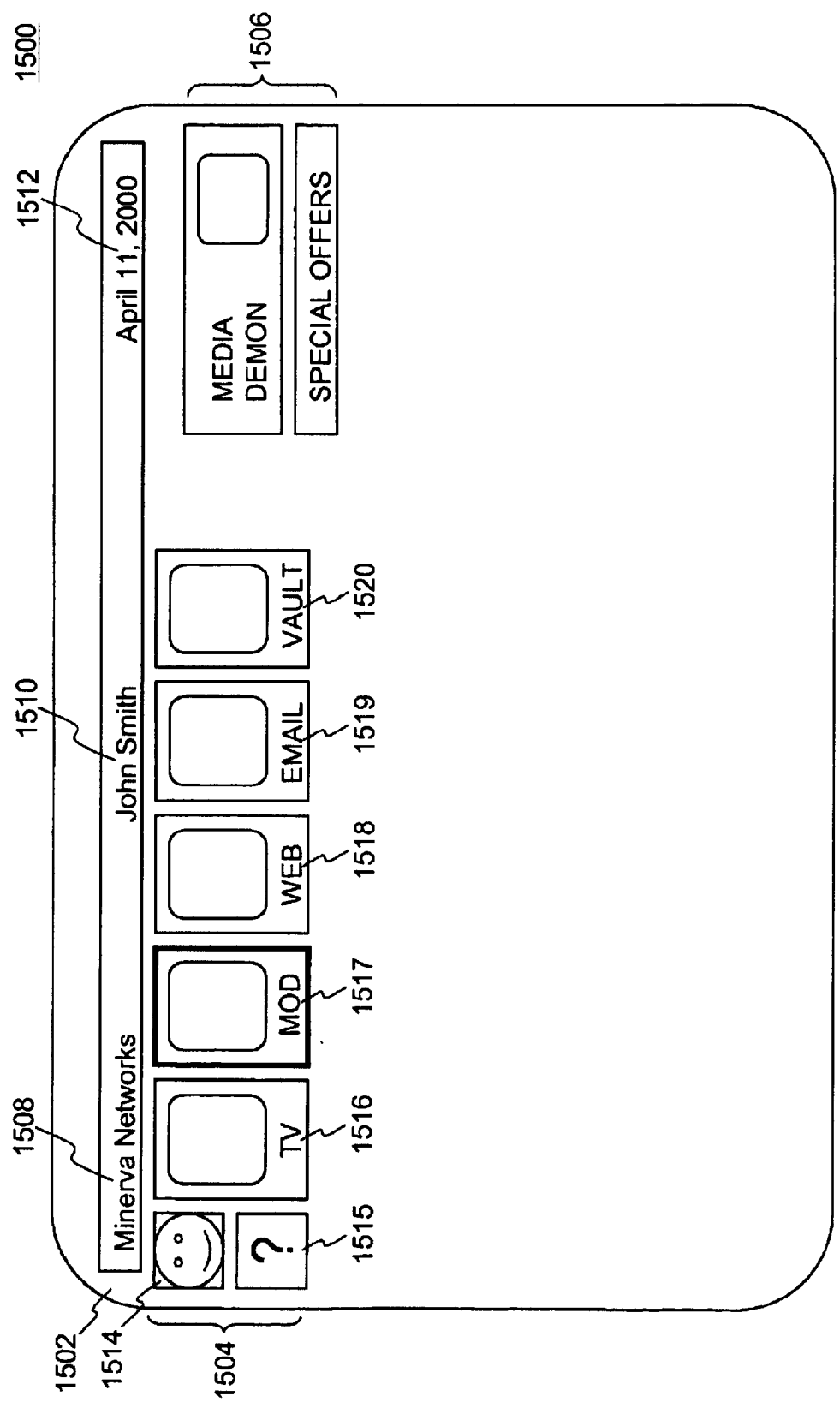
FIGS. 15A–15F illustrate a series of screens associated with a representative subscriber-client user interface.

Referring now to FIG. 15A, there is shown an exemplary main page 1500 that can be downloaded from the media system (server) and displayed on a display screen of a client machine. The main page 1500, sometimes called a media portal, presents an interactive graphical user interface (GUI) may be implemented in one or more markup language (i.e., HTML or XML), scripting languages or Java/Applet applications.

The main page 1500 includes a title bar region 1502, a toolbar region 1504, and a commerce region 1506. Each of the toolbar region 1504 and the commerce region 1506 may include one or more selectable items that allow a user to select a desired service/application being provided by the server.

The title bar region 1502 includes brand information 1508, a subscriber's name 1510, and a date/time indication 1512. The brand information 1508 may include the service provider's name and other related information. In one embodiment, the brand information 1508 may include a production company's name or artist's name when a movie or a music piece is played. The subscriber's name 1510 is typically related to a holder of an account in the server and can be a true name or a screen name. Typically, only after a user is authenticated by the server, is the portal page 1500 displayed with the correct name (or a designated screen name) of the user. The date/time 1512 is preferably synchronized with or provided by the server so that the user knows exactly when a scheduled program will be delivered or broadcast.

Figure 15B:
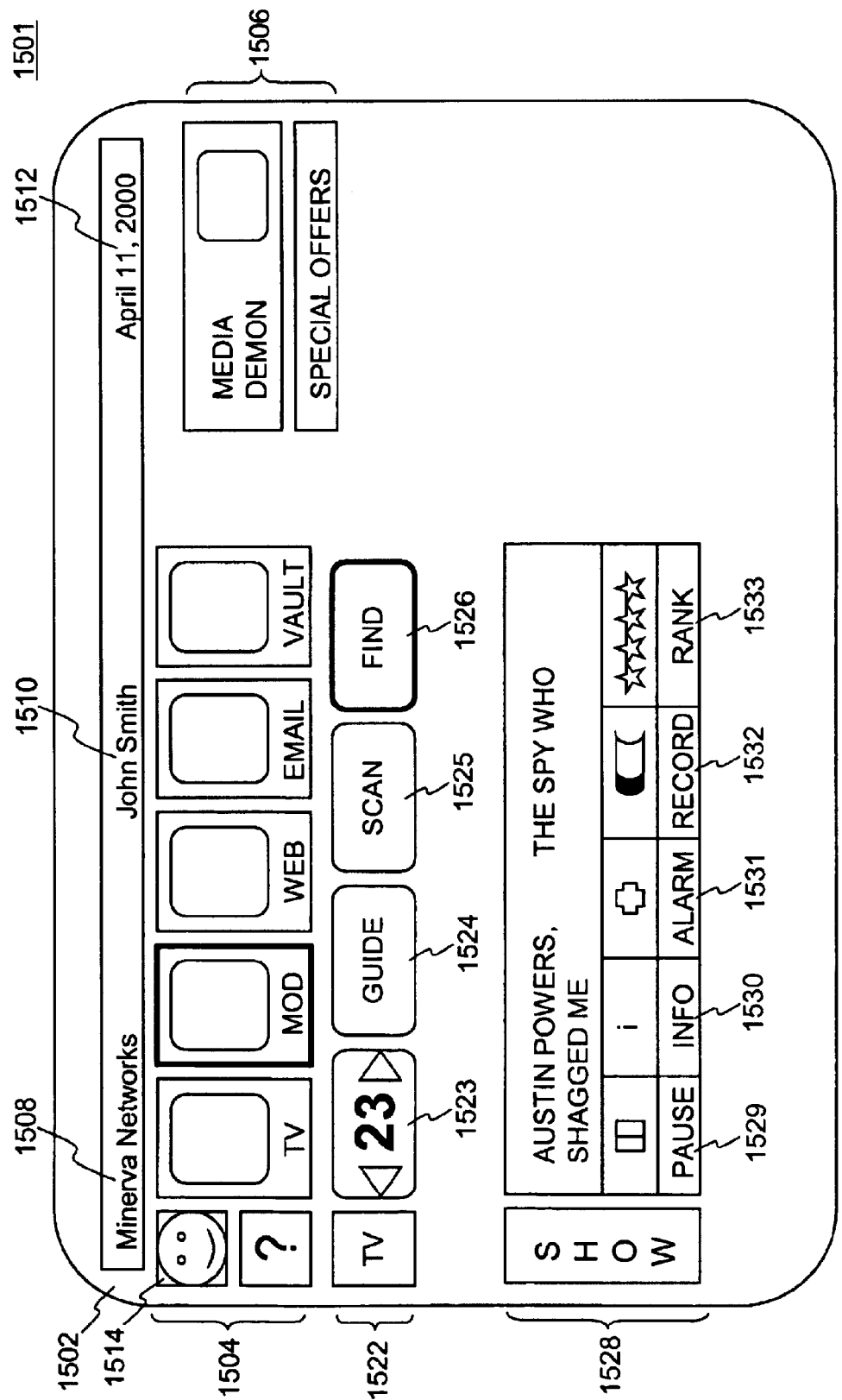

The toolbar region 1504 includes a chat button 1514, a help button 1515, a television (TV) button 1516, Media-On-Demand (MOD) button 1517, a web button 1518, an email button 1519, and a vault button 1520. The chat button 1514 is typically used for initiating communication with other users. Generally, there are a number of users accessing the services being provided by the server that can also provide a two-way communication mechanism between or among the users. The help button 1515 is used to initiate a help screen in case a user needs instructions for a particular operation or query. The television (TV) button 1516 is used to initiate a TV program mode. As described above, the server in the present invention is configured to provide multiple services one of which is broadcasting TV programs. When a user selects the television (TV) button 1516 as shown in FIG. 15A, a TV mode screen 1501 is displayed as shown in FIG. 15B. The screen 1501 in FIG. 15B includes a TV action region 1522 and a show action region 1528. The TV action region 1522 provides an interactive GUI that includes a channel button 1523, a program guide button 1524, a scanning button 1525 and a find button 1526 which respectively allow a viewer to change a channel, view a program guide, scan all programs being broadcast and enter a query for locating an interesting program. When a channel, for example, "23" is selected, the show action region 1528 shows relevant information 1529 about the channel, namely a movie "Austin Powers, The Spy who Shagged me" is being played on the channel.

In addition, the show action region 1528 shows a number of user friendly functions that can be requested by the viewer. When a movie is in progress and the viewer has to attend to an unexpected task or errand, a pause button 1530 may be activated to ask the server to "pause" the movie or program and continue the movie or program when the user comes back. Likewise, a record button 1533 can be activated to record a program when the user does not have time to view the program to be broadcast at a certain time. As the name suggests, an INFO button 1531, when activated, provides a brief description of a selected title. An alarm button 1532, when activated, provides a mechanism to notify the user when a scheduled program is on. The notification may be provided in various ways, including a pop-up banner, an audio sound, or an automatic switch to the program.

The commerce region 1506 is uniquely designed to encourage a user to interact with online retailers and to view special promotions. Such online retailers or promotions can be preferably related to a program the user is viewing. Since the server knows what program is being provided to the subscriber's client machine, suitable commercial information, if available, may be prepared and delivered to the subscriber's client machine. For example, when the user is viewing a golf tournament, the server can collect and package and deliver commercial information related to golf to the client machine. The commerce region 1506 can contain a button which, when pressed or automatically activated, displays the commercial information (e.g., golf equipment for sale).

Figure 15C:
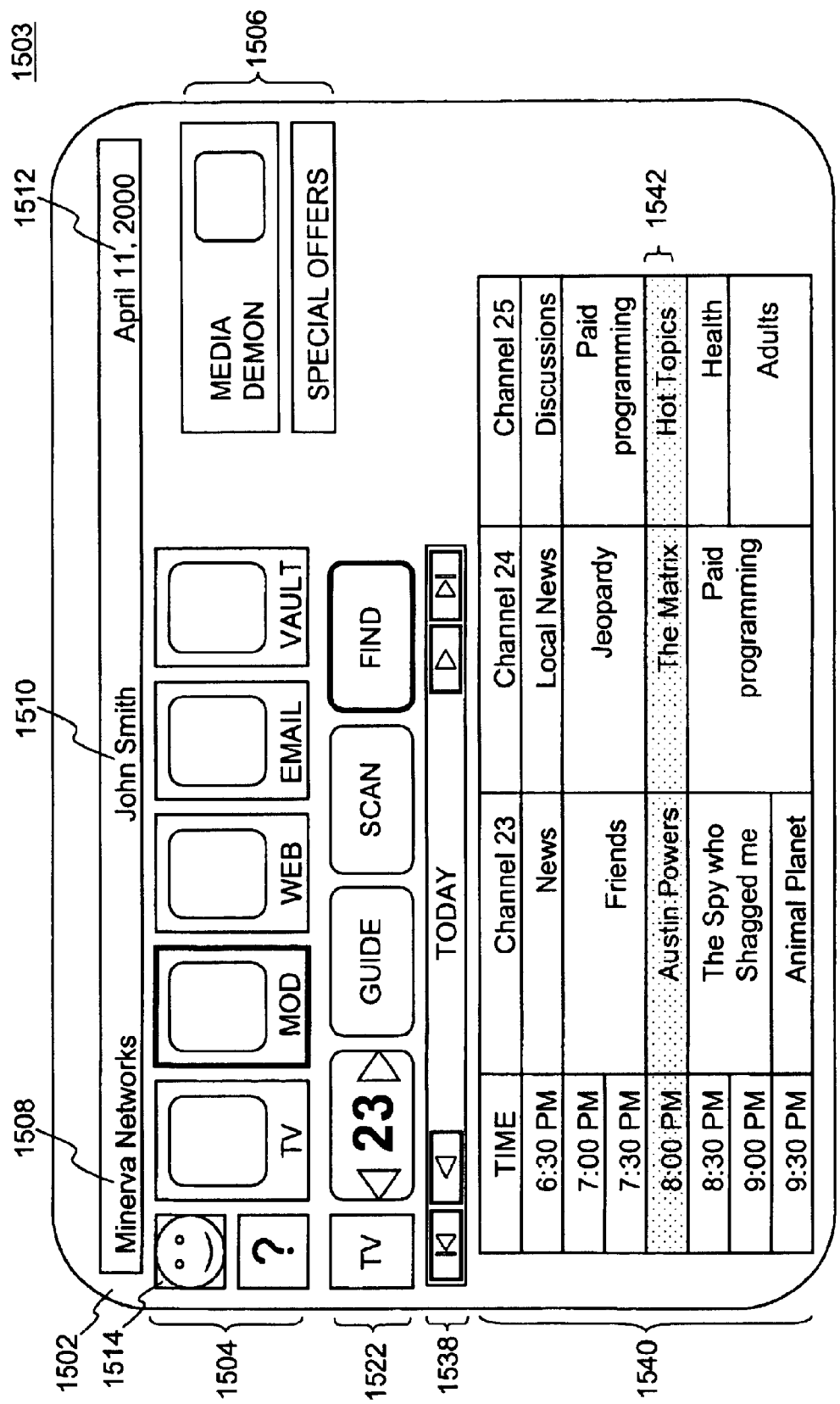

FIG. 15C shows a corresponding screen 1503 that is displayed when the program guide button 1524 is selected. The screen 1503 includes a focused program guide 1540 centered at a current time bar 1542. With a scroll bar 1538, a user can navigate all the channels being provided by the server. According to one embodiment, the program guide shows only the channels that are selected or subscribed to by the user when a service agreement was arranged with the server. Consequently, not only does the user does not have to pay for those channels that are never viewed, but also the program guide provided to the user contains only relevant channels that are of interest to the user. For example, the program guide being displayed in FIG. 15C provides programming information for channels 23, 24 and 25 which are all channels that the user receives. Hence, the program guide provided to users can be limited to providing information on those of the channels that the users receive. Also, the users may further customize their program guides to reorder the listing of channels, hide other channels, etc. so that the program guides better suit their viewing habits or preferences.

Different from program guides in the prior art systems, the program guide 1540 does not automatically scroll upward or downward rather stays on the current time bar 1542 so the viewer immediately distinguish what programs have been/are being/will be played on the channels. As described above, the program guide 1540 is updated at the server side and may be downloaded at request or automatically at determinable times controlled by the media delivery center. Hence, at any time, the program guide 1540 has the current time bar focused on the programs being serviced. According to one embodiment, the number of hours before or after the current time bar 1542 can be configured by the viewer. Additionally, the program guide 1540 can be manually scrolled while the current time bar 1542 stays on the programs being played in the channels.

Figure 15D:
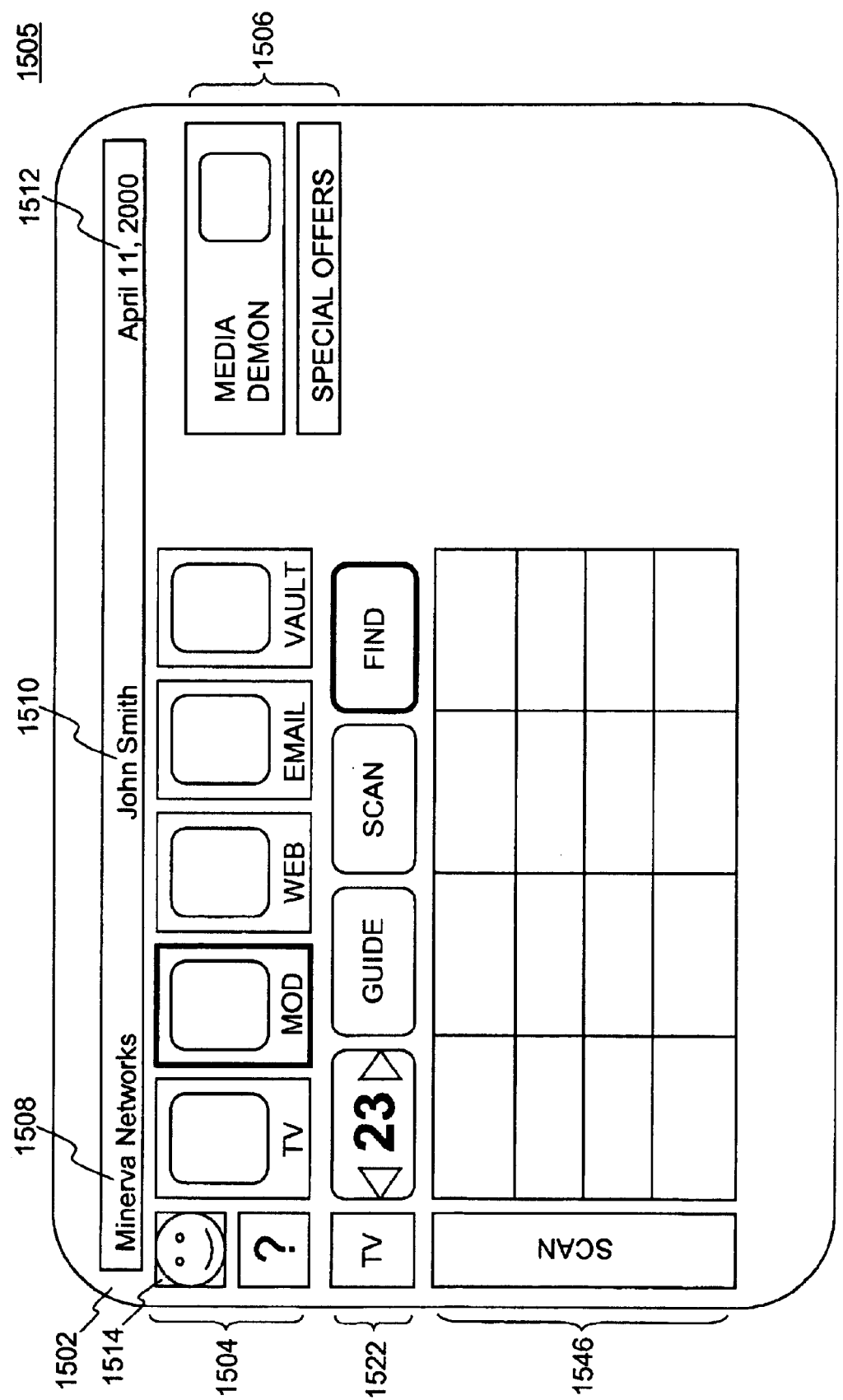

FIG. 15D shows a screen 1505 that is displayed when the scanning button 1525 is selected. The screen 1505 includes a program table for a channel (e.g., channel "23"), the table may include all programs for a day, a week or a month.

Figure 15E:
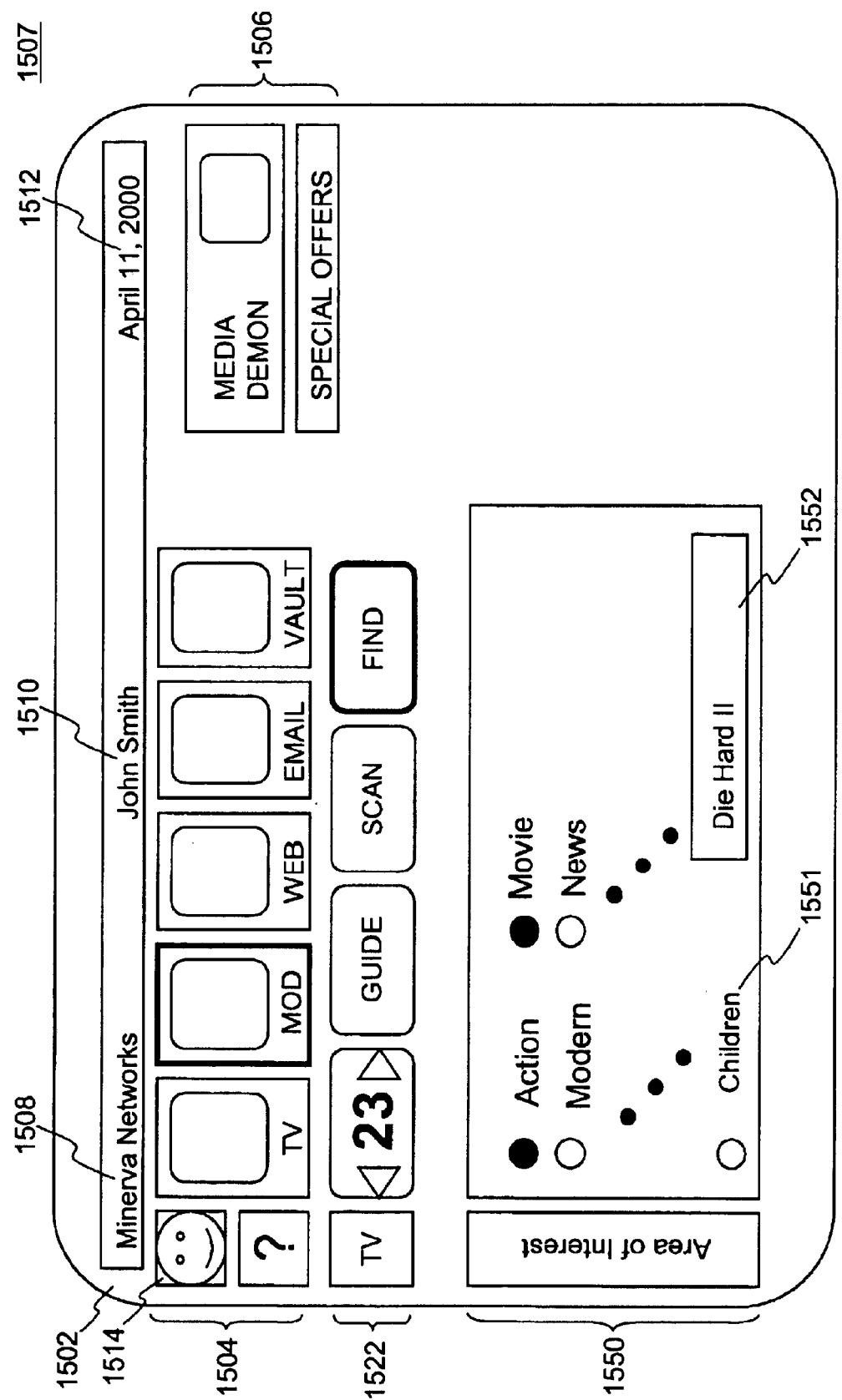

FIG. 15E shows a screen 1507 when the Find button 1526 is selected. The screen 1507 includes an entry area 1550 that allows a viewer to enter his/her preferences 1551 to facilitate a search in one or more channels. Depending on an exact implementation, the screen 1507 may also include an entry area 1550 in which the viewer may type in one or more keywords to facilitate a search in one or more channels.

Figure 15F:
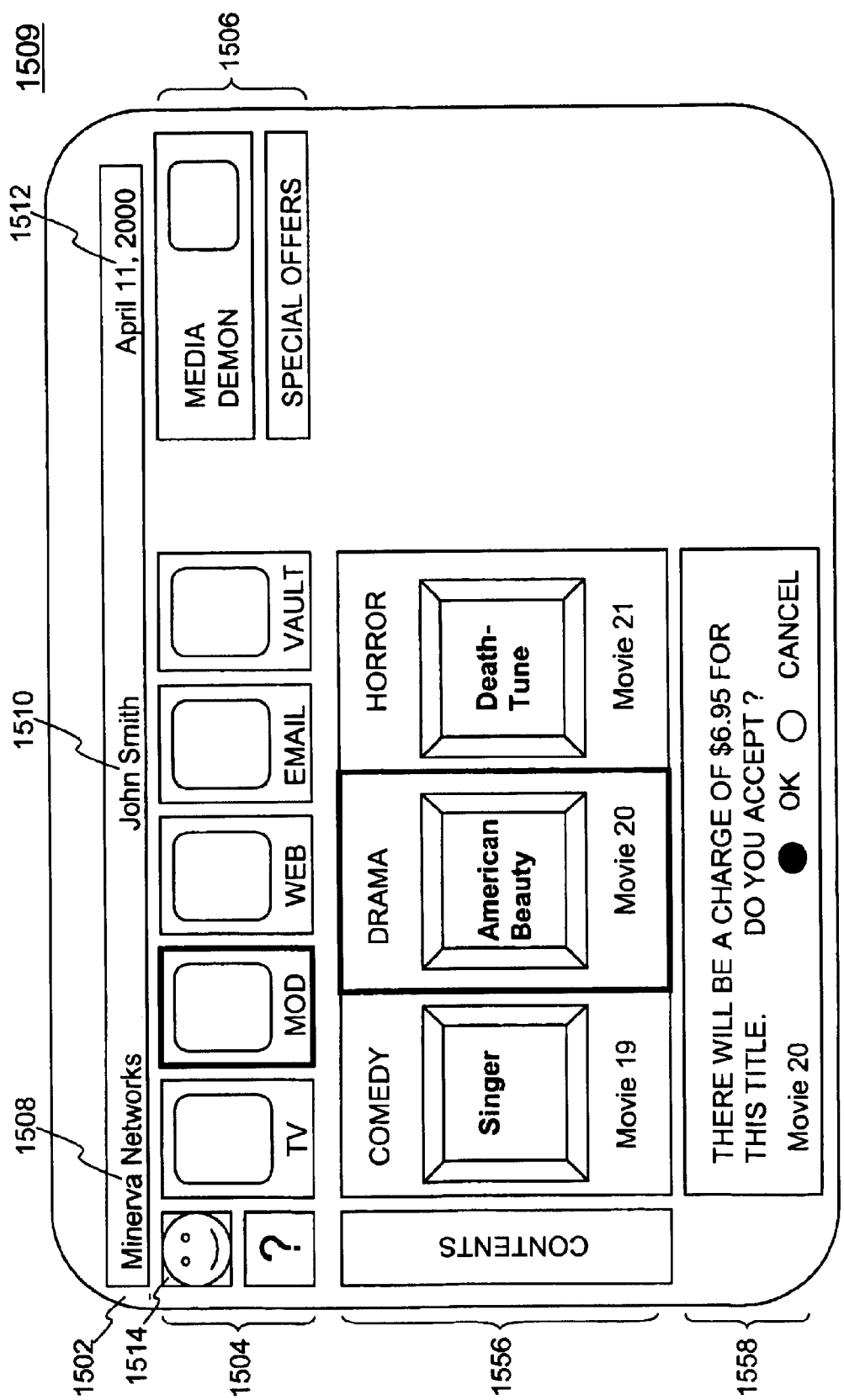

The server also provides a Media-on-Demand (MOD) service that is initiated by selecting the MOD button 1517 for a MOD mode. The MOD service permits a viewer to view a list of stored assets (e.g., movies and news) available in the server and then select and pay for a selected one of the stored assets. FIG. 15F shows a screen 1509 that is displayed when the MOD button 1016 is selected. The screen 1509 includes a contents area 1556 that includes a list of titles that can be accessed by the viewer. In this example, the titles or media pertains to movies. According to a preferred embodiment, each of the titles listed in the contents area 1556 displays an image thereof so that the viewer may immediately understand the nature of the available titles. When one of the titles in the contents area 1556 is selected (e.g., movie 20 is selected), a price banner 1558 is displayed to inform the viewer of the cost is to view the selected title and permits the viewer to make a final decision. If the user proceeds with the selection, the selected title will be delivered (e.g., streamed) from the server to the terminal device or client machine associated with the viewer. Accordingly, the corresponding account on the server is updated, for example, to incur the charge, record the time when the title is delivered and the name of the title, etc.

Referring now back to FIG. 15A, it is shown that the web button 1518 is also selectable. When a user prefers to navigate the Internet, the web button 1518 can be activated so as to launch a browser to permit the user to interact with all resources available over the Internet. The server in this mode acts like an Internet Service Provider (ISP). Similarly, an email application screen can be displayed when the user activates the email button 1519. The email application enables users to compose and send or receive and read email messages. Here, the server (media system) manages the reception and delivery of messages on the behalf of users. The vault button 1520, when activated, displays a list of items (e.g., recorded media) specially available to the account holder. Examples of the items may include a video bookmark, a list of recorded contents requested by the user or forwarded by other subscribers. The video bookmark is used to store links to interesting programs that the viewer may want to review from time to time. Generally, the programs that can be bookmarked are those that are in the stored assets in the server. Hence, each of the links includes information on where the programs are located in the stored assets. According to one embodiment, each of the items being displayed is embedded with a link (e.g., a hyperlink) to a storage location in the server where the item is stored. When one of the items is selected by the user, namely the link is activated, the content pointed to by the link may be caused to be selected for delivery or to be delivered.

It should be noted that FIGS. 15A–15E are exemplary screens that may be displayed on a display screen of a client machine. Different implementations may lead to different layout of the screens, some items may be omitted while others may be added. Various configurations and layouts may be possible in view of the above description. Further it should be noted that, even for a server servicing a number of subscribers, the layout of the screens may not be necessarily the same for all subscribers. Depending on an implementation and a subscriber's preference, some of the screens for one user may be different that those of another. One of the features in the present invention is the flexibility provided in the media management unit that can be not only customized by the media system according to one's business models and needs but also by its subscribers who can decide what channels are included in their own service package.

Figure 16A:
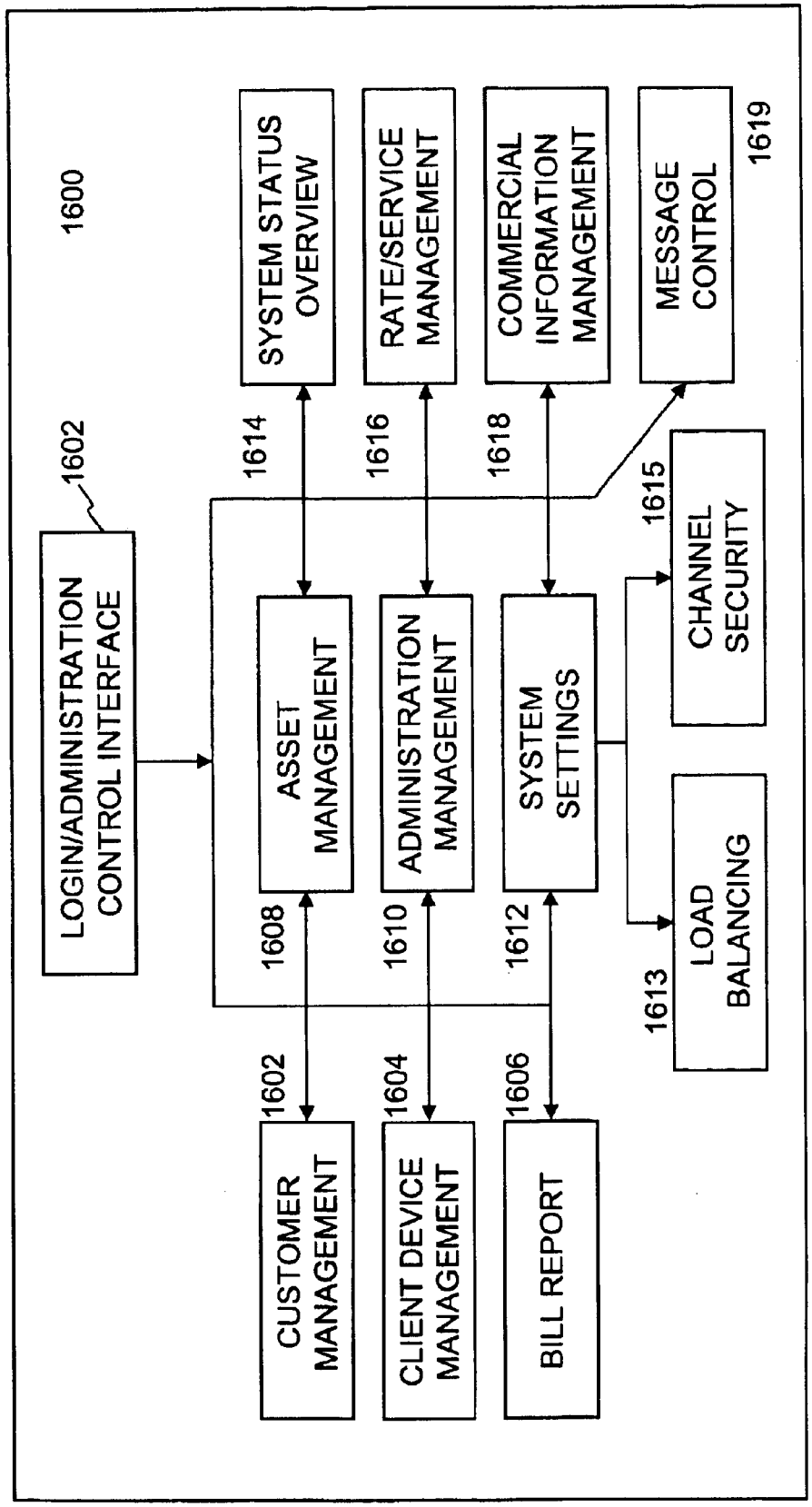
FIG. 16A shows a function block diagram of a media management system accordingly to one embodiment of the invention and may be understood in conjunction with exemplary screens illustrated in FIGS. 8A–14C.

FIG. 16A shows a function block diagram 1600 of a media management system accordingly to one embodiment of the invention and may be understood in conjunction with exemplary screens illustrated in FIGS. 8A–14C. The media management system is, for example, the media management system 205 illustrated in FIG. 2A.

A portal to the block diagram 1600 is the login/administration control interface 1602 from which an operator or administrator can manage the operations of the media delivery center. The login/administration control interface 1602 may be implemented with a markup language or a script language, such as XML or Java. In one embodiment, the login/administration control interface 1602 is inherently coupled to a commercial database, such as those provided Oracle Corporation and provides a mechanism for the administrator to enter/update/manage data in the database via a number of modules that may be also implemented with a markup or a script language such as Java.

A customer management module 1602 is responsible for creating accounts for new subscribers, setting up service packages therefor, and managing/updating all accounts serviced by the media system. In addition, the customer management module 1602 permits multiple sub-accounts under a general account, which is particular useful to a family with one or more minors.

Figure 16B:
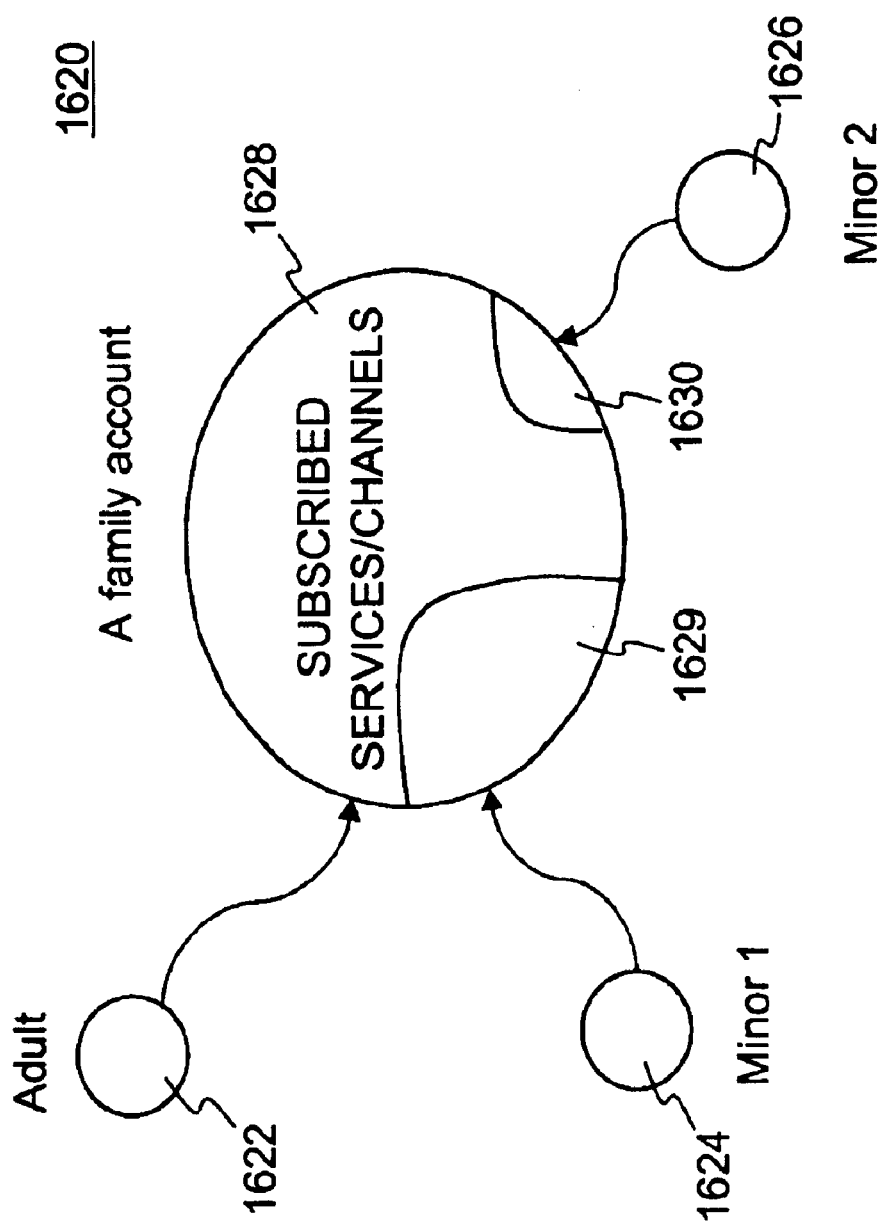
FIG. 16B shows a relationship between an adult account and two sub-accounts under a general account.

FIG. 16B shows a relationship 1620 between an adult account 1622 and sub-accounts 1624 and 1626. The adult account 1622 and sub-accounts 1624 and 1626 can be opened under a family account and charged as a single account. Through the customer management module 1602, the adult account 1622 can access full services 1628 subscribed under the family account while the minor accounts 1624 and 1626 are permitted to access limited services 1629 and 1630 (e.g., a reduced number of channels, record restrictions, etc.) within the full services 1628. This can be achieved by permitting only selected channel access when the minor account is opened (see FIG. 12B). According to one embodiment, each of the minor accounts 1624 and 1626 can be configured to access different levels of limited services, thereby a minor receives only programs that are appropriate to his/her age.

Figure 16C:
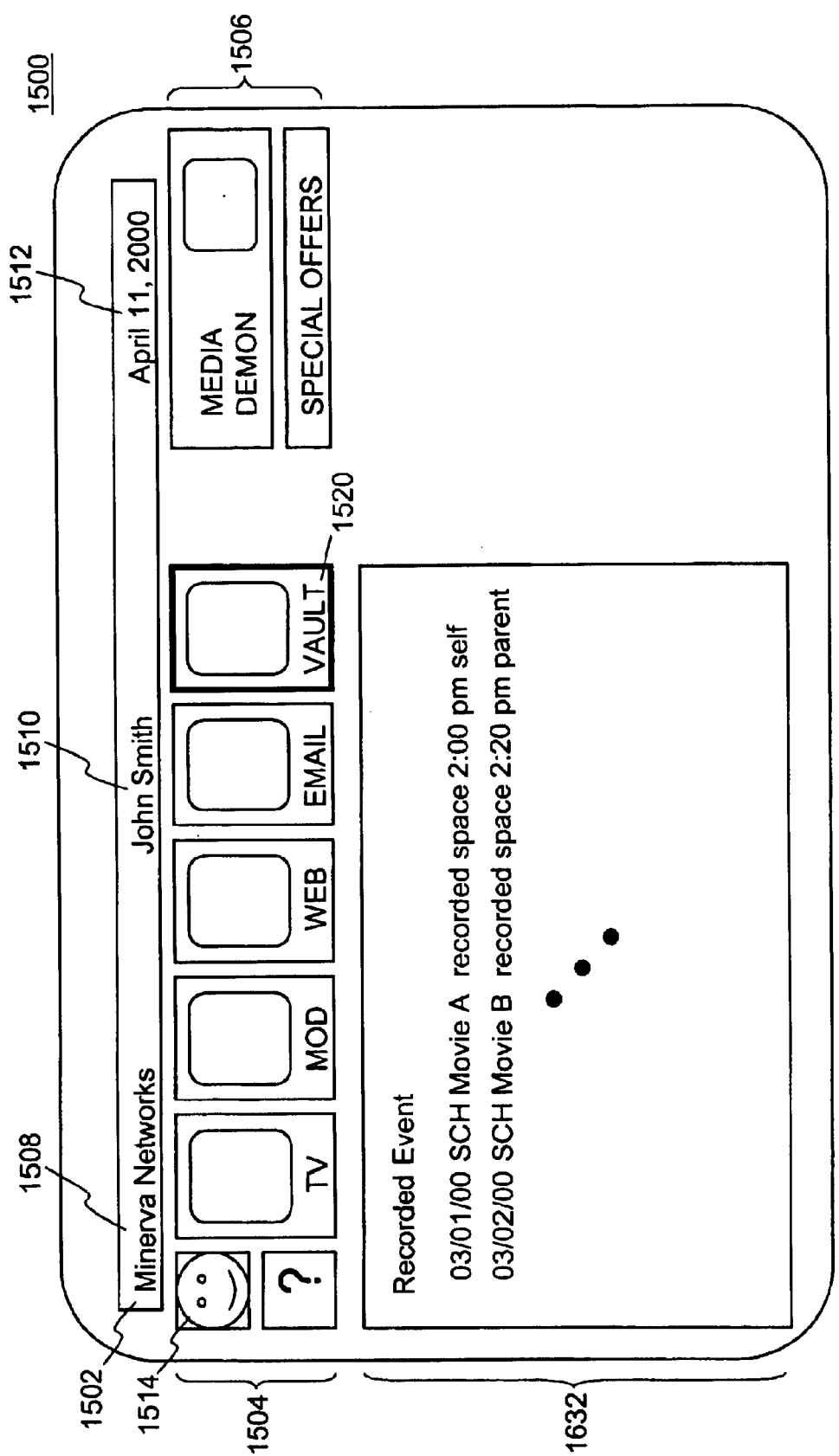
FIG. 16C show an exemplary library index list of the vault information for a sub-account holder and being displayed on a client machine.

According to one implementation, the adult can place one or more selected programs into the minor accounts when the programs are deemed proper to the minors. The selected programs may include recorded programs forwarded by the adult or some programs on the channels that are generally not available to the minors. In other words, the adult can archive a program and place the newly created entry in the minor's library index list, thereby the minor will see the entry and access the archived program by the adult. FIG.12B shows an exemplary list as the vault information displayed by an administrator. FIG. 16C show an exemplary library index list 1632 of the vault information for a sub-account hold (e.g., a minor) that may be displayed on a client machine. The exemplary library index list 1632 can be displayed after the Vault button 1520 is selected. The account holder, here a sub-account holder, can then choose to play a desired program in the library index list 1632. The library index list 1632 comprises individual entries, each identifying one archived program along with information on when the program was archived, the title thereof, and who made the request to archive the program. According to one embodiment, each of the entries in the list 1632 can be embedded with a link that can be activated to retrieve an archived program. The link typically includes location information of where the program is stored in a storage device in the server. Upon a program being selected, the link is activated to generate a request in a client machine to retrieve the program from the storage device and causes the client machine to play the program.

Referring back to FIG. 16A, a client device management module 1604 is accessed to record what type of client machines the media delivery center is providing services to by: serial number, corresponding IP address and MAC address, customer name and address and status, etc. The type of client machines is, for example, useful to enable the media management system to deliver programs formatted suitable to a display screen thereof. For example, the client machine is a computer monitor with VGA settings. According to the recorded client machine information, the program being delivered thereto is resized to 640 by 480. The resizing may be based on an interpolation process that may be implemented in software, hardware or a combination of both. A bill report module 1606 is coupled to the customer management module 1602 and determines how much each account has incurred during a predefined period. An asset management module 1608 permits the administrator to manage all stored assets. Examples include (i) deletion of certain stored programs when they are no longer popular or expired with respect to terms reached with the original sources thereof and (ii) add/update programs in storage.

An administration management module 1610 permits the owner of the media system to determine who has the authority or levels of configuration authority to access the media system. A system setting module 1612, as illustrated in FIGS. 8A–8E, manages all the channels being serviced to the subscribers. A system status overview 1614 is typically used to report what channels that are more popular than others among the subscribers, operational status of each of the channels being serviced, each subscriber's transaction and time duration, and popularity of programs. In one embodiment, the system status overview 1614 is configured to work with the setting module 1612 to closely monitor a load balance of the system. Typically, a system is configured to support a predefined number of users while the total number of subscribers may be larger. In some rare occasions all of the subscribers are logged on and hence the system may be overloaded. To prevent a system from being overloaded, load balancing 1613 can initiate a backup system that may be an identical system located within or remotely with respect to the current system. In addition, a channel security 1615 is used to initiate one or more secure sessions to the users depending the delivery mode. For example, in unicast or multicast mode, it is preferable to provide programs in a secure mode so that the programs being delivered to the users will not be intercepted by other users. The method to provide a secure communication session is well known in the art. One of the examples is to simply scramble the programs so that only the designated users can receive the programs. A rate/service management 1616 is accessed to setup price information for services being offered to the subscribers as illustrated in FIGS. 9A–9D.

A commercial information management module 1618 allows the administrator to manage the commercial information received from various sources and deliver the commercial information objectively. For example, with the customer management module 1602 and the system status overview module 1614, the commercial information management module 1618 can be configured to associate some of the commercial information with the programs being delivered to the subscribers. A message control 1619 is used to initiate a broadcasting of urgent programs that are not normally scheduled. The programs are typically encoded with high priority over other programs. One example of an urgent program is a natural disaster notification. The form of the program may be an emergency clip that may be in audio, video, text or image. Upon receiving in the client machines, the urgent programs can be immediately noticed by users of the client machines. For example, an image containing urgent messages can be overlaid on a regular program being watched by the users.

The invention is preferably implemented in software or hardware or a combination of both. At least portions of the invention can also be embodied as computer readable code on a computer readable medium. The computer readable medium is any data storage device that can store data that can be thereafter be read by a computer system. Examples of the computer readable medium include read-only memory, random-access memory, disk drives, floppy disks, CD-ROMs, DVDs, magnetic tape, optical data storage devices, carrier waves. The computer readable media can also be distributed over network coupled computer systems so that the computer readable code is stored and executed in a distributed fashion.

The advantages of the invention are numerous. Different embodiments or implementations may yield one or more of the following advantages. One advantage of the invention is that a media system has integrated various services for the benefit of administrators and service providers. Another advantage of the invention is that the media system has a flexibile design that can be customized to fit service providers business needs. Still another advantage of the invention is that the media system is a centralized system that can support both live and on-demand services for many subscribers. Yet another advantage of the invention is that the media system has a flexible design that can enable subscribers to customized their program guides, services packages (including pause and record services), and the like.

The many features and advantages of the present invention are apparent from the written description and, thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for delivery media programs from a central location to multiple subscribers, said method comprising:

configuring subscribers to receive delivery of a selected set of the media programs over a network, wherein the media programs are received from different sources and in different formats;

setting program guides in accordance with service packages respectively for the subscribers;

reformatting the media programs to one or more predefined formats suitable for transporting over the network or for proper display on client devices used respectively by the subscribers;

rendering program guides available to the subscribers, wherein each of the program guides includes only a current time bar being superimposed directly on those of the media programs identified in the program guide that are currently being broadcasted;

delivering a selected set of the media programs over the network to one or more of the subscribers; and caching, at the same time, the selected set of the media programs respectively in a number of temporary spaces, each being managed by operations including at least: determining if a temporary space has sufficient available capacity to cache a media program being delivered live from the media delivery center to a user, and discarding from the temporary space a media program that has been previously cached therein when the temporary space is determined to have insufficient available capacity to cache one of the media programs in entirety, whereby the one of the media programs being delivered live and cached can be delivered via the temporary space upon request from a subscriber for a period of time after the one of the media programs has been delivered.

2. A method as recited in claim 1, wherein each of the subscribers receives the selected set of the programs from a respective client machine that is associated with an address identifier, and wherein said delivering is in accordance with said address identifier.

3. A method as recited in claim 1, wherein said method further comprises:

receiving a request for delivery of a media-on-demand request from a particular subscriber, the media-on-demand request including an index identifying one of the media programs stored in the central media store, and wherein said delivering operates to unicast the one of the media programs to the particular subscriber.

4. A method as recited in claim 1, wherein the media programs includes live content, and wherein said delivering operates to multicast certain of the media programs to a selected group of the subscribers.

5. A method as recited in claim 1, wherein the media programs are provided over a plurality of channels, and wherein said setting of the service packages comprises assigning selected ones of the channels to be included in the service packages and setting price options for each of the selected ones of the channels.

6. A method as recited in claim 1, wherein said method further comprises:

enabling the subscribers to customize the program guides so that only selected channels desired by the user will be shown in the program guides.

7. A method as recited in claim 1, wherein the different sources are from at least one of (i) a television source, (ii) a satellite source, (iii), an Internet source and (iv) a digital video broadcast.

8. A method as recited in claim 1, wherein the program guide and the respective current-time bars are defined by a markup language.

9. A media delivery center for delivery of media programs to users over a network, the media delivery center comprising:

a media receiving unit, the media receiving unit being configured to receive the media programs in a first format from one or more media sources;

a media platform, coupled to the media receiving unit and receiving the media programs therefrom, transforming the media programs in a second format suitable for transporting over the network;

a media storage device coupled to the media platform, said media storage device being configured to store at least one of the transformed media programs from the media platform; and a media management server, coupled to the media platform, configured to control the media platform how to transform the received media programs in the first format to the second format so that the transformed media programs can be optimally delivered over the network to the users, and configured to produce and deliver different program guides to different ones of the users depending on at least service packages associated with the users, wherein the users are able to customize the one or more program guides that they receive from said media management server over the network and each of the program guides includes only a current time bar that is superimposed directly on those of the media programs identified in the program guide that are currently being delivered, and wherein one of the transformed media programs that results from the media programs received is cached at the same time in a temporary space being managed by operations including at least: determining if the temporary space has sufficient available capacity to cache the one of the media programs being delivered live from the media delivery center to a user, and discarding from the temporary space a media program that has been previously cached therein when the temporary space is determined to have insufficient available capacity to cache the one of the media programs being delivered live, whereby the one of the media programs being delivered live and cached can be delivered upon request from a user for a period of time after the one of the media programs has been delivered.

10. A media delivery center as recited in claim 9, wherein the one or more media sources include at least one of (i) a television source, (ii) a satellite source, (iii), an Internet source, (iv) a digital video broadcast and (v) a locally supplied source.

11. A media delivery center as recited in claim 9, wherein each of the first format and the second format is either in digital or analog.

12. A media delivery center as recited in claim 9, wherein the network is a packet-switched network.

13. A media delivery center as recited in claim 12, wherein both of the first format and the second format are in digital but in a different encoding rate.

14. A media delivery center as recited in claim 13, wherein the media platform is configured to transcode the received media in the first format to the second format according to a predefined rate optimally supported in the packet-switched network.

15. A media delivery center as recited in claim 9, wherein the media management server is configured to perform operations of:

maintaining a plurality of user accounts, each associated with one of the users;

managing a proper set of programs in the media to be delivered to each of the users; and enabling the one of the users to access his/her account over the network to customize service options previously set up thereto.

16. A media delivery center as recited in claim 9, wherein the program guides and the respective current-time bars are defined by a markup language.

17. A media delivery center as recited in claim 9, wherein the media management server is configured to perform operations of:

monitoring operational status of the media delivery center; and initiating a backup system to support the media delivery center when a number of the users is exceeding a predefined number of the users that could be supported by the media delivery center.

18. A media delivery center as recited in claim 17, wherein the backup system is coupled to the media delivery center through the network and comprises at least a portion of functions provided by the media management so that some of the users can be serviced by the backup system.

19. A media delivery center as recited in claim 9, wherein the media management server is configured to perform operations of:
broadcasting an urgent program to each of the users, the urgent program having a priority higher than the media being currently delivered to the users so that the urgent program can be noticed by each of the users when the urgent program arrives.

20. A media delivery center as recited in claim 9, further comprises a transmission equipment coupled to the media storage device, the transmission equipment receiving the media stored in the media storage device and caused to deliver the media to the users in a transmission mode selected from a group consisting of unicasting, multicasting and broadcasting.

21. A media delivery center as recited in claim 20, wherein the network is a data network and wherein the transmission equipment includes a network interface facilitating data communication from the transmission equipment to the data network.

22. A media delivery center as recited in claim 21, wherein the network interface is configured to support at least one of (i) HTTP (Hypertext Transfer Protocol), RTP (Real-Time Transport Protocol), (ii) RTSP (Real-Time Stream Control Protocol), (iii) IP (Internet Protocol), (iv) SMTP (Simple Mail Transfer Protocol) and (v) H.323 (Audio/Video/Data Standard).

23. A media delivery center as recited in claim 9 wherein the media storage device includes at least one video server.

24. A media delivery center as recited in claim 9,
wherein a designated space in the media storage device is allocated for storing commercial programs, each indexed and registered with the media management server;
wherein the media management server maintains a plurality of subscriber accounts, each configured to record what services a corresponding subscriber has received; and
wherein the media management server is configured to select one or more of the commercial programs for delivery together with the media being delivered to the users according to each of the subscriber accounts.

25. A media delivery center as recited in claim 24, wherein the commercial programs can be in an audio, video, or image format and shown substantially close to the media being delivered to the users.

26. A media delivery center as recited in claim 9, wherein said media storage device includes the temporary space.

* * * * *